(12) United States Patent
Scheunert et al.

(10) Patent No.: US 12,544,162 B2
(45) Date of Patent: Feb. 10, 2026

(54) SYSTEM AND METHOD FOR GUIDING ADJUSTMENT OF A REMOTE CENTER IN ROBOTICALLY ASSISTED MEDICAL PROCEDURES

(71) Applicant: Auris Health, Inc., Redwood City, CA (US)

(72) Inventors: Mary Margaret Scheunert, San Francisco, CA (US); Pouya Sabetian, Foster City, CA (US); Kaiyang Zheng, Redwood City, CA (US); Alexander Tarek Hassan, San Francisco, CA (US)

(73) Assignee: Auris Health, Inc., Santa Clara, CA (US)

( * ) Notice: Subject to any disclaimer, the term of this patent is extended or adjusted under 35 U.S.C. 154(b) by 98 days.

(21) Appl. No.: 18/400,648

(22) Filed: Dec. 29, 2023

(65) Prior Publication Data
US 2024/0130809 A1 Apr. 25, 2024

Related U.S. Application Data

(63) Continuation of application No. PCT/IB2022/056017, filed on Jun. 28, 2022.
(Continued)

(51) Int. Cl.
*A61B 34/30* (2016.01)
*A61B 34/00* (2016.01)
*B25J 13/06* (2006.01)

(52) U.S. Cl.
CPC .............. *A61B 34/30* (2016.02); *A61B 34/70* (2016.02); *B25J 13/06* (2013.01); *A61B 2034/301* (2016.02)

(58) Field of Classification Search
CPC ... A61B 34/30; A61B 34/70; A61B 2034/301; A61B 2090/064; A61B 2090/0808;
(Continued)

(56) References Cited

U.S. PATENT DOCUMENTS 8,749,190 B2 6/2014 Nowlin et al.
9,333,042 B2 * 5/2016 Diolaiti ................ A61B 90/361
(Continued)

FOREIGN PATENT DOCUMENTS

WO 2018/052796 A1 3/2018
WO 2019/117896 A1 6/2019
(Continued)

OTHER PUBLICATIONS

PCT International Search Report; PCT/IB2022/056017; Sep. 20, 2022; 4 pages.
(Continued)

*Primary Examiner* — Bhavesh V Amin
(74) *Attorney, Agent, or Firm* — FROST BROWN TODD LLP

(57) ABSTRACT

At least one robotic arm is coupled to an instrument and docked to a cannula. The cannula includes a first location of the cannula and a second location of the cannula. The at least one robotic arm is capable of entering a guided mode whereby a remote center of motion changes from the first location of the cannula to the second location of the cannula, and wherein an alert associated with the guided mode informs a user of entry into the guided mode.

20 Claims, 31 Drawing Sheets

Related U.S. Application Data

(60) Provisional application No. 63/217,222, filed on Jun. 30, 2021.

(58) Field of Classification Search
CPC .......... A61B 34/20; A61B 2017/00115; A61B 2034/2051; A61B 2034/2059; A61B 2034/2061; A61B 2034/2065; A61B 17/3421; A61B 2090/376; A61B 2560/0437; B25J 13/06; A61G 12/001; A61G 13/1235; A61G 13/1245; A61G 13/1295; A61G 2210/50; A61G 13/04; G16H 20/40; G16H 30/40; G16H 40/63; G16H 50/50
See application file for complete search history.

(56) References Cited

U.S. PATENT DOCUMENTS

| | | | |
|---|---|---|---|
| 9,763,741 B2 | 9/2017 | Alvarez et al. | |
| 10,188,472 B2* | 1/2019 | Diolaiti | A61B 1/00087 |
| 11,399,908 B2* | 8/2022 | Diolaiti | A61B 90/361 |
| 11,553,973 B2* | 1/2023 | Devengenzo | B25J 9/0027 |
| 11,832,910 B1* | 12/2023 | Basafa | B25J 9/0087 |
| 11,986,165 B1* | 5/2024 | Linard | A61B 90/03 |
| 12,097,002 B2* | 9/2024 | Diolaiti | A61B 34/37 |
| 2011/0257661 A1 | 10/2011 | Choi et al. | |
| 2012/0265071 A1 | 10/2012 | Berke | |
| 2019/0176334 A1* | 6/2019 | Zhou | A61B 34/37 |
| 2020/0085516 A1* | 3/2020 | DeFonzo | B25J 9/0087 |
| 2020/0405420 A1* | 12/2020 | Purohit | B25J 9/02 |
| 2021/0030501 A1* | 2/2021 | Eyre | A61B 34/37 |
| 2021/0290324 A1* | 9/2021 | Mintz | A61B 34/35 |
| 2022/0370160 A1* | 11/2022 | Basafa | A61B 90/90 |
| 2023/0011181 A1* | 1/2023 | Sabetian | A61B 34/20 |
| 2023/0114137 A1* | 4/2023 | Wu | A61B 90/57 |
| 2023/0200922 A1* | 6/2023 | Huang | A61B 34/30 |
| 2023/0285097 A1* | 9/2023 | Crosetti | A61B 90/03 |
| 2023/0310099 A1* | 10/2023 | Ye | A61B 90/57 606/1 |
| 2023/0310103 A1* | 10/2023 | Noonan | A61B 90/361 |
| 2023/0310104 A1* | 10/2023 | Alvarez | A61B 34/25 606/1 |
| 2024/0024053 A1* | 1/2024 | Wu | A61B 34/37 |
| 2024/0108428 A1* | 4/2024 | Purohit | A61B 34/37 |
| 2024/0130809 A1* | 4/2024 | Scheunert | A61G 13/1235 |
| 2024/0131723 A1* | 4/2024 | Banerjee | A61B 34/37 |
| 2024/0173088 A1* | 5/2024 | Wu | A61B 90/30 |
| 2024/0227200 A9* | 7/2024 | Banerjee | B25J 9/1689 |
| 2024/0335189 A1* | 10/2024 | Wu | A61B 46/10 |
| 2025/0114157 A1* | 4/2025 | Basafa | A61B 34/70 |
| 2025/0186142 A1* | 6/2025 | Gayet | A61B 90/98 |

FOREIGN PATENT DOCUMENTS

| | | |
|---|---|---|
| WO | 2020/076942 A2 | 4/2020 |
| WO | 2021/021200 A1 | 2/2021 |

OTHER PUBLICATIONS

PCT Written Opinion of the International Searching Authority; PCT/IB2022/056017; Sep. 20, 2022; 4 pages.

* cited by examiner

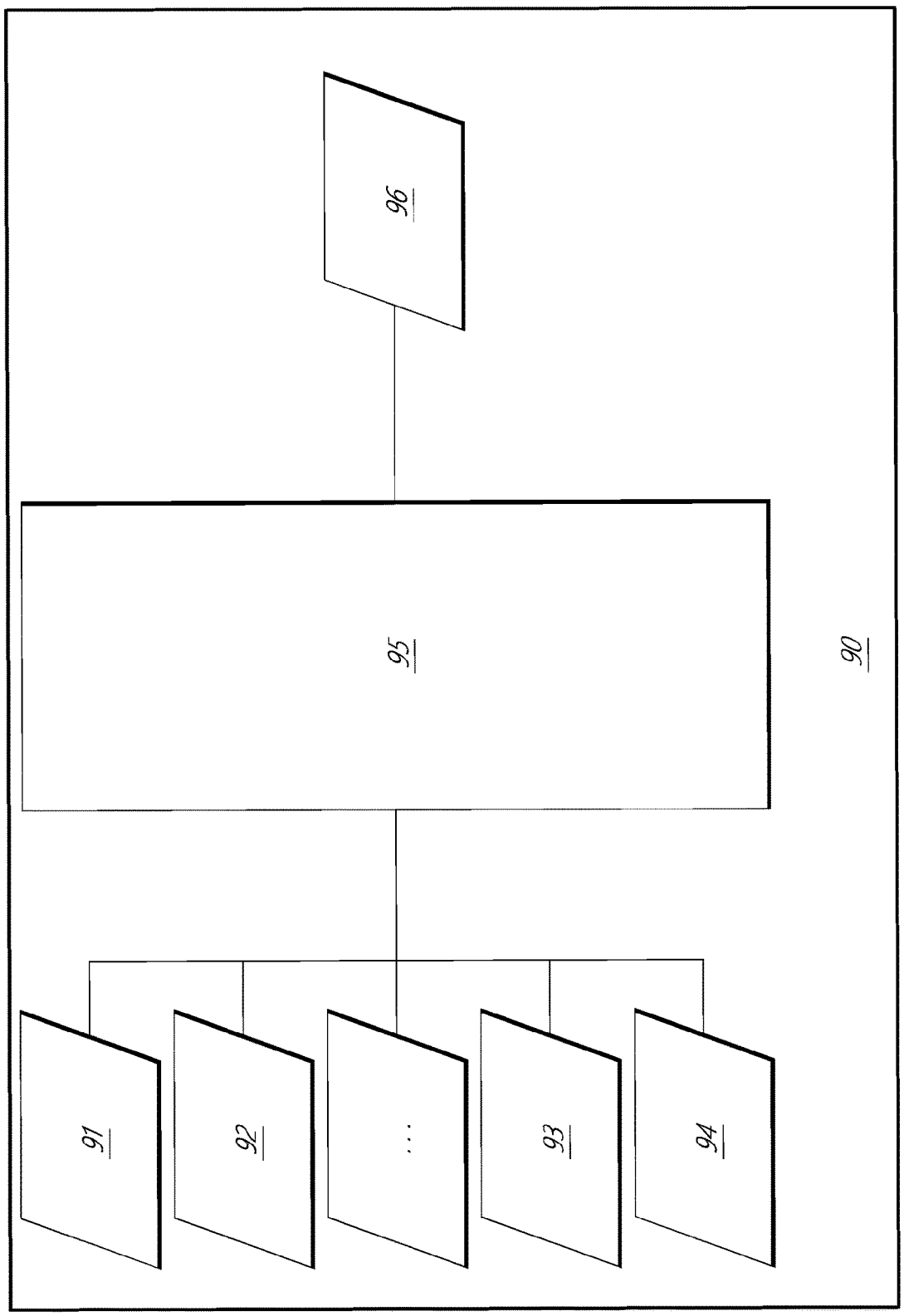

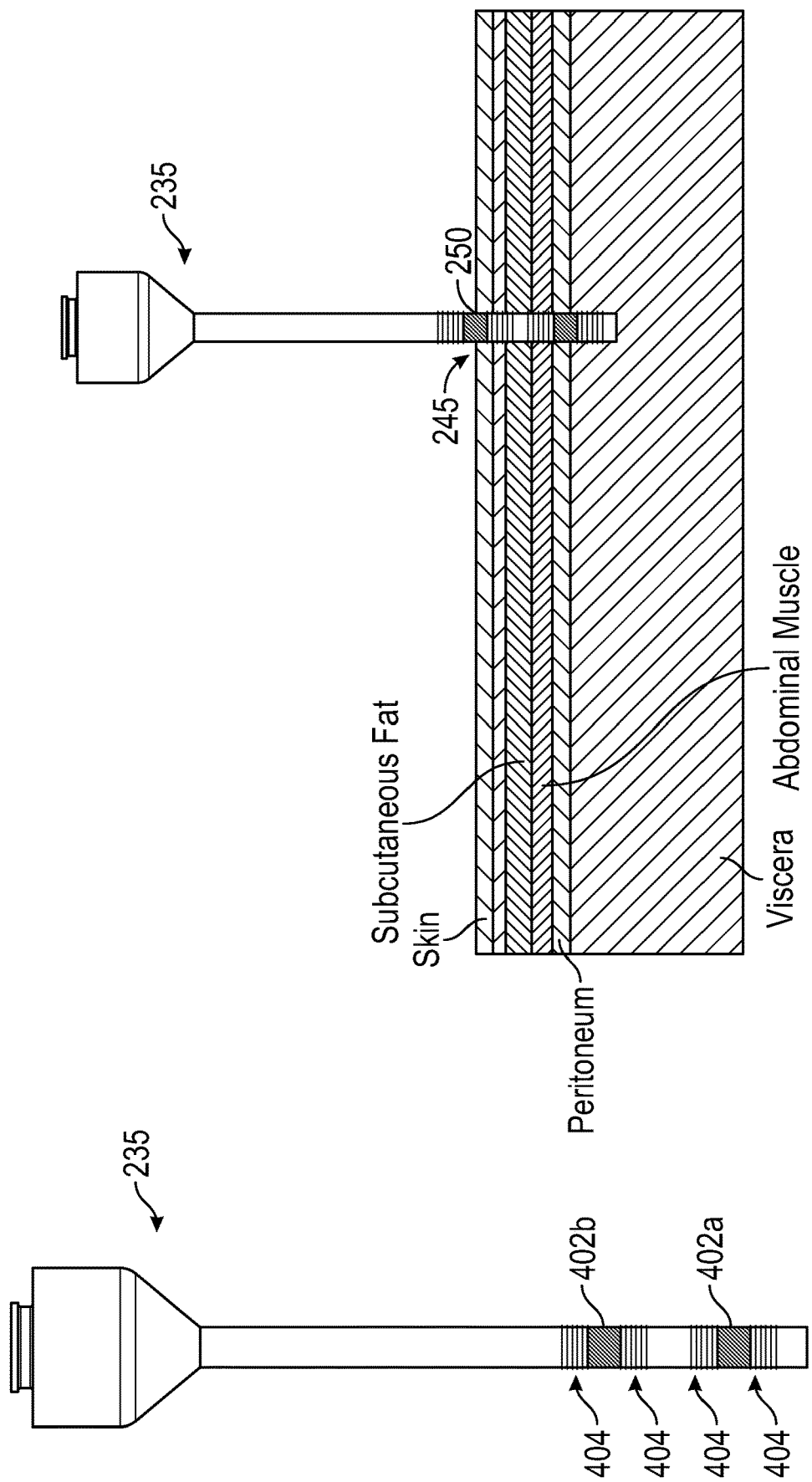

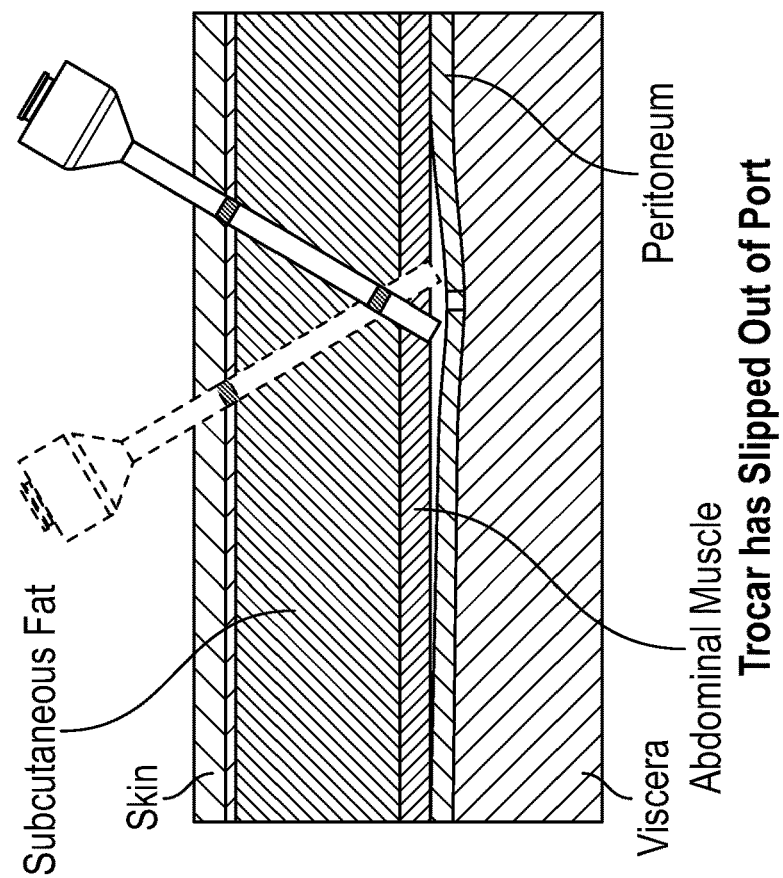
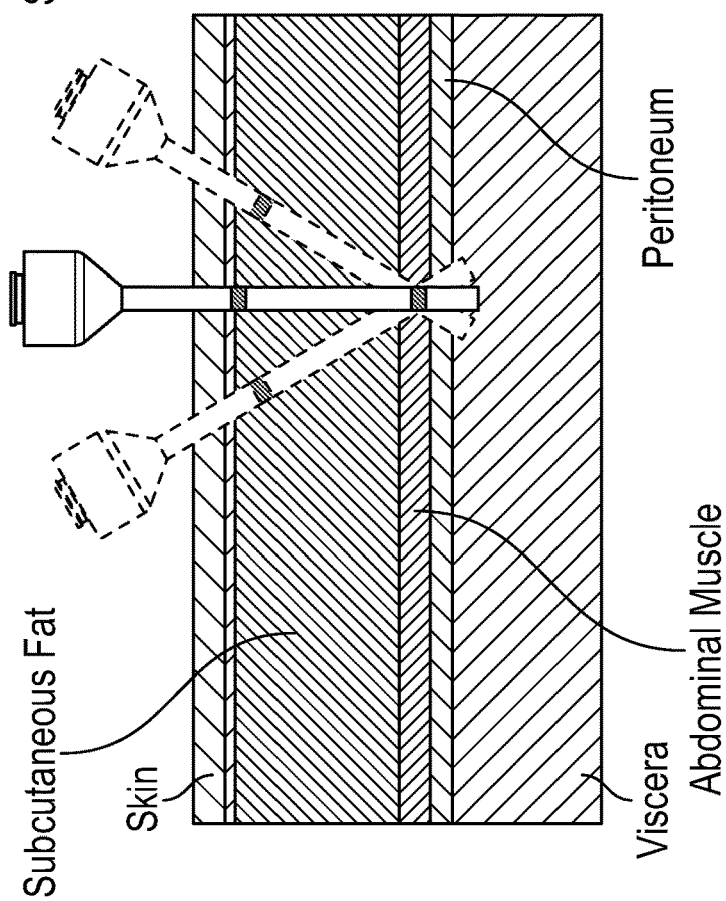

SYSTEM AND METHOD FOR GUIDING ADJUSTMENT OF A REMOTE CENTER IN ROBOTICALLY ASSISTED MEDICAL PROCEDURES

CROSS-REFERENCE TO RELATED APPLICATIONS

This present application is a continuation of International Patent Application PCT/IB2022/056017 filed Jun. 28, 2022 and entitled "SYSTEM AND METHOD FOR GUIDING ADJUSTMENT OF A REMOTE CENTER IN ROBOTICALLY ASSISTED MEDICAL PROCEDURES," which claims priority to U.S. Provisional Application No. 63/217,222 filed Jun. 30, 2021 and entitled, "SYSTEM AND METHOD FOR GUIDING ADJUSTMENT OF A REMOTE CENTER IN ROBOTICALLY ASSISTED MEDICAL PROCEDURES," both of which are incorporated herein by reference in their entirety for all purposes.

TECHNICAL FIELD

The systems and methods disclosed herein are directed to surgical robotics, and more particularly to adjusting a medical device remote center.

BACKGROUND

Medical procedures, such as laparoscopy, may involve accessing and visualizing an internal region of a patient. In a laparoscopic procedure, a medical instrument can be inserted into the internal region through a laparoscopic cannula.

In certain procedures, a robotically enabled medical system may be used to control the insertion and/or manipulation of the medical instrument and end effector. The robotically enabled medical system may enforce a remote center of motion around which the medical instrument and cannula can be rotated.

SUMMARY

The systems, methods and devices of the subject technology disclosed herein each have several innovative aspects, no single one of which is solely responsible for the desirable attributes disclosed herein.

In one aspect, there is provided a robotic medical system for robotic manipulation of a medical tool, comprising: a robotic arm comprising a plurality of links and joints that cooperate to move a medical tool within a three-dimensional space, the robotic arm coupled to an elongated shaft adapted to deploy through a body opening of a patient; and a control unit configured to: determine a control point within the three-dimensional space that corresponds to an intersection between the body opening and a first location of the elongated shaft; cause the first location of the elongated shaft to act as a center of motion when the first location is at the control point and the robotic arm manipulates the medical tool; determine a second location of the elongated shaft at a predetermined distance from the first location; receive an indication that the robotic arm has been placed in a guided mode; responsive to the robotic arm being placed in the guided mode: determine a current orientation of the elongated shaft within the three-dimensional space; enable the robotic arm to be moved such that the second location of the elongated shaft moves toward the control point while movement of the elongated shaft is constrained to the current orientation; fix the second location of the elongated shaft at the control point and terminate the guided mode when the second location of the elongated shaft is at the control point; and cause, after the guided mode is terminated, the second location of the elongated shaft to act as a center of motion for the elongated shaft when the robotic arm manipulates the medical tool.

According to various implementations, the system may further comprise a visual alert component coupled to the robotic arm, wherein the control unit is further configured to: cause the visual alert component to activate a visual alert responsive to the robotic arm being placed in the guided mode and while movement of the robotic arm is enabled; and deactivate the visual alert component responsive to the guided mode being terminated. In some implementations, the system may comprise an auditory alert component associated with the robotic arm, wherein the control unit is further configured to: periodically cause the auditory alert component to activate an auditory alert responsive to the robotic arm being placed in the guided mode and while movement of the robotic arm is enabled; and deactivate the auditory alert component responsive to the guided mode being terminated.

According to various implementations, a method for guiding adjustment of a remote center comprises: robotically facilitating movement of a robotic arm comprising a plurality of links and joints that cooperate to move a medical tool within a three-dimensional space, the robotic arm coupled to an elongated shaft adapted to deploy through a body opening of a patient; determining a control point within the three-dimensional space that corresponds to an intersection between the body opening and a first location of the elongated shaft; causing the first location of the elongated shaft to act as a center of motion for the elongated shaft when the robotic arm manipulates the medical tool; determining a second location of the elongated shaft a predetermined distance from the first location; receiving an indication that the robotic arm has been placed in a guided mode; responsive to the robotic arm being placed in the guided mode: determining a current orientation of the elongated shaft within the three-dimensional space; enabling the robotic arm to move the second location of the elongated shaft toward the control point while movement of the elongated shaft is constrained to the current orientation; fixing the second location at the control point and terminating the guided mode when the second location is at the control point; and causing, after the guided mode is terminated, the second location of the elongated shaft to act as a center of motion for the elongated shaft when the robotic arm manipulates the medical tool.

According to various implementations, a medical robotic system comprises at least one robotic arm coupled to an instrument and docked to a cannula, the cannula including a first location of the cannula and a second location of the cannula, wherein the at least one robotic arm is capable of entering a guided mode whereby a remote center of motion changes from the first location of the cannula to the second location of the cannula, and wherein an alert associated with the guided mode informs a user of entry into the guided mode.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 20 depicts a block diagram illustrating a localization system that estimates a location of one or more elements of the robotic systems of FIGS. 1-10, such as the location of the instrument of FIGS. 16-18, in accordance with an example implementation.

FIGS. 24A through 24D, illustrate a cannula with distinct markings for identifying a remote center of motion and a proximity to the RCM in accordance with aspects of the subject technology disclosed herein.

DETAILED DESCRIPTION

1. Overview

Aspects of the present disclosure may be integrated into a robotically enabled medical system capable of performing a variety of medical procedures, including both minimally invasive, such as laparoscopy, and non-invasive, such as endoscopy, procedures. Among endoscopic procedures, the system may be capable of performing bronchoscopy, ureteroscopy, gastroscopy, etc.

In addition to performing the breadth of procedures, the system may provide additional benefits, such as enhanced imaging and guidance to assist the physician. Additionally, the system may provide the physician with the ability to perform the procedure from an ergonomic position without the need for awkward arm motions and positions. Still further, the system may provide the physician with the ability to perform the procedure with improved ease of use such that one or more of the instruments of the system can be controlled by a single user.

Various implementations will be described below in conjunction with the drawings for purposes of illustration. It should be appreciated that many other implementations of the disclosed concepts are possible, and various advantages can be achieved with the disclosed implementations. Headings are included herein for reference and to aid in locating various sections. These headings are not intended to limit the scope of the concepts described with respect thereto. Such concepts may have applicability throughout the entire specification.

A. Robotic System—Cart.

Figure 1:
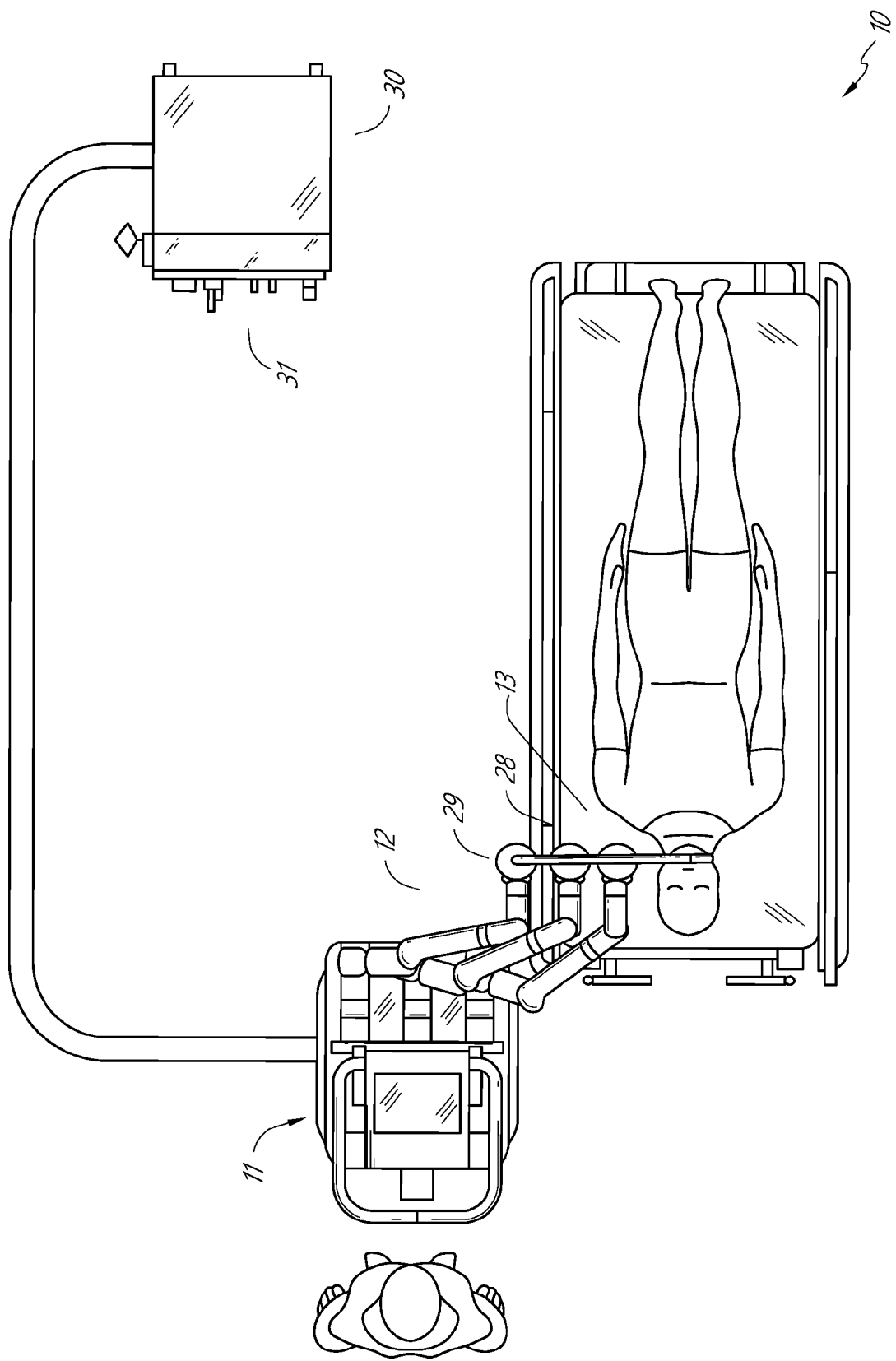
FIG. 1 illustrates an example implementation of a cart-based robotic system arranged for diagnostic and/or therapeutic bronchoscopy.
Figure 2:
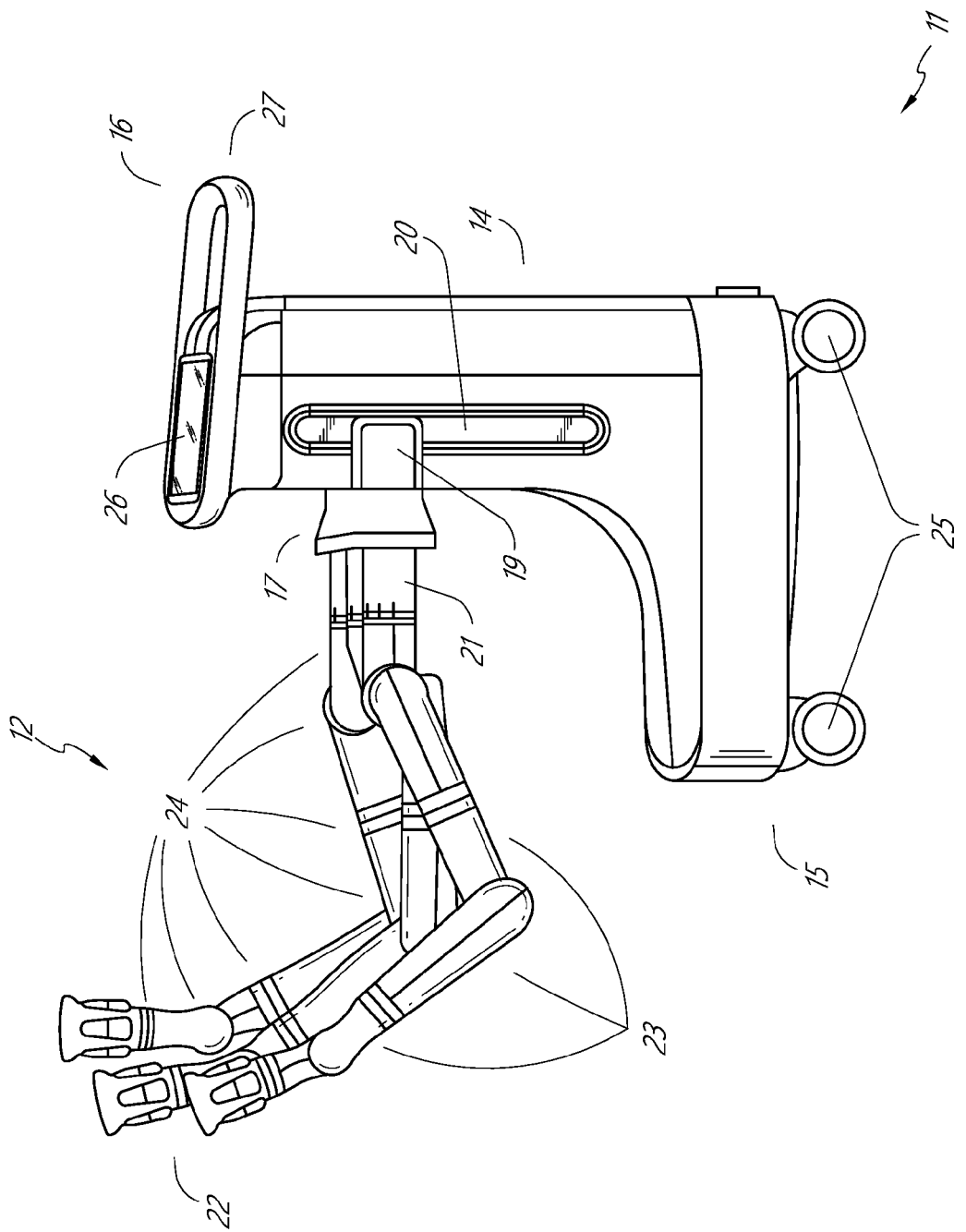
FIG. 2 depicts further aspects of the robotic system of FIG. 1.

The robotically enabled medical system may be configured in a variety of ways depending on the particular procedure. FIG. 1 illustrates an implementation of a cart-based robotically enabled system 10 arranged for a diagnostic and/or therapeutic bronchoscopy. During a bronchoscopy, the system 10 may comprise a cart 11 having one or more robotic arms 12 to deliver a medical instrument, such as a steerable endoscope 13, which may be a procedure-specific bronchoscope for bronchoscopy, to a natural orifice access point (i.e., the mouth of the patient positioned on a table in the present example) to deliver diagnostic and/or therapeutic tools. As shown, the cart 11 may be positioned proximate to the patient's upper torso to provide access to the access point. Similarly, the robotic arms 12 may be actuated to position the bronchoscope relative to the access point. The arrangement in FIG. 1 may also be utilized when performing a gastro-intestinal (GI) procedure with a gastroscope, a specialized endoscope for GI procedures. FIG. 2 depicts an example implementation of the cart in greater detail.

With continued reference to FIG. 1, once the cart 11 is properly positioned, the robotic arms 12 may insert the steerable endoscope 13 into the patient robotically, manually, or a combination thereof. As shown, the steerable endoscope 13 may comprise at least two telescoping parts, such as an inner leader portion and an outer sheath portion, each portion coupled to a separate instrument driver from the set of instrument drivers 28, each instrument driver coupled to the distal end of an individual robotic arm. This linear arrangement of the instrument drivers 28, which facilitates coaxially aligning the leader portion with the sheath portion, creates a "virtual rail" 29 that may be repositioned in space by manipulating the one or more robotic arms 12 into different angles and/or positions. The virtual rails described herein are depicted in the Figures using dashed lines, and accordingly the dashed lines do not depict any physical structure of the system. Translation of the instrument drivers 28 along the virtual rail 29 telescopes the inner leader portion relative to the outer sheath portion or advances or retracts the endoscope 13 from the patient. The angle of the virtual rail 29 may be adjusted, translated, and pivoted based on clinical application or physician preference. For example, in bronchoscopy, the angle and position of the virtual rail 29 as shown represents a compromise between providing physician access to the endoscope 13 while minimizing friction that results from bending the endoscope 13 into the patient's mouth.

The endoscope 13 may be directed down the patient's trachea and lungs after insertion using precise commands from the robotic system until reaching the target destination or operative site. In order to enhance navigation through the patient's lung network and/or reach the desired target, the endoscope 13 may be manipulated to telescopically extend the inner leader portion from the outer sheath portion to obtain enhanced articulation and greater bend radius. The use of separate instrument drivers 28 also allows the leader portion and sheath portion to be driven independently of each other.

For example, the endoscope 13 may be directed to deliver a biopsy needle to a target, such as, for example, a lesion or nodule within the lungs of a patient. The needle may be deployed down a working channel that runs the length of the endoscope to obtain a tissue sample to be analyzed by a pathologist. Depending on the pathology results, additional tools may be deployed down the working channel of the endoscope for additional biopsies. After identifying a nodule to be malignant, the endoscope 13 may endoscopically deliver tools to resect the potentially cancerous tissue. In some instances, diagnostic and therapeutic treatments can be delivered in separate procedures. In those circumstances, the endoscope 13 may also be used to deliver a fiducial to "mark" the location of the target nodule as well. In other instances, diagnostic and therapeutic treatments may be delivered during the same procedure.

The system 10 may also include a tower 30, which may be connected via support cables to the cart 11 to provide support for controls, electronics, fluidics, optics, sensors, and/or power to the cart 11. According to various implementations, tower 30 may function as or include a control unit for operation of various components of the robotic system, including the robotic arm(s) described herein. Placing such functionality in the tower 30 may allow for a smaller form factor cart 11 that may be more easily adjusted and/or repositioned by an operating physician and his/her staff. Additionally, the division of functionality between the cart/table and the support tower 30 reduces operating room clutter and facilitates improving clinical workflow. While the cart 11 may be positioned close to the patient, the tower 30 may be stowed in a remote location to stay out of the way during a procedure. In some implementations, tower 30 may be movable.

In support of the robotic systems described above, the tower 30 may include component(s) of a computer-based control system that stores computer program instructions, for example, within a non-transitory computer-readable storage medium such as a persistent magnetic storage drive, solid state drive, etc. The execution of those instructions, whether the execution occurs in the tower 30 or the cart 11, may control the entire system or sub-system(s) thereof. For example, when executed by a processor of the computer system, the instructions may cause the components of the robotics system to actuate the relevant carriages and arm mounts, actuate the robotics arms, and control the medical instruments. For example, in response to receiving the control signal, the motors in the joints of the robotics arms may position the arms into a certain posture.

The tower 30 may also include a pump, flow meter, valve control, and/or fluid access to provide controlled irrigation and aspiration capabilities to the system that may be deployed through the endoscope 13. These components may also be controlled using the computer system of the tower 30. In some implementations, irrigation and aspiration capabilities may be delivered directly to the endoscope 13 through separate cable(s).

The tower 30 may include a voltage and surge protector designed to provide filtered and protected electrical power to the cart 11, thereby avoiding placement of a power transformer and other auxiliary power components in the cart 11, resulting in a smaller, more moveable cart 11.

The tower 30 may also include support equipment for the sensors deployed throughout the robotic system 10. For example, the tower 30 may include optoelectronics equipment for detecting, receiving, and processing data received from the optical sensors or cameras throughout the robotic system 10. In combination with the control system, such optoelectronics equipment may be used to generate real-time images for display in any number of consoles deployed throughout the system, including in the tower 30. Similarly, the tower 30 may also include an electronic subsystem for receiving and processing signals received from deployed electromagnetic (EM) sensors. The tower 30 may also be used to house and position an EM field generator for detection by EM sensors in or on the medical instrument.

The tower 30 may also include a console 31 in addition to other consoles available in the rest of the system, e.g., console mounted on top of the cart. The console 31 may include a user interface and a display screen, such as a touchscreen, for the physician operator. Consoles in the system 10 are generally designed to provide both robotic controls as well as preoperative and real-time information of the procedure, such as navigational and localization information of the endoscope 13. When the console 31 is not the only console available to the physician, it may be used by a second operator, such as a nurse, to monitor the health or vitals of the patient and the operation of the system 10, as well as to provide procedure-specific data, such as navigational and localization information. In other implementations, the console 30 is housed in a body that is separate from the tower 30.

The tower 30 may be coupled to the cart 11 and endoscope 13 through one or more cables or connections (not shown). In some implementations, the support functionality from the tower 30 may be provided through a single cable to the cart 11, simplifying and de-cluttering the operating room. In other implementations, specific functionality may be coupled in separate cabling and connections. For example, while power may be provided through a single power cable to the cart 11, the support for controls, optics, fluidics, and/or navigation may be provided through a separate cable.

FIG. 2 provides a detailed illustration of an implementation of the cart 11 from the cart-based robotically enabled system shown in FIG. 1. The cart 11 generally includes an elongated support structure 14 (often referred to as a "column"), a cart base 15, and a console 16 at the top of the column 14. The column 14 may include one or more carriages, such as a carriage 17 (also referred to as an "arm support") for supporting the deployment of one or more robotic arms 12 (three shown in FIG. 2). The carriage 17 may include individually configurable arm mounts that rotate along a perpendicular axis to adjust the base of the robotic arms 12 for better positioning relative to the patient. The carriage 17 also includes a carriage interface 19 that allows the carriage 17 to vertically translate along the column 14.

The carriage interface 19 is connected to the column 14 through slots, such as slot 20, that are positioned on opposite sides of the column 14 to guide the vertical translation of the carriage 17. The slot 20 contains a vertical translation interface to position and hold the carriage 17 at various vertical heights relative to the cart base 15. Vertical translation of the carriage 17 allows the cart 11 to adjust the reach of the robotic arms 12 to meet a variety of table heights, patient sizes, and physician preferences. Similarly, the individually configurable arm mounts on the carriage 17 allow the robotic arm base 21 of the robotic arms 12 to be angled in a variety of configurations.

In some implementations, the slot 20 may be supplemented with slot covers that are flush and parallel to the slot surface to prevent dirt and fluid ingress into the internal chambers of the column 14 and the vertical translation interface as the carriage 17 vertically translates. The slot covers may be deployed through pairs of spring spools positioned near the vertical top and bottom of the slot 20. The covers are coiled within the spools until deployed to extend and retract from their coiled state as the carriage 17 vertically translates up and down. The spring-loading of the spools provides force to retract the cover into a spool when the carriage 17 translates towards the spool, while also maintaining a tight seal when the carriage 17 translates away from the spool. The covers may be connected to the carriage 17 using, for example, brackets in the carriage interface 19 to ensure proper extension and retraction of the cover as the carriage 17 translates.

The column 14 may internally comprise mechanisms, such as gears and motors, that are designed to use a vertically aligned lead screw to translate the carriage 17 in a mechanized fashion in response to control signals generated in response to user inputs, e.g., inputs from the console 16.

The robotic arms 12 may generally comprise robotic arm bases 21 and end effectors 22, separated by a series of linkages 23 that are connected by a series of joints 24, each joint comprising an independent actuator, each actuator comprising an independently controllable motor. Each independently controllable joint represents an independent degree-of-freedom (DoF) available to the robotic arm 12. Each of the robotic arms 12 may have seven joints, and thus provide seven degrees of freedom. A multitude of joints result in a multitude of degrees of freedom, allowing for "redundant" degrees of freedom. Having redundant degrees of freedom allows the robotic arms 12 to position their respective end effectors 22 at a specific position, orientation, and trajectory in space using different linkage positions and joint angles. This allows for the system to position and direct a medical instrument from a desired point in space while allowing the physician to move the arm joints into a clinically advantageous position away from the patient to create greater access, while avoiding arm collisions.

The cart base 15 balances the weight of the column 14, carriage 17, and robotic arms 12 over the floor. Accordingly, the cart base 15 houses heavier components, such as electronics, motors, power supply, as well as components that either enable movement and/or immobilize the cart 11. For example, the cart base 15 includes rollable wheel-shaped casters 25 that allow for the cart 11 to easily move around the room prior to a procedure. After reaching the appropriate position, the casters 25 may be immobilized using wheel locks to hold the cart 11 in place during the procedure.

Positioned at the vertical end of the column 14, the console 16 allows for both a user interface for receiving user input and a display screen (or a dual-purpose device such as, for example, a touchscreen 26) to provide the physician user with both preoperative and intraoperative data. Potential preoperative data on the touchscreen 26 may include preoperative plans, navigation and mapping data derived from preoperative computerized tomography (CT) scans, and/or notes from preoperative patient interviews. Intraoperative data on display may include optical information provided from the tool, sensor and coordinate information from sensors, as well as vital patient statistics, such as respiration, heart rate, and/or pulse. The console 16 may be positioned and tilted to allow a physician to access the console 16 from the side of the column 14 opposite the carriage 17. From this position, the physician may view the console 16, robotic arms 12, and patient while operating the console 16 from behind the cart 11. As shown, the console 16 also includes a handle 27 to assist with maneuvering and stabilizing the cart 11.

Figure 3:
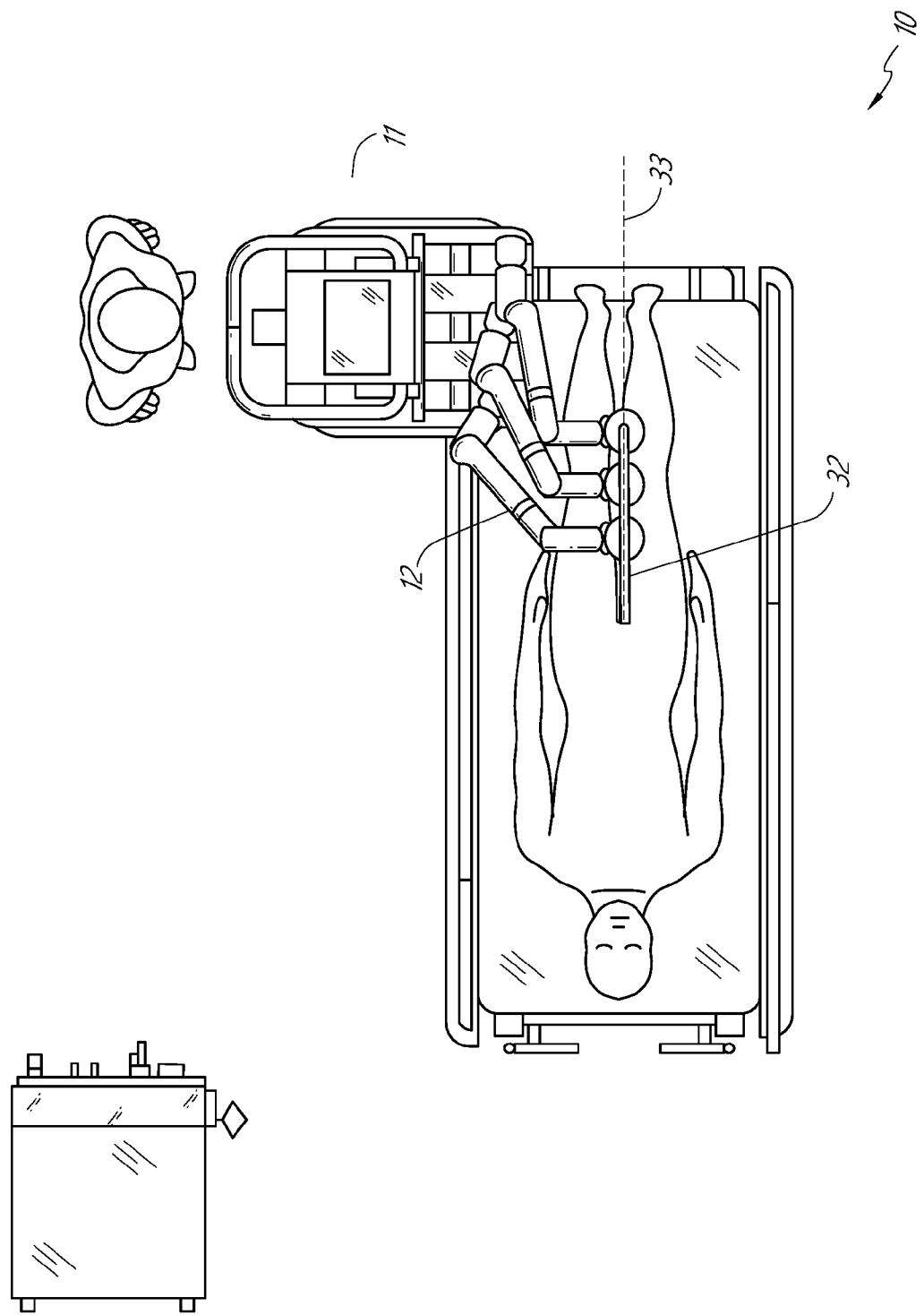
FIG. 3 illustrates an example implementation of the robotic system of FIG. 1 arranged for ureteroscopy.

FIG. 3 illustrates an implementation of a robotically enabled system 10 arranged for ureteroscopy. In a ureteroscopic procedure, the cart 11 may be positioned to deliver a ureteroscope 32, a procedure-specific endoscope designed to traverse a patient's urethra and ureter, to the lower abdominal area of the patient. In a ureteroscopy, it may be desirable for the ureteroscope 32 to be directly aligned with the patient's urethra to reduce friction and forces on the sensitive anatomy in the area. As shown, the cart 11 may be aligned at the foot of the table to allow the robotic arms 12 to position the ureteroscope 32 for direct linear access to the patient's urethra. From the foot of the table, the robotic arms 12 may insert the ureteroscope 32 along the virtual rail 33 directly into the patient's lower abdomen through the urethra.

After insertion into the urethra, using similar control techniques as in bronchoscopy, the ureteroscope 32 may be navigated into the bladder, ureters, and/or kidneys for diagnostic and/or therapeutic applications. For example, the ureteroscope 32 may be directed into the ureter and kidneys to break up kidney stone build up using a laser or ultrasonic lithotripsy device deployed down the working channel of the ureteroscope 32. After lithotripsy is complete, the resulting stone fragments may be removed using baskets deployed down the ureteroscope 32.

Figure 4:
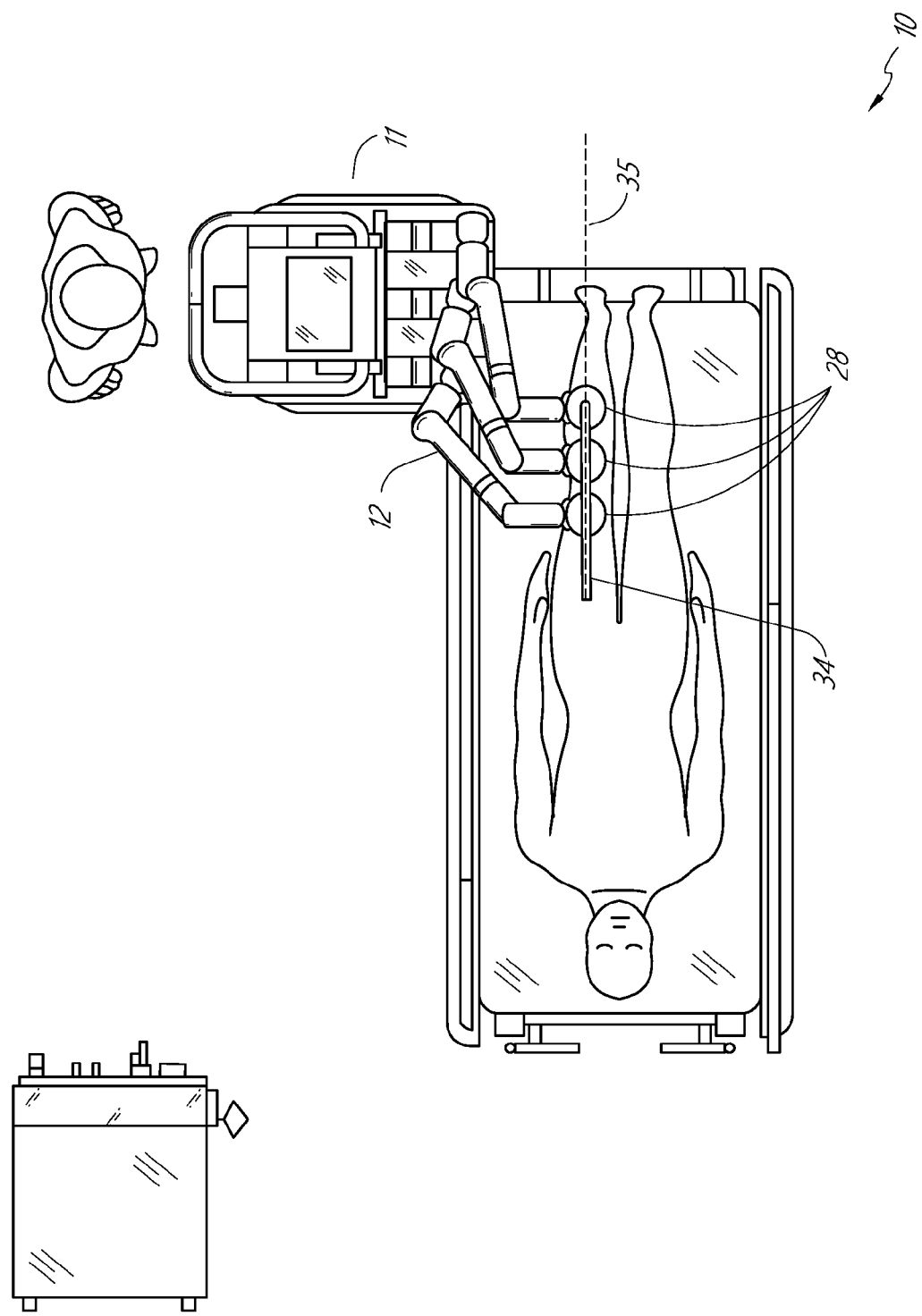
FIG. 4 illustrates an example implementation of the robotic system of FIG. 1 arranged for a vascular procedure.

FIG. 4 illustrates an implementation of a robotically enabled system 10 similarly arranged for a vascular procedure. In a vascular procedure, the system 10 may be configured such that the cart 11 may deliver a medical instrument 34, such as a steerable catheter, to an access point in the femoral artery in the patient's leg. The femoral artery presents both a larger diameter for navigation as well as a relatively less circuitous and tortuous path to the patient's heart, which simplifies navigation. As in a ureteroscopic procedure, the cart 11 may be positioned towards the patient's legs and lower abdomen to allow the robotic arms 12 to provide a virtual rail 35 with direct linear access to the femoral artery access point in the patient's thigh/hip region. After insertion into the artery, the medical instrument 34 may be directed and inserted by translating the instrument drivers 28. Additionally or in the alternative, the cart may be positioned around the patient's upper abdomen to reach alternative vascular access points, such as, for example, the carotid and brachial arteries near the shoulder and wrist.

B. Robotic System—Table.

Figure 5:
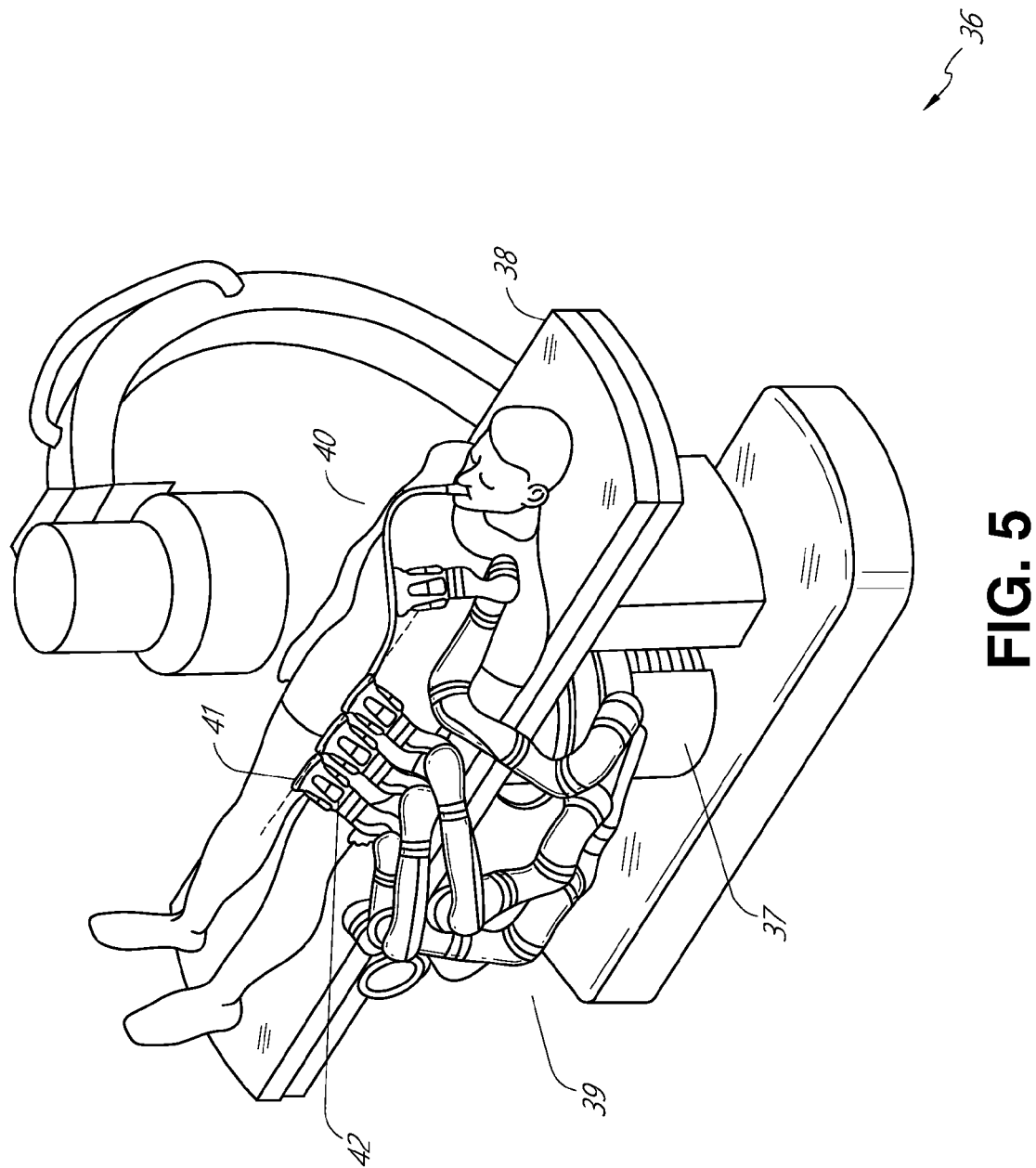
FIG. 5 illustrates an example implementation of a table-based robotic system arranged for a bronchoscope procedure.

Implementations of the robotically enabled medical system may also incorporate the patient's table. Incorporation of the table reduces the amount of capital equipment within the operating room by removing the cart, which allows greater access to the patient. FIG. 5 illustrates an implementation of such a robotically enabled system arranged for a bronchoscopic procedure. System 36 includes a support structure or column 37 for supporting platform 38 (shown as a "table" or "bed") over the floor. Much like in the cart-based systems, the end effectors of the robotic arms 39 of the system 36 comprise instrument drivers 42 that are designed to manipulate an elongated medical instrument, such as a bronchoscope 40 in FIG. 5, through or along a virtual rail 41 formed from the linear alignment of the instrument drivers 42. In practice, a C-arm for providing fluoroscopic imaging may be positioned over the patient's upper abdominal area by placing the emitter and detector around the table 38.

Figure 6:
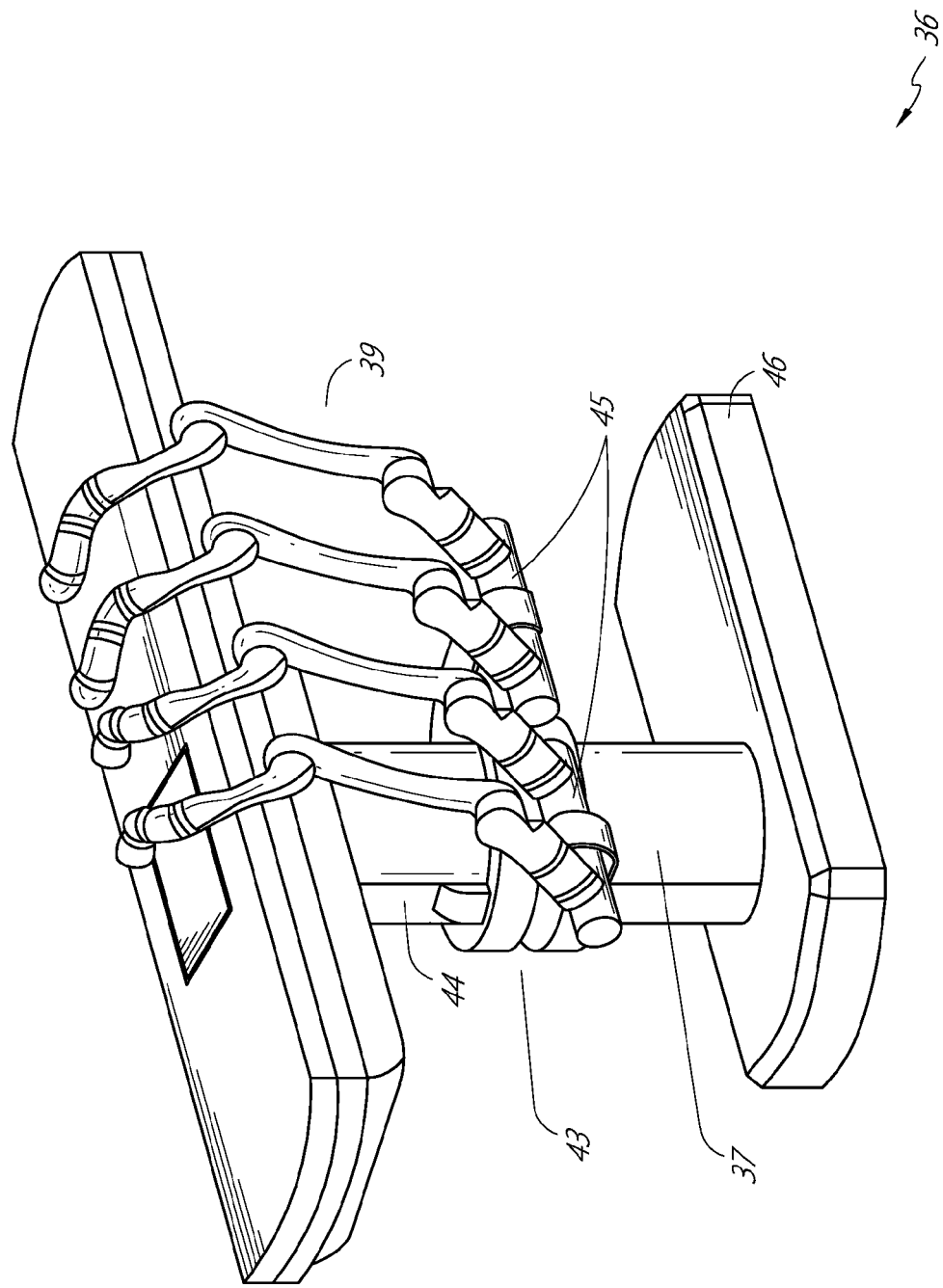
FIG. 6 provides a second view of the robotic system of FIG. 5.

FIG. 6 provides a second example view of the system 36 without the patient and medical instrument for discussion purposes. As shown, the column 37 may include one or more carriages 43 shown as ring-shaped in the system 36, from which the one or more robotic arms 39 may be based. The carriages 43 may translate along a vertical column interface 44 that runs the length of the column 37 to provide different vantage points from which the robotic arms 39 may be positioned to reach the patient. The carriage(s) 43 may rotate around the column 37 using a mechanical motor positioned within the column 37 to allow the robotic arms 39 to have access to multiples sides of the table 38, such as, for example, both sides of the patient. In implementations with multiple carriages, the carriages may be individually positioned on the column and may translate and/or rotate independently of the other carriages. While the carriages 43 need not surround the column 37 or even be circular, the ring-shape as shown facilitates rotation of the carriages 43 around the column 37 while maintaining structural balance. Rotation and translation of the carriages 43 allows the system 36 to align the medical instruments, such as endoscopes and laparoscopes, into different access points on the patient. In other implementations (not shown), the system 36 can include a patient table or bed with adjustable arm supports in the form of bars or rails extending alongside it. One or more robotic arms 39 (e.g., via a shoulder with an elbow joint) can be attached to the adjustable arm supports, which can be vertically adjusted. By providing vertical adjustment, the robotic arms 39 are advantageously capable of being stowed compactly beneath the patient table or bed, and subsequently raised during a procedure.

Figure 9:
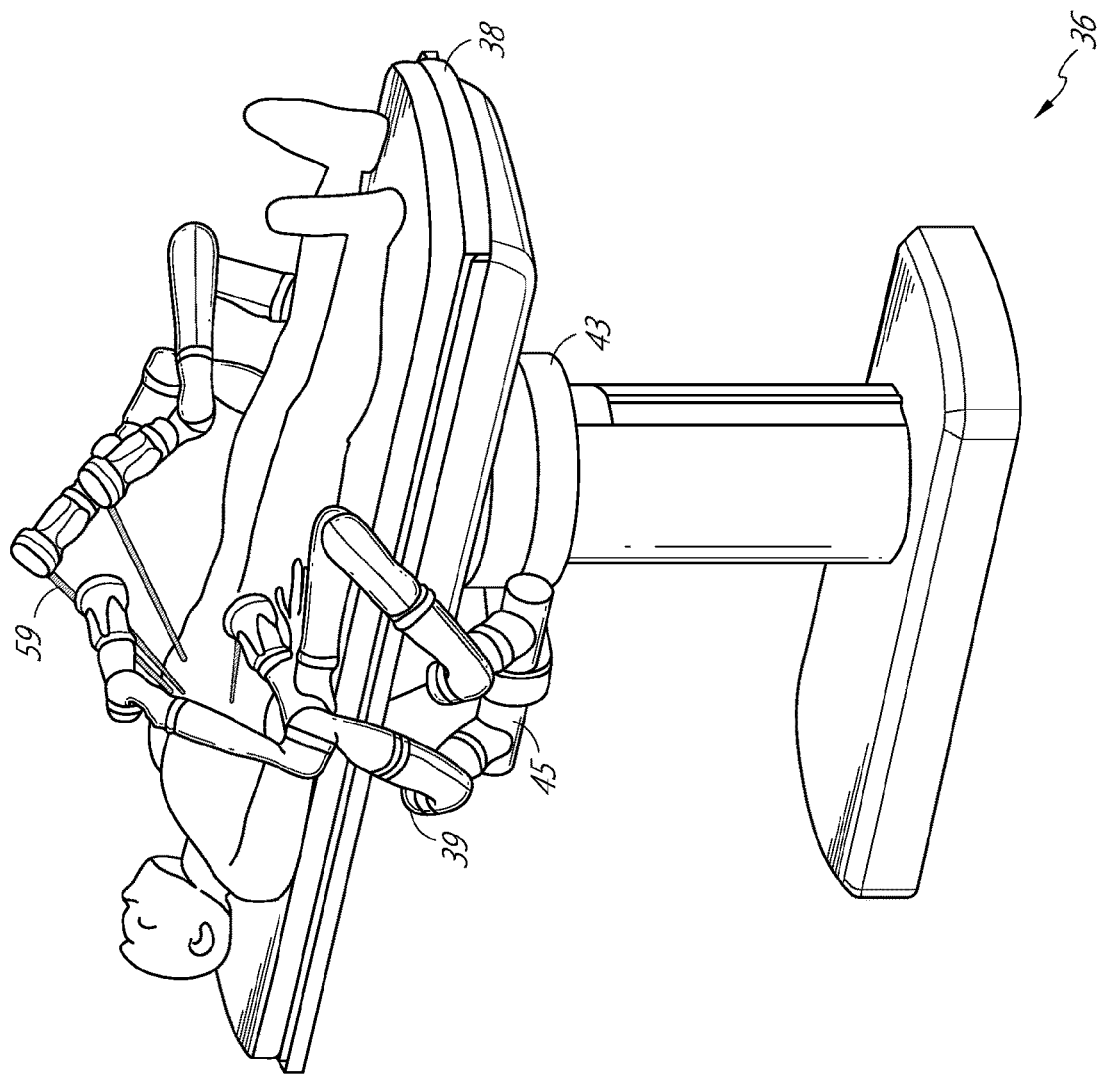
FIG. 9 illustrates an example implementation of a table-based robotic system configured for a laparoscopic procedure.

The robotic arms 39 may be mounted on the carriages 43 through a set of arm mounts 45 comprising a series of joints that may individually rotate and/or telescopically extend to provide additional configurability to the robotic arms 39. Additionally, the arm mounts 45 may be positioned on the carriages 43 such that, when the carriages 43 are appropriately rotated, the arm mounts 45 may be positioned on either the same side of the table 38 (as shown in FIG. 6), on opposite sides of the table 38 (as shown in FIG. 9), or on adjacent sides of the table 38 (not shown).

The column 37 structurally provides support for the table 38, and a path for vertical translation of the carriages 43. Internally, the column 37 may be equipped with lead screws for guiding vertical translation of the carriages, and motors to mechanize the translation of the carriages 43 based the lead screws. The column 37 may also convey power and control signals to the carriages 43 and the robotic arms 39 mounted thereon.

The table base 46 serves a similar function as the cart base 15 in the cart 11 shown in FIG. 2, housing heavier components to balance the table/bed 38, the column 37, the carriages 43, and the robotic arms 39. The table base 46 may also incorporate rigid casters to provide stability during procedures. Deployed from the bottom of the table base 46, the casters may extend in opposite directions on both sides of the base 46 and retract when the system 36 needs to be moved.

With continued reference to FIG. 6, the system 36 may also include a tower (not shown) that divides the functionality of the system 36 between the table and the tower to reduce the form factor and bulk of the table. As in earlier disclosed implementations, the tower may provide a variety of support functionalities to the table, such as processing, computing, and control capabilities, power, fluidics, and/or optical and sensor processing. The tower may also be movable to be positioned away from the patient to improve physician access and de-clutter the operating room. Additionally, placing components in the tower allows for more storage space in the table base 46 for potential stowage of the robotic arms 39. The tower may also include a master controller or console that provides both a user interface for user input, such as keyboard and/or pendant, as well as a display screen (or touchscreen) for preoperative and intraoperative information, such as real-time imaging, navigation, and tracking information. In some implementations, the tower may also contain holders for gas tanks to be used for insufflation.

Figure 7:
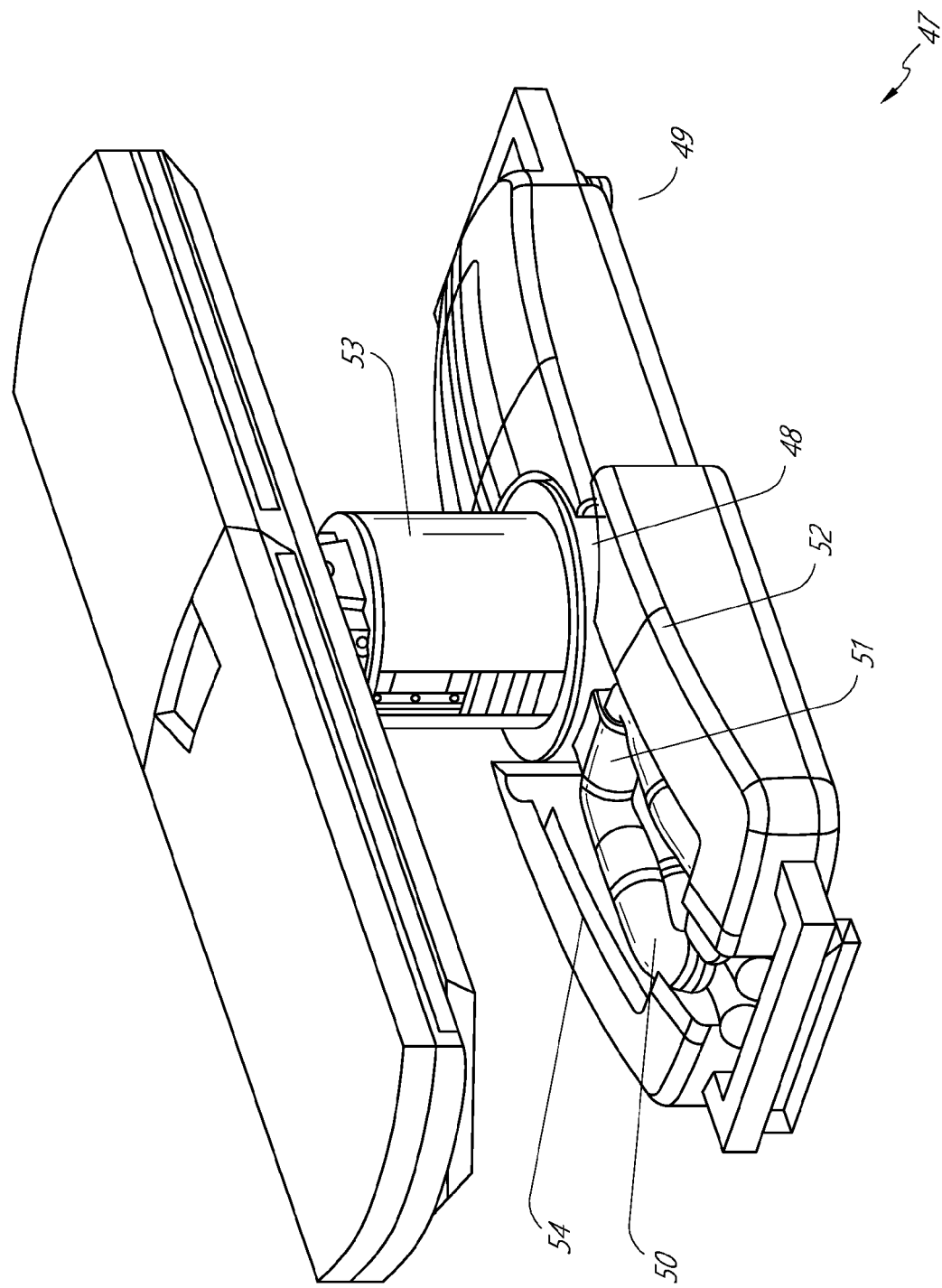
FIG. 7 illustrates an example system configured to stow robotic arm(s).

In some implementations, a table base may stow and store the robotic arms when not in use. FIG. 7 illustrates a system 47 that stows robotic arms in an implementation of the table-based system. In the system 47, carriages 48 may be vertically translated into base 49 to stow robotic arms 50, arm mounts 51, and the carriages 48 within the base 49. Base covers 52 may be translated and retracted open to deploy the carriages 48, arm mounts 51, and robotic arms 50 around column 53, and closed to stow to protect them when not in use. The base covers 52 may be sealed with a membrane 54 along the edges of its opening to prevent dirt and fluid ingress when closed.

Figure 8:
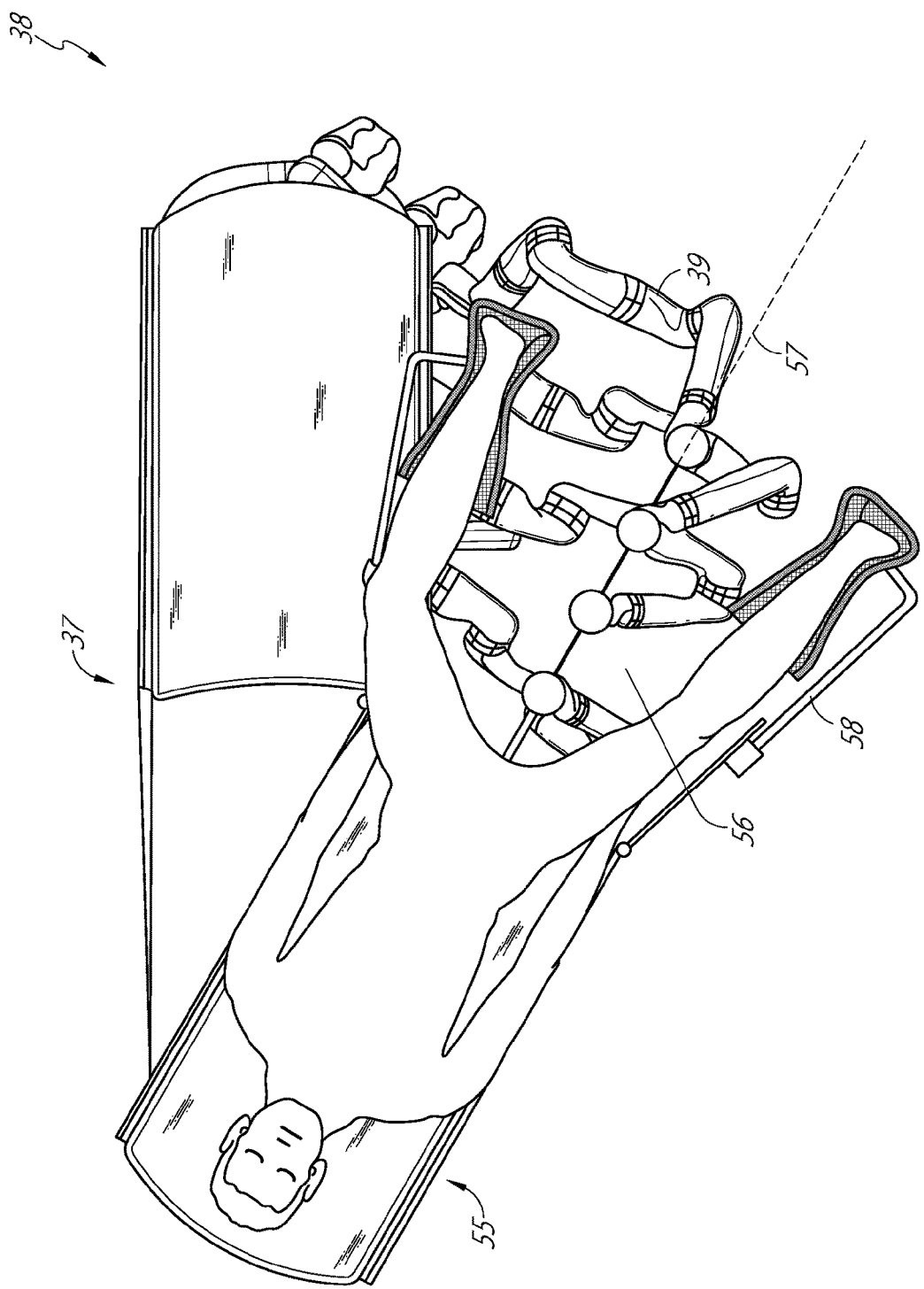
FIG. 8 illustrates an example implementation of a table-based robotic system configured for a ureteroscopic procedure.

FIG. 8 illustrates an implementation of a robotically enabled table-based system configured for a ureteroscopic procedure. In a ureteroscopy, the table 38 may include a swivel portion 55 for positioning a patient off-angle from the column 37 and table base 46. The swivel portion 55 may rotate or pivot around a pivot point (e.g., located below the patient's head) to position the bottom portion of the swivel portion 55 away from the column 37. For example, the pivoting of the swivel portion 55 allows a C-arm (not shown) to be positioned over the patient's lower abdomen without competing for space with the column (not shown) below table 38. By rotating the carriage 35 (not shown) around the column 37, the robotic arms 39 may directly insert a ureteroscope 56 along a virtual rail 57 into the patient's groin area to reach the urethra. In a ureteroscopy, stirrups 58 may also be fixed to the swivel portion 55 of the table 38 to support the position of the patient's legs during the procedure and allow clear access to the patient's groin area.

In a laparoscopic procedure, through small incision(s) in the patient's abdominal wall, minimally invasive instruments may be inserted into the patient's anatomy. In some implementations, the minimally invasive instruments comprise an elongated rigid member, such as a shaft, which is used to access anatomy within the patient. After inflation of the patient's abdominal cavity, the instruments may be directed to perform surgical or medical tasks, such as grasping, cutting, ablating, suturing, etc. In some implementations, the instruments can comprise a scope, such as a laparoscope. FIG. 9 illustrates an implementation of a robotically enabled table-based system configured for a laparoscopic procedure. As shown in FIG. 9, the carriages 43 of the system 36 may be rotated and vertically adjusted to position pairs of the robotic arms 39 on opposite sides of the table 38, such that instrument 59 may be positioned using the arm mounts 45 to be passed through minimal incisions on both sides of the patient to reach his/her abdominal cavity.

Figure 10:
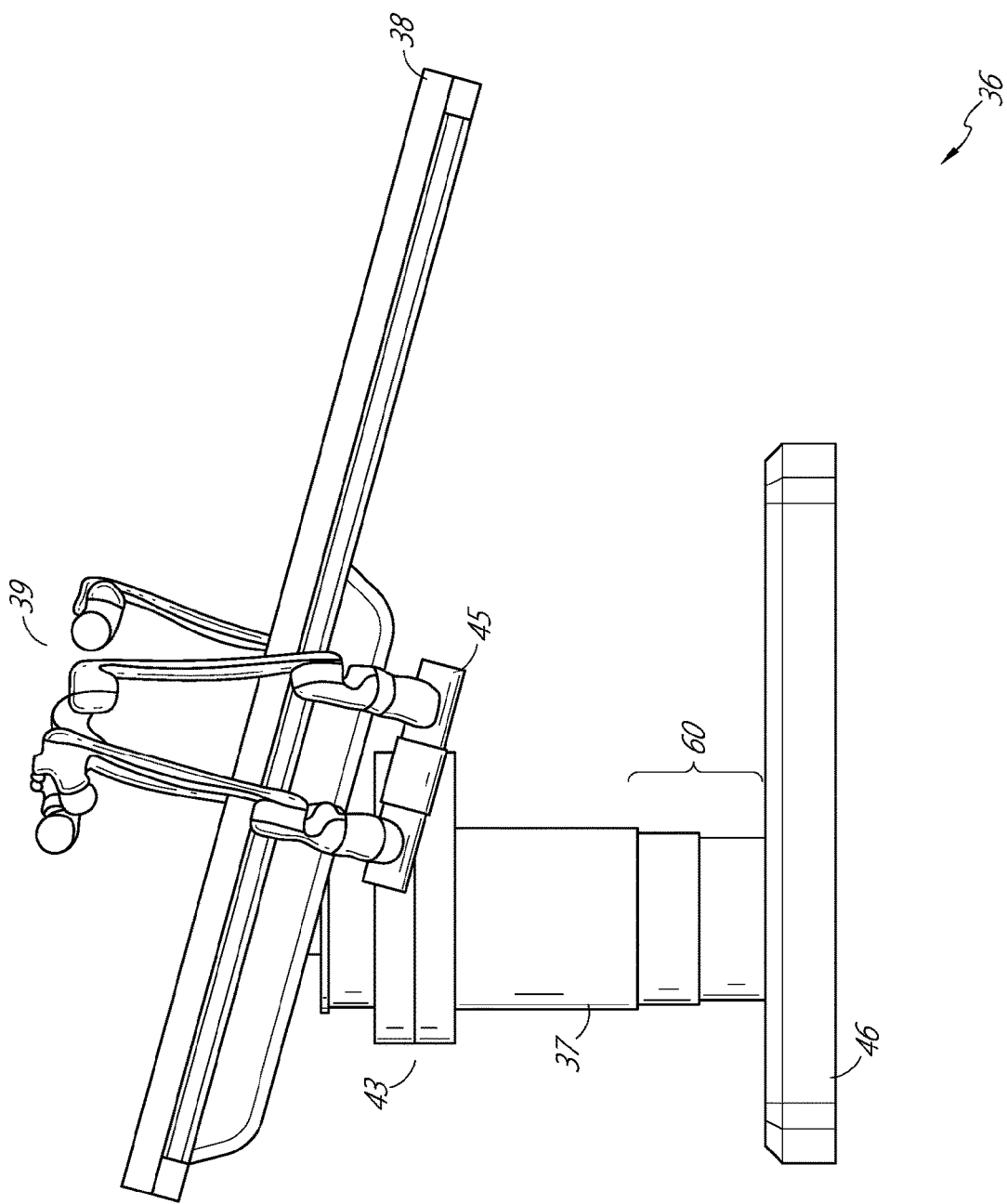
FIG. 10 illustrates an example implementation of the table-based robotic system of FIGS. 5-9 with pitch or tilt adjustment.

To accommodate laparoscopic procedures, the robotically enabled table system may also tilt the platform to a desired angle. FIG. 10 illustrates an implementation of the robotically enabled medical system with pitch or tilt adjustment. As shown in FIG. 10, the system 36 may accommodate tilt of the table 38 to position one portion of the table at a greater distance from the floor than the other. Additionally, the arm mounts 45 may rotate to match the tilt such that the robotic arms 39 maintain the same planar relationship with the table 38. To accommodate steeper angles, the column 37 may also include telescoping portions 60 that allow vertical extension of the column 37 to keep the table 38 from touching the floor or colliding with the table base 46.

Figure 11:
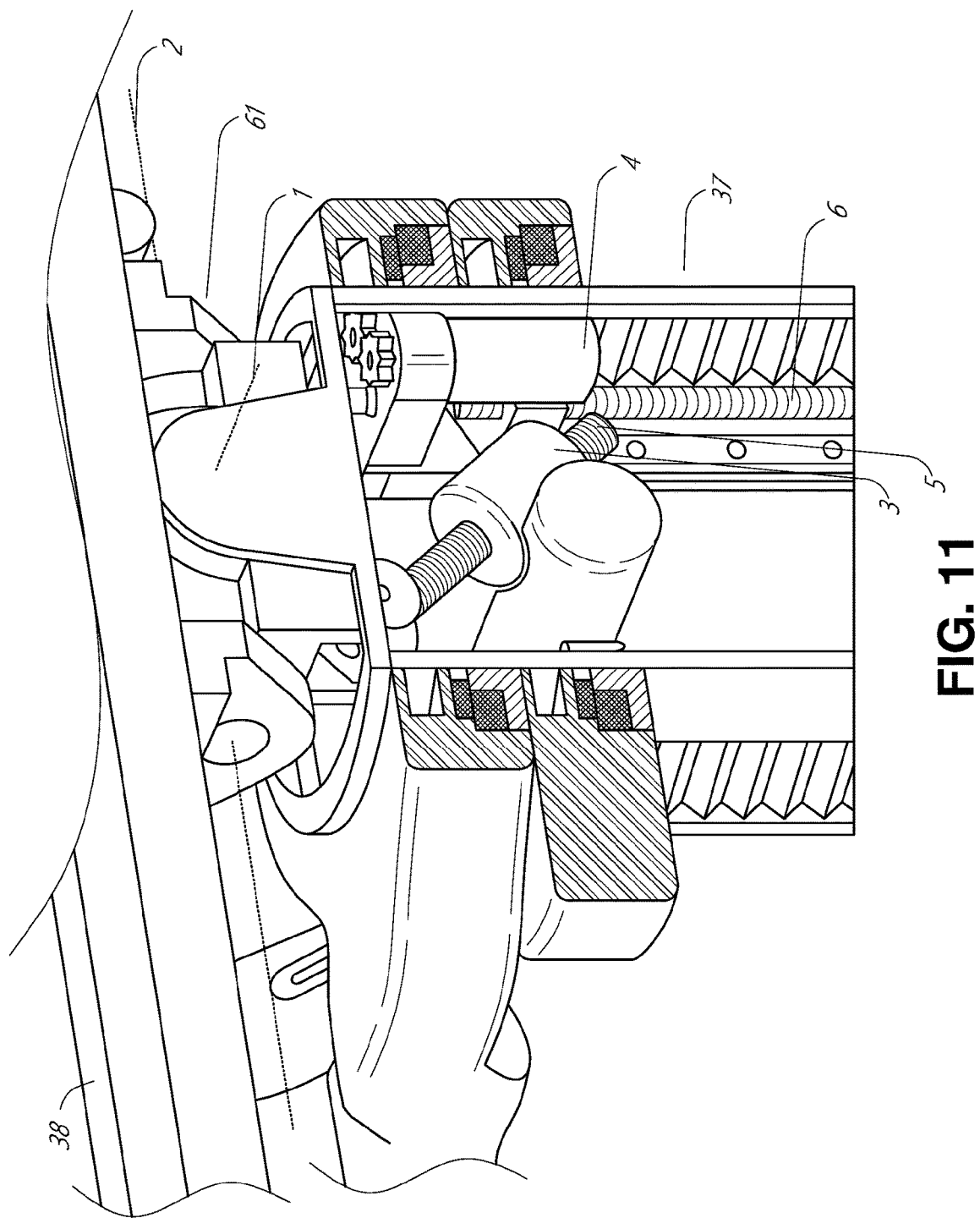
FIG. 11 provides a detailed illustration of the interface between the table and the column of the table-based robotic system of FIGS. 5-10.

FIG. 11 provides a detailed illustration of the interface between the table 38 and the column 37. Pitch rotation mechanism 61 may be configured to alter the pitch angle of the table 38 relative to the column 37 in multiple degrees of freedom. The pitch rotation mechanism 61 may be enabled by the positioning of orthogonal axes 1, 2 at the column-table interface, each axis actuated by a separate motor 3, 4 responsive to an electrical pitch angle command. Rotation along one screw 5 would enable tilt adjustments in one axis 1, while rotation along the other screw 6 would enable tilt adjustments along the other axis 2. In some implementations, a ball joint can be used to alter the pitch angle of the table 38 relative to the column 37 in multiple degrees of freedom.

For example, pitch adjustments are particularly useful when trying to position the table in a Trendelenburg position, i.e., position the patient's lower abdomen at a higher position from the floor than the patient's upper abdomen, for lower abdominal surgery. The Trendelenburg position causes the patient's internal organs to slide towards his/her upper abdomen through the force of gravity, clearing out the abdominal cavity for minimally invasive tools to enter and perform lower abdominal surgical or medical procedures, such as laparoscopic prostatectomy.

Figure 12:
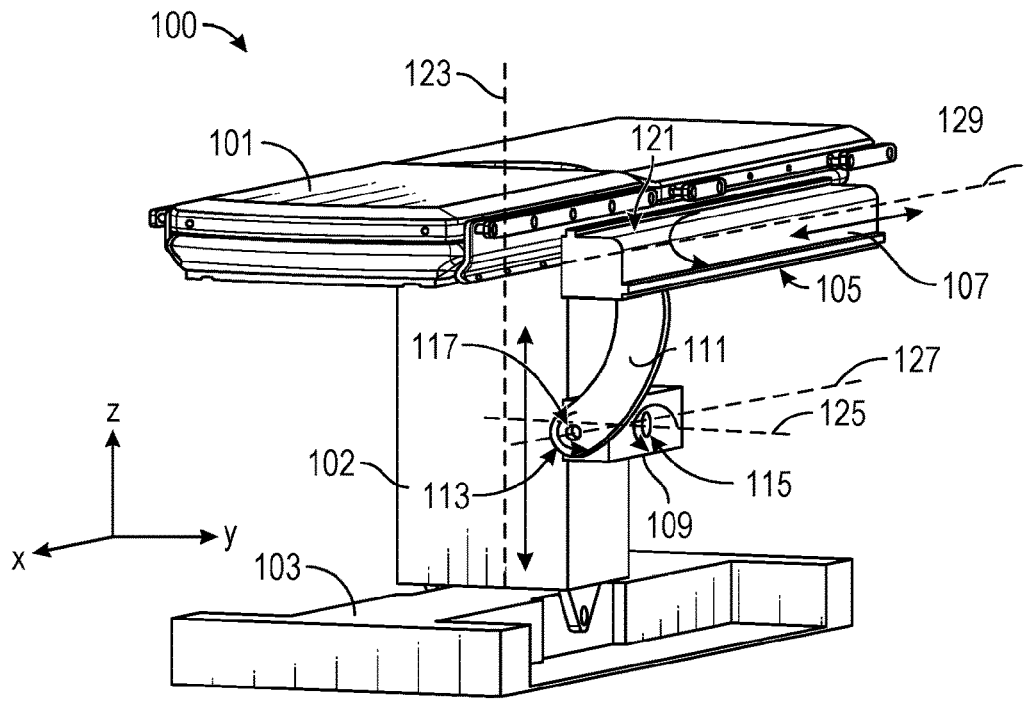
FIG. 12 illustrates a second example implementation of a table-based robotic system.
Figure 13:
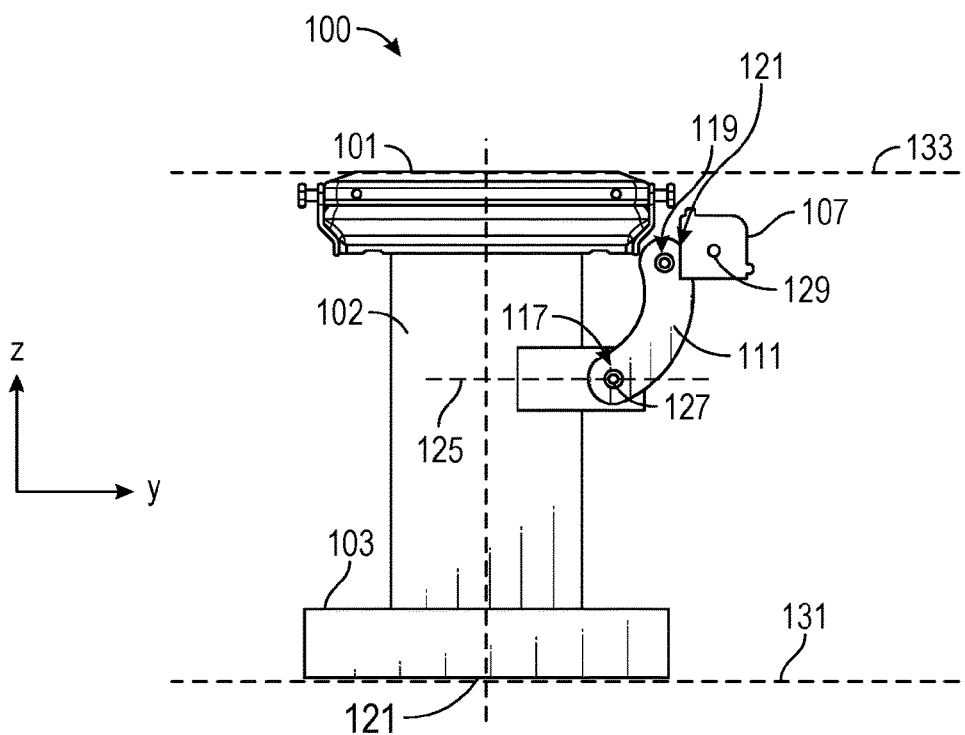
FIG. 13 illustrates an end view of the table-based robotic system of FIG. 12.

FIGS. 12 and 13 illustrate isometric and end views of another implementation of a table-based surgical robotics system 100. The surgical robotics system 100 includes one or more adjustable arm supports 105 that can be configured to support one or more robotic arms (see, for example, FIG. 14) relative to a table 101. In the illustrated implementation, a single adjustable arm support 105 is shown, though an additional arm support can be provided on an opposite side of the table 101. The adjustable arm support 105 can be configured so that it can move relative to the table 101 to adjust and/or vary the position of the adjustable arm support 105 and/or any robotic arms mounted thereto relative to the table 101. For example, the adjustable arm support 105 may be adjusted one or more degrees of freedom relative to the table 101. The adjustable arm support 105 provides high versatility to the system 100, including the ability to easily stow the one or more adjustable arm supports 105 and any robotics arms attached thereto beneath the table 101. The adjustable arm support 105 can be elevated from the stowed position to a position below an upper surface of the table 101. In other implementations, the adjustable arm support 105 can be elevated from the stowed position to a position above an upper surface of the table 101.

The adjustable arm support 105 can provide several degrees of freedom, including lift, lateral translation, tilt, etc. In the illustrated implementation of FIGS. 12 and 13, the arm support 105 is configured with four degrees of freedom, which are illustrated with arrows in FIG. 12. A first degree of freedom allows for adjustment of the adjustable arm support 105 in the z-direction ("Z-lift"). For example, the adjustable arm support 105 can include a carriage 109 configured to move up or down along or relative to a column 102 supporting the table 101. A second degree of freedom can allow the adjustable arm support 105 to tilt. For example, the adjustable arm support 105 can include a rotary joint, which can allow the adjustable arm support 105 to be aligned with the bed in a Trendelenburg position. A third degree of freedom can allow the adjustable arm support 105 to "pivot up," which can be used to adjust a distance between a side of the table 101 and the adjustable arm support 105. A fourth degree of freedom can permit translation of the adjustable arm support 105 along a longitudinal length of the table.

The surgical robotics system 100 in FIGS. 12 and 13 can comprise a table supported by a column 102 that is mounted to a base 103. The base 103 and the column 102 support the table 101 relative to a support surface. A floor axis 131 and a support axis 133 are shown in FIG. 13.

The adjustable arm support 105 can be mounted to the column 102. In other implementations, the arm support 105 can be mounted to the table 101 or base 103. The adjustable arm support 105 can include a carriage 109, a bar or rail connector 111 and a bar or rail 107. In some implementations, one or more robotic arms mounted to the rail 107 can translate and move relative to one another.

The carriage 109 can be attached to the column 102 by a first joint 113, which allows the carriage 109 to move relative to the column 102 (e.g., such as up and down a first or vertical axis 123). The first joint 113 can provide the first degree of freedom ("Z-lift") to the adjustable arm support 105. The adjustable arm support 105 can include a second joint 115, which provides the second degree of freedom (tilt) for the adjustable arm support 105. The adjustable arm support 105 can include a third joint 117, which can provide the third degree of freedom ("pivot up") for the adjustable arm support 105. An additional joint 119 (shown in FIG. 13) can be provided that mechanically constrains the third joint 117 to maintain an orientation of the rail 107 as the rail connector 111 is rotated about a third axis 127. The adjustable arm support 105 can include a fourth joint 121, which can provide a fourth degree of freedom (translation) for the adjustable arm support 105 along a fourth axis 129.

Figure 14:
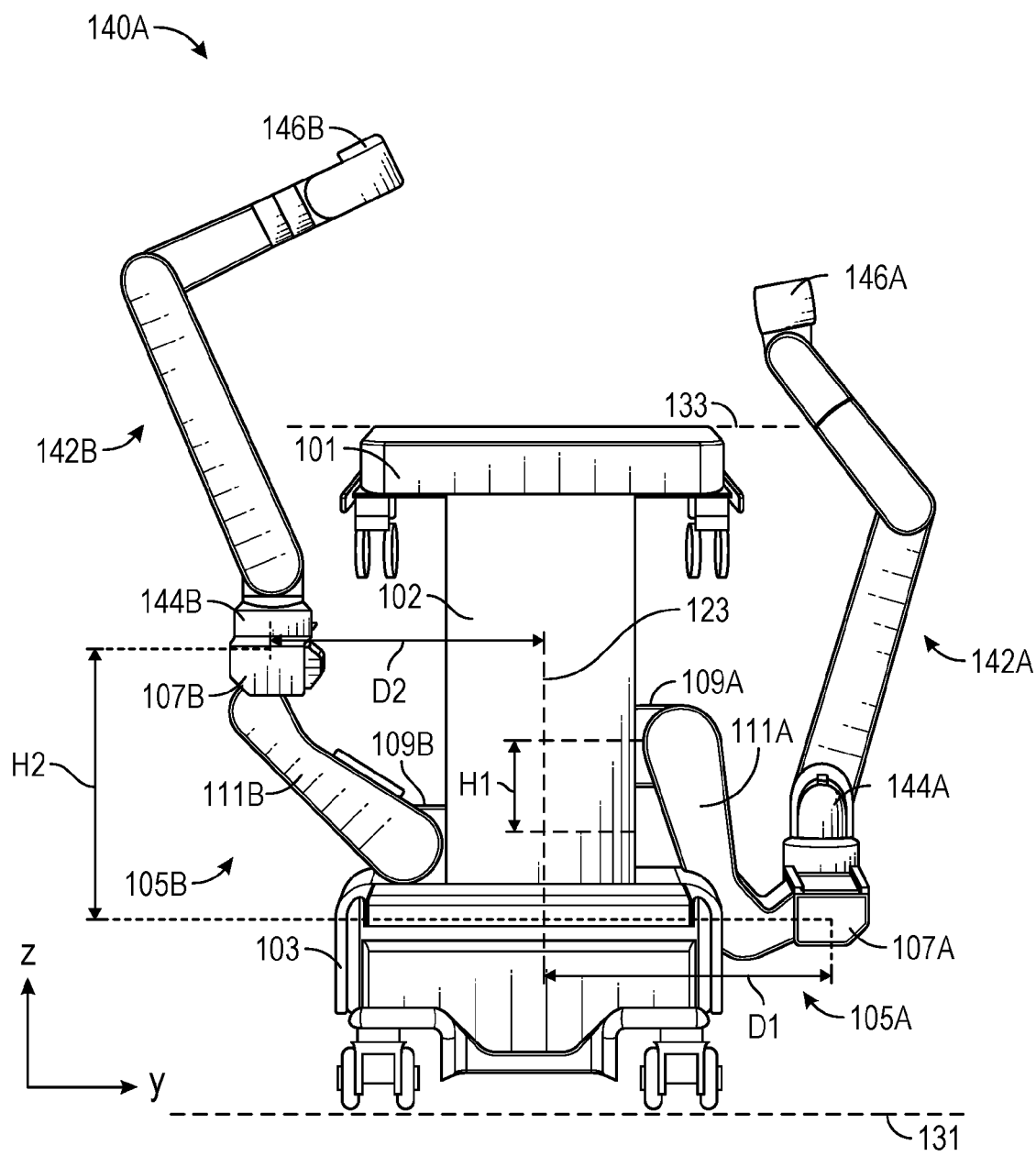
FIG. 14 illustrates an end view of a table-based robotic system with robotic arms attached thereto.

FIG. 14 illustrates an end view of the surgical robotics system 140A with two adjustable arm supports 105A, 105B mounted on opposite sides of a table 101. A first robotic arm 142A is attached to the bar or rail 107A of the first adjustable arm support 105B. The first robotic arm 142A includes a base 144A attached to the rail 107A. The distal end of the first robotic arm 142A includes an instrument drive mechanism 146A that can attach to one or more robotic medical instruments or tools. Similarly, the second robotic arm 142B includes a base 144B attached to the rail 107B. The distal end of the second robotic arm 142B includes an instrument drive mechanism 146B. The instrument drive mechanism 146B can be configured to attach to one or more robotic medical instruments or tools.

In some implementations, one or more of the robotic arms 142A, 142B comprises an arm with seven or more degrees of freedom. In some implementations, one or more of the robotic arms 142A, 142B can include eight degrees of freedom, including an insertion axis (1-degree of freedom including insertion), a wrist (3-degrees of freedom including wrist pitch, yaw and roll), an elbow (1-degree of freedom including elbow pitch), a shoulder (2-degrees of freedom including shoulder pitch and yaw), and base 144A, 144B (1-degree of freedom including translation). In some implementations, the insertion degree of freedom can be provided by the robotic arm 142A, 142B, while in other implementations, the instrument itself provides insertion via an instrument-based insertion architecture.

C. Instrument Driver & Interface.

The end effectors of the system's robotic arms may comprise (i) an instrument driver (also referred to as "instrument drive mechanism" or "instrument device manipulator") that incorporates electro-mechanical means for actuating the medical instrument and (ii) a removable or detachable medical instrument, which may be devoid of any electro-mechanical components, such as motors. This dichotomy may be driven by the need to sterilize medical instruments used in medical procedures, and the inability to adequately sterilize expensive capital equipment due to their intricate mechanical assemblies and sensitive electronics. Accordingly, the medical instruments may be designed to be detached, removed, and interchanged from the instrument driver (and thus the system) for individual sterilization or disposal by the physician or the physician's staff. In contrast, the instrument drivers need not be changed or sterilized, and may be draped for protection.

Figure 15:
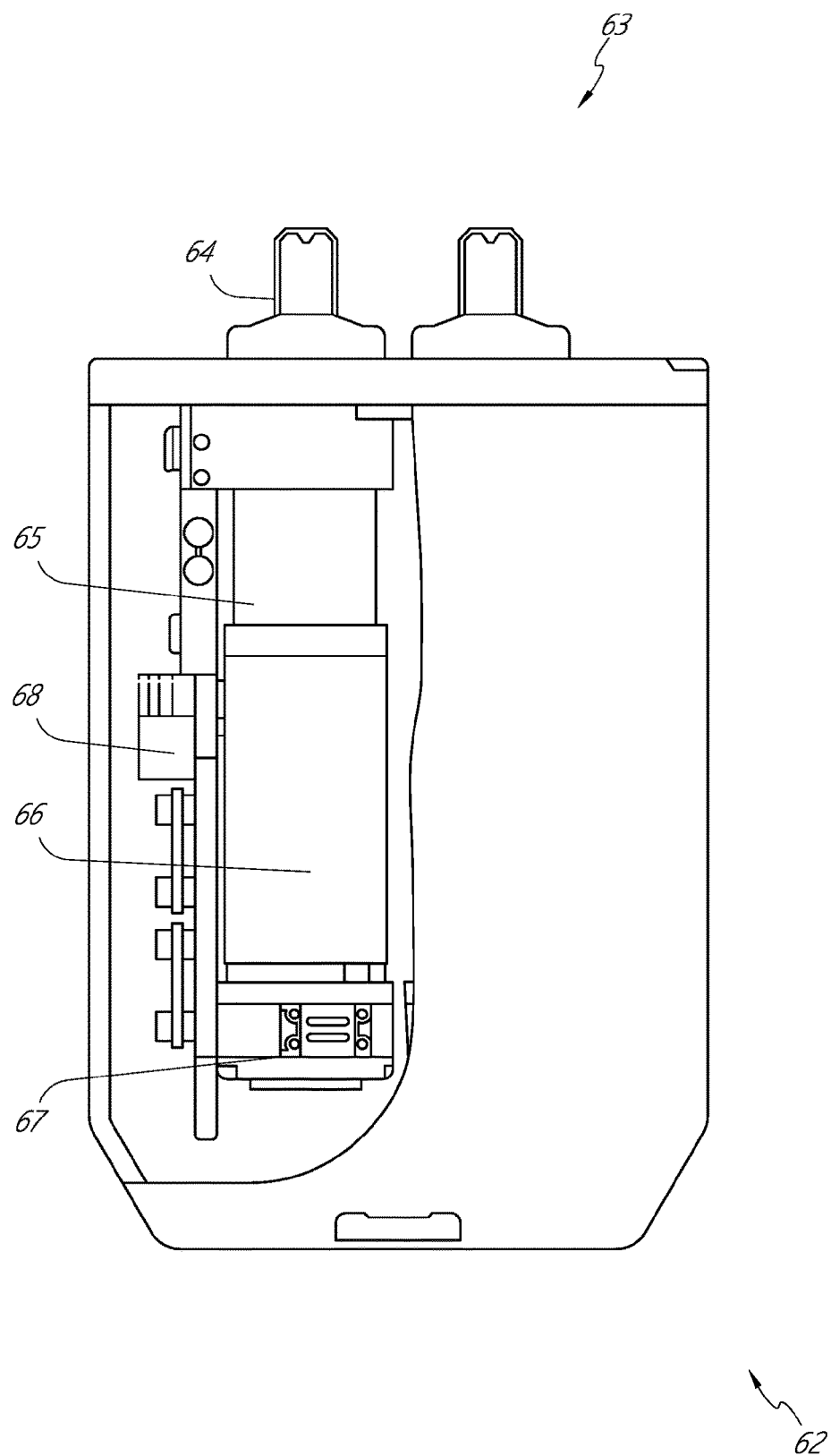
FIG. 15 illustrates an exemplary instrument driver.

FIG. 15 illustrates an example instrument driver. Positioned at the distal end of a robotic arm, instrument driver 62 comprises one or more drive units 63 arranged with parallel axes to provide controlled torque to a medical instrument via drive shafts 64. Each drive unit 63 comprises an individual drive shaft 64 for interacting with the instrument, a gear head 65 for converting the motor shaft rotation to a desired torque, a motor 66 for generating the drive torque, an encoder 67 to measure the speed of the motor shaft and provide feedback to the control circuitry, and control circuitry 68 for receiving control signals and actuating the drive unit. Each drive unit 63 being independently controlled and motorized, the instrument driver 62 may provide multiple (e.g., four as shown in FIG. 15) independent drive outputs to the medical instrument. In operation, the control circuitry 68 would receive a control signal, transmit a motor signal to the motor 66, compare the resulting motor speed as measured by the encoder 67 with the desired speed, and modulate the motor signal to generate the desired torque.

For procedures that require a sterile environment, the robotic system may incorporate a drive interface, such as a sterile adapter connected to a sterile drape, that sits between the instrument driver and the medical instrument. The chief purpose of the sterile adapter is to transfer angular motion from the drive shafts of the instrument driver to the drive inputs of the instrument while maintaining physical separation, and thus sterility, between the drive shafts and drive inputs. Accordingly, an example sterile adapter may comprise a series of rotational inputs and outputs intended to be mated with the drive shafts of the instrument driver and drive inputs on the instrument. Connected to the sterile adapter, the sterile drape, comprised of a thin, flexible material such as transparent or translucent plastic, is designed to cover the capital equipment, such as the instrument driver, robotic arm, and cart (in a cart-based system) or table (in a table-based system). Use of the drape would allow the capital equipment to be positioned proximate to the patient while still being located in an area not requiring sterilization (i.e., non-sterile field). On the other side of the sterile drape, the medical instrument may interface with the patient in an area requiring sterilization (i.e., sterile field).

D. Medical Instrument.

Figure 16:
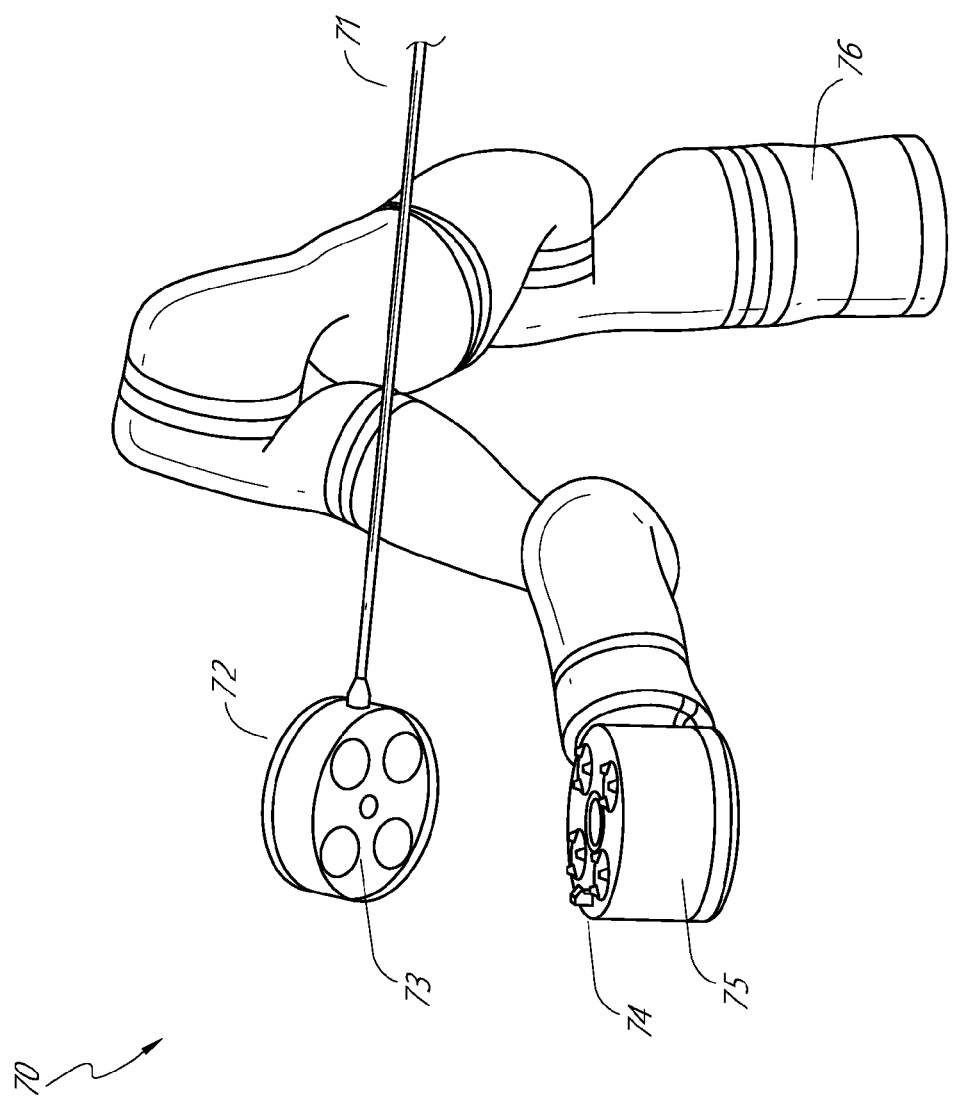
FIG. 16 illustrates an exemplary medical instrument with a paired instrument driver.

FIG. 16 illustrates an example medical instrument with a paired instrument driver. Like other instruments designed for use with a robotic system, medical instrument 70 comprises an elongated shaft 71 (or elongate body) and an instrument base 72. The instrument base 72, also referred to as an "instrument handle" due to its intended design for manual interaction by the physician, may generally comprise rotatable drive inputs 73, e.g., receptacles, pulleys or spools, that are designed to be mated with drive outputs 74 that extend through a drive interface on instrument driver 75 at the distal end of robotic arm 76. When physically connected, latched, and/or coupled, the mated drive inputs 73 of the instrument base 72 may share axes of rotation with the drive outputs 74 in the instrument driver 75 to allow the transfer of torque from the drive outputs 74 to the drive inputs 73. In some implementations, the drive outputs 74 may comprise splines that are designed to mate with receptacles on the drive inputs 73.

The elongated shaft 71 is designed to be delivered through either an anatomical opening or lumen, e.g., as in endoscopy, or a minimally invasive incision, e.g., as in laparoscopy. The elongated shaft 71 may be either flexible (e.g., having properties similar to an endoscope) or rigid (e.g., having properties similar to a laparoscope) or contain a customized combination of both flexible and rigid portions.

In certain robotic systems, the insertion of a surgical tool or instrument may be performed via the movement of the distal end of the robotic arm (e.g., via the ADM). When designed for laparoscopy, the distal end of a rigid elongated shaft may be connected to an end effector extending from a jointed wrist formed from a clevis with at least one degree of freedom and a surgical tool or medical instrument, such as, for example, a grasper or scissors, that may be actuated based on force from the tendons as the drive inputs rotate in response to torque received from the drive outputs 74 of the instrument driver 75. When designed for endoscopy, the distal end of a flexible elongated shaft may include a steerable or controllable bending section that may be articulated and bent based on torque received from the drive outputs 74 of the instrument driver 75.

Torque from the instrument driver 75 is transmitted down the elongated shaft 71 using tendons along the elongated shaft 71. These individual tendons, such as pull wires, may be individually anchored to individual drive inputs 73 within the instrument handle 72. From the handle 72, the tendons are directed down one or more pull lumens along the elongated shaft 71 and anchored at the distal portion of the elongated shaft 71, or in the wrist at the distal portion of the elongated shaft. During a surgical procedure, such as a laparoscopic, endoscopic or hybrid procedure, these tendons may be coupled to a distally mounted end effector, such as a wrist, grasper, or scissor. Under such an arrangement, torque exerted on drive inputs 73 would transfer tension to the tendon, thereby causing the end effector to actuate in some way. In some implementations, during a surgical procedure, the tendon may cause a joint to rotate about an axis, thereby causing the end effector to move in one direction or another. Additionally or in the alternative, the tendon may be connected to one or more jaws of a grasper at the distal end of the elongated shaft 71, where tension from the tendon causes the grasper to close.

In endoscopy, the tendons may be coupled to a bending or articulating section positioned along the elongated shaft 71 (e.g., at the distal end) via adhesive, control ring, or other mechanical fixation. When fixedly attached to the distal end of a bending section, torque exerted on the drive inputs 73 would be transmitted down the tendons, causing the softer, bending section (sometimes referred to as the articulable section or region) to bend or articulate. Along the non-bending sections, it may be advantageous to spiral or helix the individual pull lumens that direct the individual tendons along (or inside) the walls of the endoscope shaft to balance the radial forces that result from tension in the pull wires. The angle of the spiraling and/or spacing therebetween may be altered or engineered for specific purposes, wherein tighter spiraling exhibits lesser shaft compression under load forces, while lower amounts of spiraling results in greater shaft compression under load forces, but limits bending. On the other end of the spectrum, the pull lumens may be directed parallel to the longitudinal axis of the elongated shaft 71 to allow for controlled articulation in the desired bending or articulable sections.

In endoscopy, the elongated shaft 71 houses a number of components to assist with the robotic procedure. The shaft 71 may comprise a working channel for deploying surgical tools (or medical instruments), irrigation, and/or aspiration to the operative region at the distal end of the shaft 71. The shaft 71 may also accommodate wires and/or optical fibers to transfer signals to/from an optical assembly at the distal tip, which may include an optical camera. The shaft 71 may also accommodate optical fibers to carry light from proximally located light sources, such as light emitting diodes, to the distal end of the shaft 71.

At the distal end of the instrument 70, the distal tip may also comprise the opening of a working channel for delivering tools for diagnostic and/or therapy, irrigation, and aspiration to an operative site. The distal tip may also include a port for a camera, such as a fiberscope or a digital camera, to capture images of an internal anatomical space. Relatedly, the distal tip may also include ports for light sources for illuminating the anatomical space when using the camera.

In the example of FIG. 16, the drive shaft axes, and thus the drive input axes, are orthogonal to the axis of the elongated shaft 71. This arrangement, however, complicates roll capabilities for the elongated shaft 71. Rolling the elongated shaft 71 along its axis while keeping the drive inputs 73 static results in undesirable tangling of the tendons as they extend off the drive inputs 73 and enter pull lumens within the elongated shaft 71. The resulting entanglement of such tendons may disrupt any control algorithms intended to predict movement of the flexible elongated shaft 71 during an endoscopic procedure.

Figure 17:
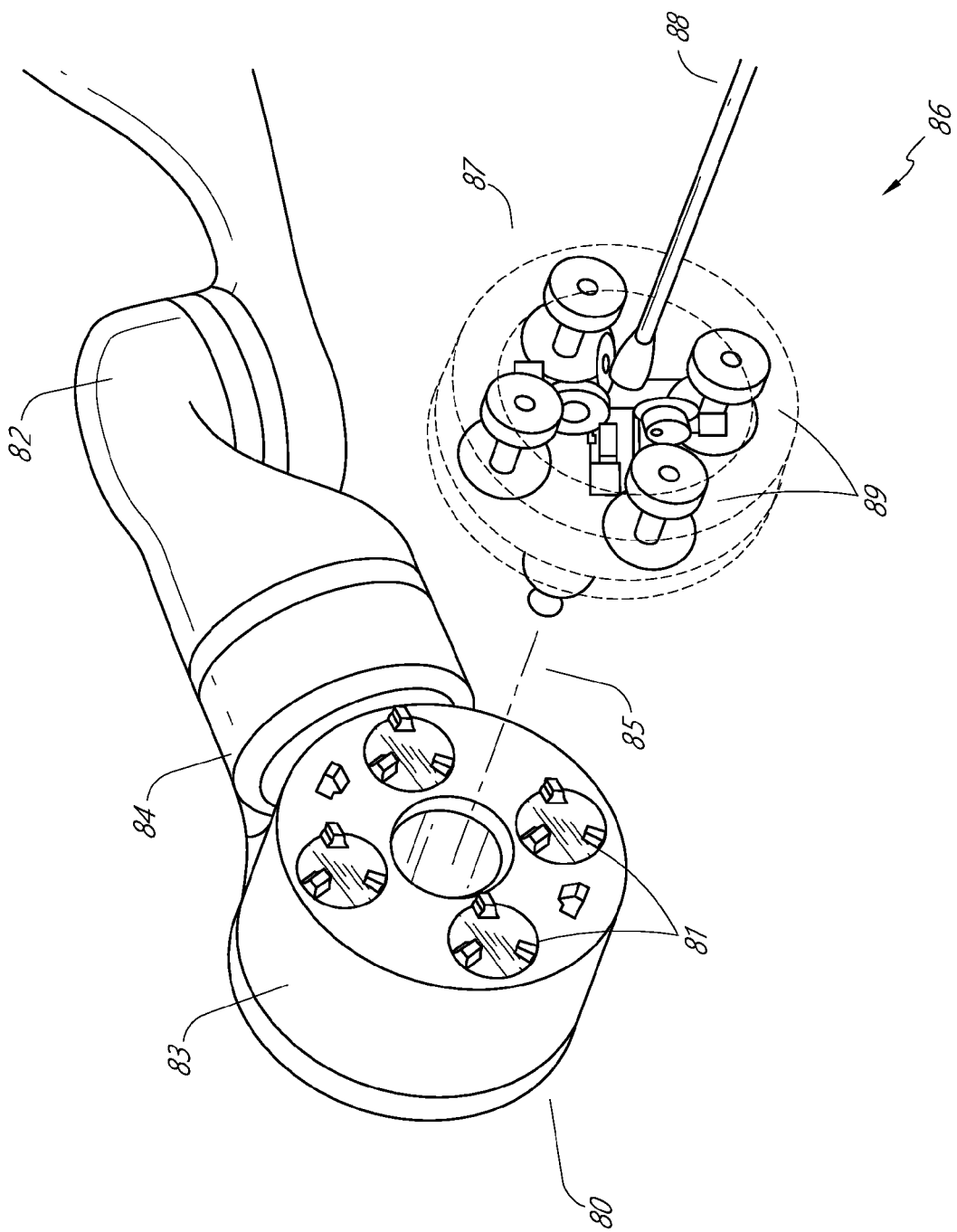
FIG. 17 illustrates a second example design for an instrument driver and instrument where the axes of the drive units are parallel to the axis of the elongated shaft of the instrument.

FIG. 17 illustrates another design for an instrument driver and instrument where the axes of the drive units are parallel to the axis of the elongated shaft of the instrument. As shown, a circular instrument driver 80 comprises four drive units with their drive outputs 81 aligned in parallel at the end of a robotic arm 82. The drive units, and their respective drive outputs 81, are housed in a rotational assembly 83 of the instrument driver 80 that is driven by one of the drive units within the assembly 83. In response to torque provided by the rotational drive unit, the rotational assembly 83 rotates along a circular bearing that connects the rotational assembly 83 to the non-rotational portion 84 of the instrument driver 80. Power and controls signals may be communicated from the non-rotational portion 84 of the instrument driver 80 to the rotational assembly 83 through electrical contacts that may be maintained through rotation by a brushed slip ring connection (not shown). In other implementations, the rotational assembly 83 may be responsive to a separate drive unit that is integrated into the non-rotatable portion 84, and thus not in parallel to the other drive units. The rotational mechanism 83 allows the instrument driver 80 to rotate the drive units, and their respective drive outputs 81, as a single unit around an instrument driver axis 85.

Like earlier disclosed implementations, an instrument 86 may comprise an elongated shaft portion 88 and an instrument base 87 (shown with a transparent external skin for discussion purposes) comprising a plurality of drive inputs 89 (such as receptacles, pulleys, and spools) that are configured to receive the drive outputs 81 in the instrument driver 80. Unlike prior disclosed implementations, the instrument shaft 88 extends from the center of the instrument base 87 with an axis substantially parallel to the axes of the drive inputs 89, rather than orthogonal as in the design of FIG. 16.

When coupled to the rotational assembly 83 of the instrument driver 80, the medical instrument 86, comprising instrument base 87 and instrument shaft 88, rotates in combination with the rotational assembly 83 about the instrument driver axis 85. Since the instrument shaft 88 is positioned at the center of instrument base 87, the instrument shaft 88 is coaxial with instrument driver axis 85 when attached. Thus, rotation of the rotational assembly 83 causes the instrument shaft 88 to rotate about its own longitudinal axis. Moreover, as the instrument base 87 rotates with the instrument shaft 88, any tendons connected to the drive inputs 89 in the instrument base 87 are not tangled during rotation. Accordingly, the parallelism of the axes of the drive outputs 81, drive inputs 89, and instrument shaft 88 allows for the shaft rotation without tangling any control tendons.

Figure 18:
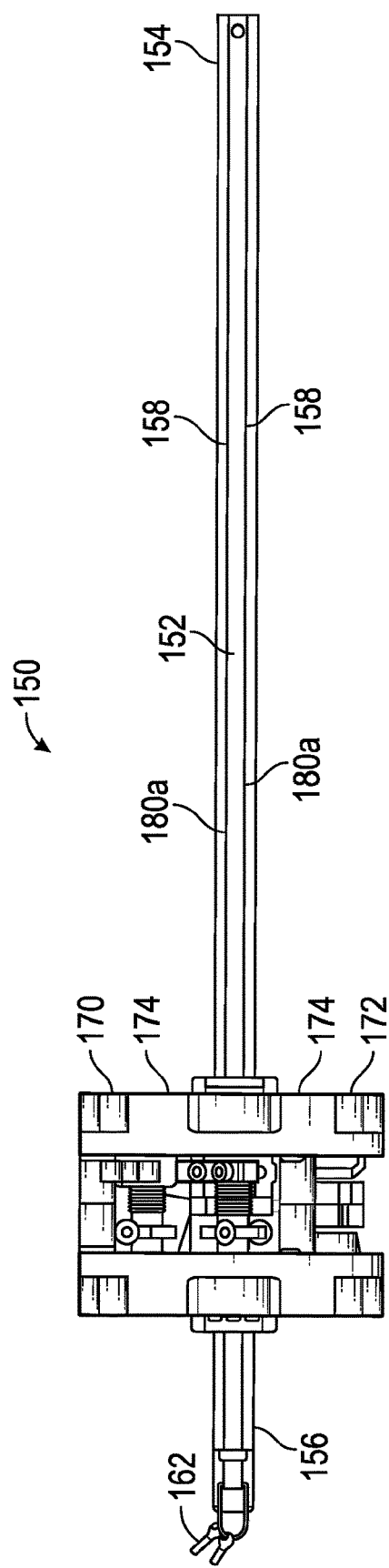
FIG. 18 illustrates an instrument having an instrument-based insertion architecture.

FIG. 18 illustrates an instrument having an instrument-based insertion architecture in accordance with some implementations. The instrument 150 can be coupled to any of the instrument drivers discussed above. The instrument 150 comprises an elongated shaft 152, an end effector 162 connected to the shaft 152, and a handle 170 coupled to the shaft 152. The elongated shaft 152 comprises a tubular member having a proximal portion 154 and a distal portion 156. The elongated shaft 152 comprises one or more channels or grooves 158 along its outer surface. The grooves 158 are configured to receive one or more wires or cables 180 therethrough. One or more cables 180 thus run along an outer surface of the elongated shaft 152. In other implementations, cables 180 can also run through the elongated shaft 152. Manipulation of the one or more cables 180 (e.g., via an instrument driver) results in actuation of the end effector 162.

The instrument handle 170, which may also be referred to as an instrument base, may generally comprise an attachment interface 172 having one or more mechanical inputs 174, e.g., receptacles, pulleys or spools, that are designed to be reciprocally mated with one or more torque couplers on an attachment surface of an instrument driver.

In some implementations, the instrument 150 comprises a series of pulleys or cables that enable the elongated shaft 152 to translate relative to the handle 170. In other words, the instrument 150 itself comprises an instrument-based insertion architecture that accommodates insertion of the instrument, thereby minimizing the reliance on a robot arm to provide insertion of the instrument 150. In other implementations, a robotic arm can be largely responsible for instrument insertion.

E. Controller.

Any of the robotic systems described herein can include an input device or controller for manipulating an instrument attached to a robotic arm. In some implementations, the controller can be coupled (e.g., communicatively, electronically, electrically, wirelessly and/or mechanically) with an instrument such that manipulation of the controller causes a corresponding manipulation of the instrument e.g., via master slave control.

Figure 19:
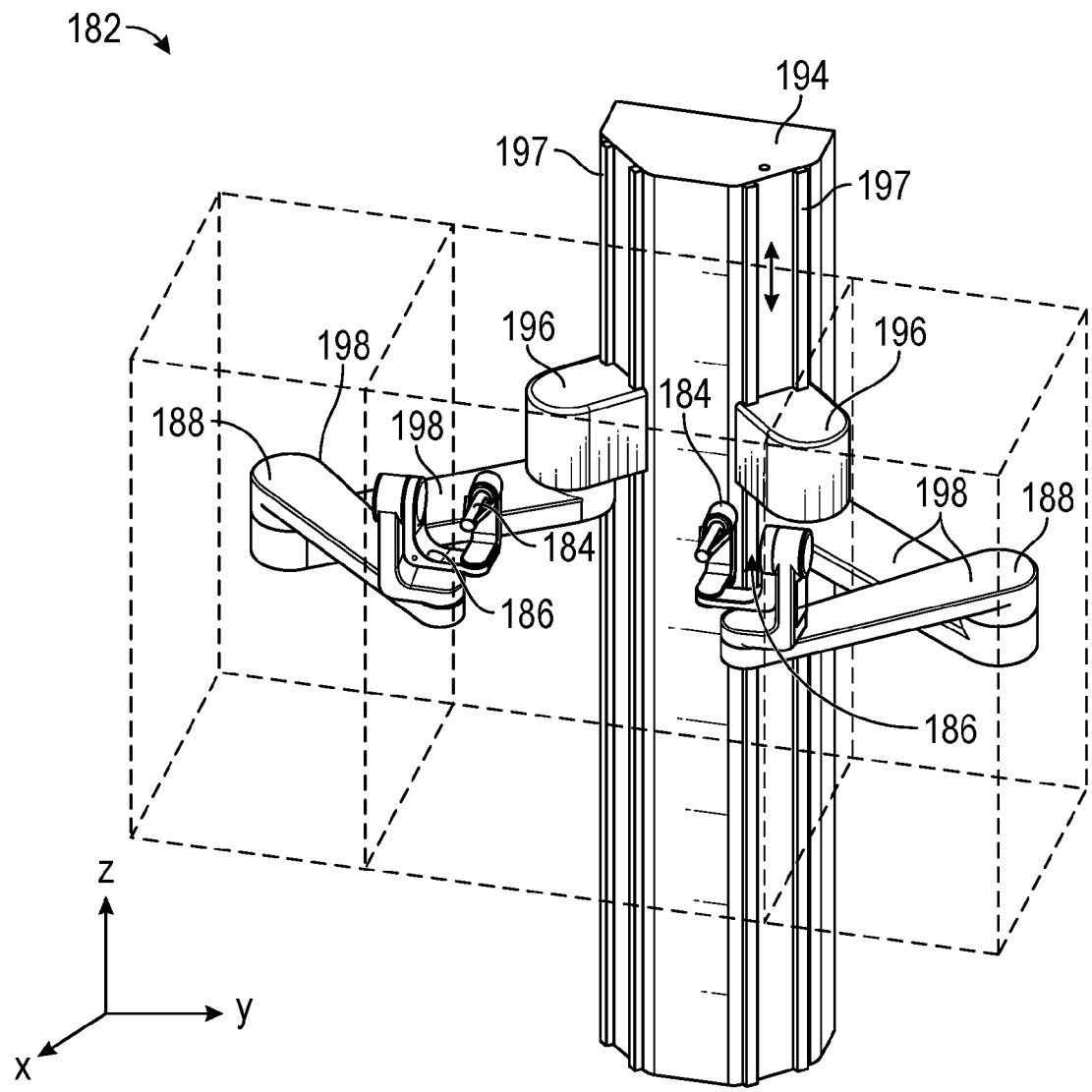
FIG. 19 illustrates an exemplary controller.

FIG. 19 is a perspective view of an implementation of a controller 182. In the present implementation, the controller 182 comprises a hybrid controller that can have both impedance and admittance control. In other implementations, the controller 182 can utilize just impedance or passive control. In other implementations, the controller 182 can utilize just admittance control. By being a hybrid controller, the controller 182 advantageously can have a lower perceived inertia while in use.

In the illustrated implementation, the controller 182 is configured to allow manipulation of two medical instruments and includes two handles 184. Each of the handles 184 is connected to a gimbal 186. Each gimbal 186 is connected to a positioning platform 188.

As shown in FIG. 19, each positioning platform 188 includes a SCARA arm (selective compliance assembly robot arm) 198 coupled to a column 194 by a prismatic joint 196. The prismatic joints 196 are configured to translate along the column 194 (e.g., along rails 197) to allow each of the handles 184 to be translated in the z-direction, providing a first degree of freedom. The SCARA arm 198 is configured to allow motion of the handle 184 in an x-y plane, providing two additional degrees of freedom.

In some implementations, one or more load cells are positioned in the controller. For example, in some implementations, a load cell (not shown) is positioned in the body of each of the gimbals 186. By providing a load cell, portions of the controller 182 are capable of operating under admittance control, thereby advantageously reducing the perceived inertia of the controller while in use. In some implementations, the positioning platform 188 is configured for admittance control, while the gimbal 186 is configured for impedance control. In other implementations, the gimbal 186 is configured for admittance control, while the positioning platform 188 is configured for impedance control. Accordingly, for some implementations, the translational or positional degrees of freedom of the positioning platform 188 can rely on admittance control, while the rotational degrees of freedom of the gimbal 186 rely on impedance control.

F. Navigation and Control.

Traditional endoscopy may involve the use of fluoroscopy (e.g., as may be delivered through a C-arm) and other forms of radiation-based imaging modalities to provide endoluminal guidance to an operator physician. In contrast, the robotic systems contemplated by the subject technology disclosed herein can provide for non-radiation-based navigational and localization means to reduce physician exposure to radiation and reduce the amount of equipment within the operating room. As used herein, the term "localization" may refer to determining and/or monitoring the position of objects in a reference coordinate system. Technologies such as preoperative mapping, computer vision, real-time EM tracking, and robot command data may be used individually or in combination to achieve a radiation-free operating environment. In other cases, where radiation-based imaging modalities are still used, the preoperative mapping, computer vision, real-time EM tracking, and robot command data may be used individually or in combination to improve upon the information obtained solely through radiation-based imaging modalities.

FIG. 20 is a block diagram illustrating a localization system 90 that estimates a location of one or more elements of the robotic system, such as the location of the instrument, in accordance to an example implementation. The localization system 90 may be a set of one or more computer devices configured to execute one or more instructions. The computer devices may be embodied by a processor (or processors) and computer-readable memory in one or more components discussed above. By way of example and not limitation, the computer devices may be in the tower 30 shown in FIG. 1, the cart 11 shown in FIGS. 1-4, the beds shown in FIGS. 5-14, etc.

As shown in FIG. 20, the localization system 90 may include a localization module 95 that processes input data 91-94 to generate location data 96 for the distal tip of a medical instrument. The location data 96 may be data or logic that represents a location and/or orientation of the distal end of the instrument relative to a frame of reference. The frame of reference can be a frame of reference relative to the anatomy of the patient or to a known object, such as an EM field generator (see discussion below for the EM field generator).

The various input data 91-94 are now described in greater detail. Preoperative mapping may be accomplished through the use of the collection of low dose CT scans. Preoperative CT scans are reconstructed into three-dimensional images, which are visualized, e.g. as "slices" of a cutaway view of the patient's internal anatomy. When analyzed in the aggregate, image-based models for anatomical cavities, spaces and structures of the patient's anatomy, such as a patient lung network, may be generated. Techniques such as center-line geometry may be determined and approximated from the CT images to develop a three-dimensional volume of the patient's anatomy, referred to as model data 91 (also referred to as "preoperative model data" when generated using only preoperative CT scans). The use of center-line geometry is discussed in U.S. patent application Ser. No. 14/523,760, the contents of which are herein incorporated in its entirety. Network topological models may also be derived from the CT-images, and are particularly appropriate for bronchoscopy.

In some implementations, the instrument may be equipped with a camera to provide vision data (or image data) 92. The localization module 95 may process the vision data 92 to enable one or more vision-based (or image-based) location tracking modules or features. For example, the preoperative model data 91 may be used in conjunction with the vision data 92 to enable computer vision-based tracking of the medical instrument (e.g., an endoscope or an instrument advance through a working channel of the endoscope). For example, using the preoperative model data 91, the robotic system may generate a library of expected endoscopic images from the model based on the expected path of travel of the endoscope, each image linked to a location within the model. Intraoperatively, this library may be referenced by the robotic system to compare real-time images captured at the camera (e.g., a camera at a distal end of the endoscope) to those in the image library to assist localization.

Other computer vision-based tracking techniques use feature tracking to determine motion of the camera, and thus the endoscope. Some features of the localization module 95 may identify circular geometries in the preoperative model data 91 that correspond to anatomical lumens and track the change of those geometries to determine which anatomical lumen was selected, as well as the relative rotational and/or translational motion of the camera. Use of a topological map may further enhance vision-based algorithms or techniques.

Optical flow, another computer vision-based technique, may analyze the displacement and translation of image pixels in a video sequence in the vision data 92 to infer camera movement. Examples of optical flow techniques may include motion detection, object segmentation calculations, luminance, motion compensated encoding, stereo disparity measurement, etc. Through the comparison of multiple frames over multiple iterations, movement and location of the camera (and thus the endoscope) may be determined.

The localization module 95 may use real-time EM tracking to generate a real-time location of the endoscope in a global coordinate system that may be registered to the patient's anatomy, represented by the preoperative model. In EM tracking, an EM sensor (or tracker) comprising one or more sensor coils embedded in one or more locations and orientations in a medical instrument (e.g., an endoscopic tool) measures the variation in the EM field created by one or more static EM field generators positioned at a known location. The location information detected by the EM sensors is stored as EM data 93. The EM field generator (or transmitter), may be placed close to the patient to create a low intensity magnetic field that the embedded sensor may detect. The magnetic field induces small currents in the sensor coils of the EM sensor, which may be analyzed to determine the distance and angle between the EM sensor and the EM field generator. These distances and orientations may be intraoperatively "registered" to the patient anatomy (e.g., the preoperative model) to determine the geometric transformation that aligns a single location in the coordinate system with a position in the preoperative model of the patient's anatomy. Once registered, an embedded EM tracker in one or more positions of the medical instrument (e.g., the distal tip of an endoscope) may provide real-time indications of the progression of the medical instrument through the patient's anatomy.

Robotic command and kinematics data 94 may also be used by the localization module 95 to provide localization data 96 for the robotic system. Device pitch and yaw resulting from articulation commands may be determined during preoperative calibration. Intraoperatively, these calibration measurements may be used in combination with known insertion depth information to estimate the position of the instrument. Additionally or in the alternative, these calculations may be analyzed in combination with EM, vision, and/or topological modeling to estimate the position of the medical instrument within the network.

As FIG. 20 shows, a number of other input data can be used by the localization module 95. For example, although not shown in FIG. 20, an instrument utilizing shape-sensing fiber can provide shape data that the localization module 95 can use to determine the location and shape of the instrument.

The localization module 95 may use the input data 91-94 in combination(s). In some cases, such a combination may use a probabilistic approach where the localization module 95 assigns a confidence weight to the location determined from each of the input data 91-94. Thus, where the EM data may not be reliable (as may be the case where there is EM interference) the confidence of the location determined by the EM data 93 can be decrease and the localization module 95 may rely more heavily on the vision data 92 and/or the robotic command and kinematics data 94.

As discussed above, the robotic systems discussed herein may be designed to incorporate a combination of one or more of the technologies above. The robotic system's computer-based control system, based in the tower, bed and/or cart, may store computer program instructions, for example, within a non-transitory computer-readable storage medium such as a persistent magnetic storage drive, solid state drive, or the like, that, upon execution, cause the system to receive and analyze sensor data and user commands, generate control signals throughout the system, and display the navigational and localization data, such as the position of the instrument within the global coordinate system, anatomical map, etc.

2. Introduction to Systems and Methods for Adjusting a Medical Device Remote Center Implementations of the disclosure relate to systems and techniques for adjusting the remote center of motion (also referred to simply as a "remote center") for a medical instrument and/or corresponding cannula. In particular, aspects of the subject technology disclosed herein relate to a collection of systems and techniques which can achieve improved set-ups for different types of surgeries, better reach of robotic arms, and collision avoidance. In some implementations, these benefits can be achieved by providing techniques for setting up and accommodating different remote centers, even within a single treatment episode.

Figure 21:
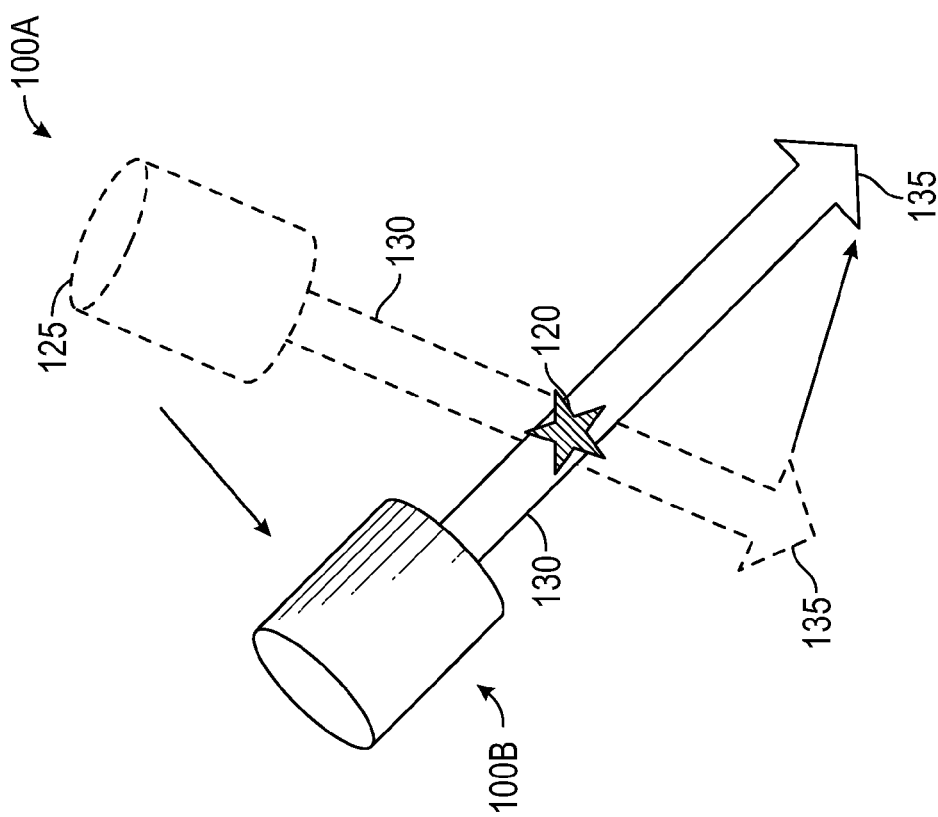
FIG. 21 illustrates exemplary movement of an active drive mechanism (ADM) while maintaining a remote center of motion in accordance with aspects of the subject technology disclosed herein.

As used herein, a remote center of motion (RCM) generally refers to a point in space where a cannula or other access port is constrained in motion. An active drive mechanism (ADM) 125 is formed at a distal end of the robotic arm. FIG. 21 illustrates exemplary movement of the ADM 125 while maintaining a remote center of motion in accordance with aspects of the subject technology disclosed herein. FIG. 21 illustrates the ADM 125, an instrument 130, and a distal end 135 of the instrument 130. In particular, FIG. 21 illustrates the movement of the ADM 125 from a first position 100A to a second position 100B while maintaining a remote center of motion 120. The ADM 125 can be coupled to a distal end of a robotic arm (such as those shown in FIG. 14) configured to control movement of the ADM 125 and the distal end 135 of the instrument 130. For example, in maintaining the remote center of motion 120, a robotic arm may be configured to rotate the ADM 125 and the instrument 130 about the remote center of motion such that the remote center of motion is stationary.

The robotic arm and/or surgical system can establish and maintain the position of the remote center of motion 120 for the instrument 130 and/or for an access port (such as a cannula). Depending on the implementation, the remote center of motion 120 can be maintained either mechanically or by software executed on one or more processors of the system. During a surgical procedure, the instrument 130 may be inserted through the patient's body wall to gain access to an internal region of the patient, via a cannula or other access port. In many implementations, the remote center of motion 120 can be located at the intersection between the body wall and the instrument 130 to prevent and/or reduce movement of the body wall during the procedure, thereby enabling the surgical procedure to safely take place. For example, if the location of the intersection between the instrument 130 is not held substantially stationary during the procedure, the instrument 130 may apply unnecessary force to the body wall, potentially tearing the body wall. Thus, it is desirable to maintain the remote center of motion 120 to prevent unnecessary forces from being applied to the body wall.

Figure 22:
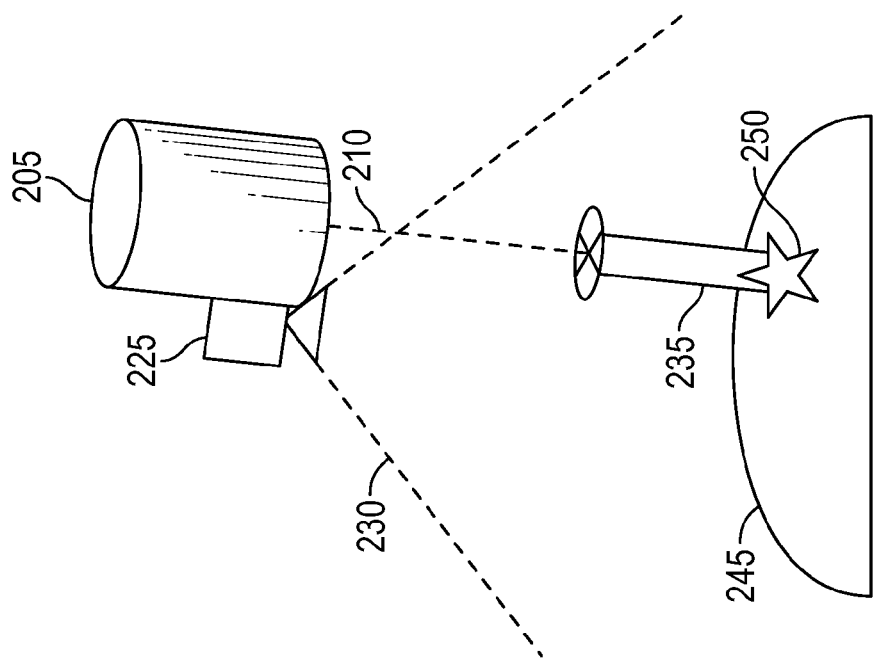
FIG. 22 illustrates an ADM prior to docking of the ADM to a cannula in accordance with aspects of the subject technology disclosed herein.

FIG. 22 illustrates docking of an active drive mechanism (ADM) 205 to a cannula 235 in accordance with aspects of the subject technology disclosed herein. In the illustrated implementation, the system includes the ADM 205, a tool path 210 associated with the ADM 205, an image sensor 225 having an associated field of view 230, a cannula 235, a body wall 245 of a patient, and a point of intersection 250 between the port 235 and the body wall 245. The ADM 205 is attached to the distal end of a robotic arm (not illustrated) configured to control movement of the ADM 205 and an instrument (not illustrated) which can be inserted and retracted along the tool path 210. In the present implementation, the image sensor 225 is shown coupled to an outer side wall of the ADM 205, while in other implementations, the image sensor 225 can be found within the body of the ADM 205 itself. In some implementations, the image sensor 225 can be detachably coupled with the ADM 205, while in other implementations, the image sensor 225 can be integrated with the ADM 205.

In some implementations, the remote center of motion passes through the body wall 245 of a patient via the cannula 235. The remote center of motion is positioned along the tool path 210 of an instrument/tool that coupled to the ADM 205. The cannula 235 and instrument can pivot at the remote center. In traditional procedures, the location of the remote center does not change during a surgery, since there is a risk of trauma to the patient when the remote center moves. For example, movement of the remote center of motion laterally with respect to the body wall may exert undesired forces onto the body wall, risking trauma to the patient.

A remote center distance generally refers to the distance from an interface of the cannula and the robotic arm to the remote center. In some implementations, the interface can be a point where the cannula is mounted on a distal end of the robotic arm (e.g., such as on an ADM). In some implementations, the remote center distance can be defined as the distance between the ADM 205 midplane (e.g., a plane perpendicular to the tool path 210) and the remote center (e.g., which can be located at the point of intersection 250 in FIG. 22). When the ADM 205 is coupled to the cannula 235, the remote center distance can be defined as the distance between: (i) the interface between the ADM 205 and the cannula 235 and (ii) the remote center.

In a robotic system that utilizes a plurality of robotic arms (e.g., three arms on each side of the patient, for a total of six arms) to perform very complex surgeries, there may be a number of challenges:

(a) Optimization for multiple poses. The positioning of robotic arms and the corresponding cannulas will often need to be optimized for different poses depending on the type of surgery.

(b) Arm reach and collision avoidance. In many types of medical procedures, a robotic arm that holds a camera (e.g., a camera arm) may need to position a laparoscope in or near a midline of a patient. For certain medical procedures, it can be a challenge for one or more of the robotic arms to reach the desired position of a corresponding cannula or other access port. For example, a first robotic arm may be able to reach the corresponding cannula on its own; however, when a plurality of other robotic arms are attached to the same bar (e.g., see bar 107 illustrated in FIGS. 12-14), the competing constraints of collision avoidance and port placement may result in the first robotic arm being undesirably outstretched or even unable to reach the corresponding cannula. This type of arm reach and collision avoidance can be limiting to both on arm reach/range of motion and on performance (e.g., an outstretched arm may be prone to shaking and overheating).

Figure 23A:
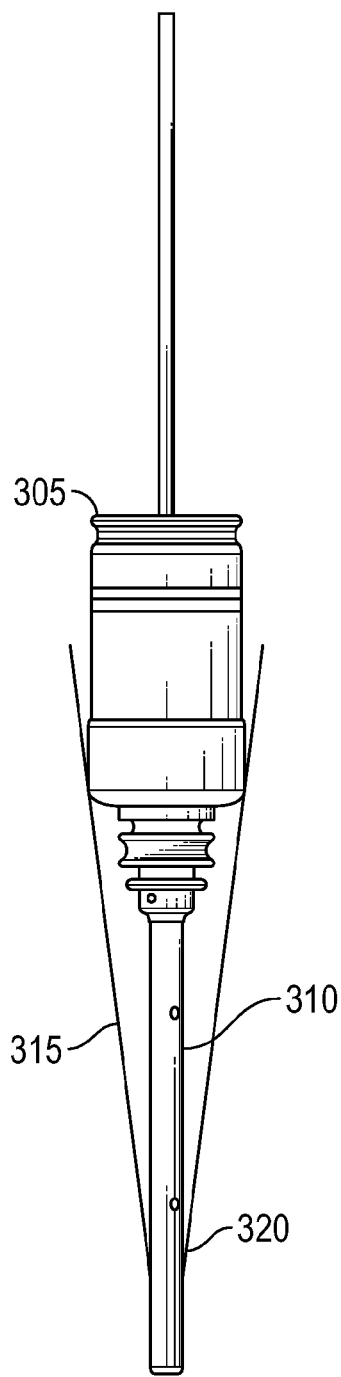
FIGS. 23A and 23B illustrate example remote center distances which can be used to determine minimum port spacing in accordance with aspects of the subject technology disclosed herein.
Figure 23B:
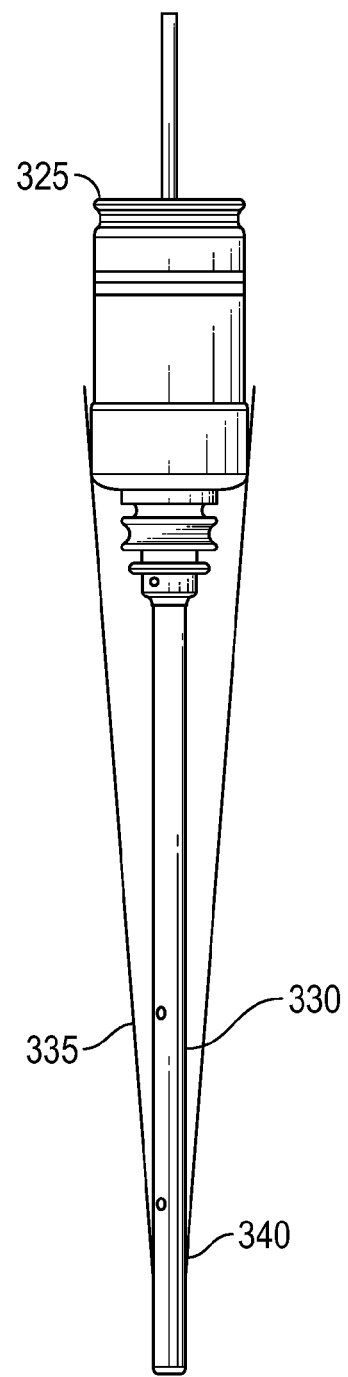

(c) Tight cannula/port spacing. In smaller patients and smaller target workspaces, the cannulas and/or access ports may have to be spaced relatively close together. FIGS. 23A and 23B illustrate example remote center distances which can be used to determine minimum port spacing in accordance with aspects of the subject technology disclosed herein. With reference to FIGS. 23A and 23B, a minimum port spacing can be defined by the tangency between cones 315 and 335 centered at the remote center 320 and 340 and enveloping the ADM 305 and 325. As shown in FIGS. 23A and 23B, the remote center for the ADM 305 of FIG. 23A is closer than the remote center for the ADM 325 of FIG. 23B. When the remote center 340 is farther from the ADM 325 (e.g., a larger remote center distance as in FIG. 23B), the cone is narrower and the cannulas 330 can be placed closer together than in the case where the remote center 320 is closer to the ADM 305 as in FIG. 23A.

Aspects of the subject technology disclosed herein relate to systems and methods that can accommodate multiple poses of robotic arms for different types of surgeries, while providing enhanced reach for the robotic arm and/or collision avoidance.

A. Cannula with Stability Ridges Including Multiple Remote Center of Motion Markings As described previously, the cannula 235 functions as an access port 235, or portal, through which instruments can be placed. Traditionally, cannulas may be made of plastic or metal and are generally lightweight and rigid. Unlike the cannulas described herein and utilized by the subject technology, traditional cannulas have no defined features or markings for determining how far into the abdominal cavity they have travelled. It has been generally up to the surgeon, or skilled assistant, to determine how far a cannula may be inserted into an abdominal cavity, or whether further insertion can be accomplished without damage to the patient.

As shown in FIGS. 24A through 24D, the subject technology includes a cannula 235 with distinct markings for identifying a remote center of motion (RCM) and (in some aspects) for determining a proximity to the RCM. As depicted in FIG. 24A, the cannula 235 includes one or more RCM markings 402 that, when the cannula 235 is inserted through a body wall 245 of a patient, is representative of the RCM utilized by the robotic arm when operating a medical tool in a three-dimensional space (as described previously with regard to FIGS. 21 and 22). In some implementations, the RCM marking may be laser etched.

A clinician may visually use an RCM marking(s) 402 as a basis for determining the RCM utilized by the robotic arm. When placed, as depicted in FIG. 24C, the robotic arm may use an RCM location corresponding to an RCM marking as a center of motion when manipulating a medical tool. For the purpose of the subject technology disclosed herein the location of the RCM marking may be referred to or used interchangeably with the corresponding RCM location, generally, to describe various implementations disclosed herein.

In certain scenarios, clinicians may be required to understand the location of the RCM at all times. The RCM marking(s) 402 provide for correct placement of the cannula so as that the clinician remains confident that the RCM is in the correct layer of the abdominal wall, and has not slipped out of the peritoneal cavity, as depicted in FIG. 24D.

According to various implementations, including the depicted example, the cannula 235 further includes one or more sets of RCM-proximity markings 404 extending around (or encircling) the elongated shaft of the cannula 235, each set straddling or encompassing a respective RCM marking 402 a predetermined distance along the cannula from the RCM marking. The proximity markings 404 facilitate proper insertion in the body wall. For example, when the cannula 235 is inserted through the body wall 245, as depicted in FIG. 24B, the proximity markings 404 may inform the clinician of the depth of the cannula and its location with regard to the various facia layers.

As depicted in FIGS. 24A through 24D, the RCM-proximity markings 404 may be incorporated into stability ridges extending around each RCM 402. These segments of ridges are incorporated in a way that allows the cannula to rotate freely about the RCM, while the stability ridges grab onto the peritoneum, preventing the cannula from further inserting or retracting during use. The cannula 235 may be otherwise smooth across the remaining portions of the elongated shaft. The stability ridges support current cannula insertion and removal practices, but may also provide additional stability intra-operatively, allowing the cannulas to remain in position during use. For example, metal cannula shafts may be slippery and may not maintain position relative to the abdominal wall when undocked. Metal cannula drops are one reason that metal cannulas become unusable and discarded. Stability ridges 404 reduce the likelihood of a metal cannula 235 dropping out of patient, for example, in lateral port placements.

The stability ridges 404 provide a means for acceptable manual use of a robotic cannula that may prevent users from incorporating additional manual ports and cannulas into operating procedures. Moreover, the stability ridges 404 provide a more controllable way to adjust cannula positioning between RCMs and provide visual RCM proximity indicators providing clinicians with contextual awareness of the actual RCM locations.

In some implementations, the stability ridges 404 extend through a respective RCM marking 402. In some implementations a set of stability ridges 404 includes a group stability ridges on each side of a respective RCM marking 402 or, in some implementations, only on one side. The stability ridges may start a predetermined distance from the RCM marking, or the marking may be defined by the space between the two respective groups of a stability ridge set. In the later implementations, the RCM location may not have ridges but, rather may be smooth. Each group may include one or more ridges, and a cannula 235 may have ridges of one or more sizes. The cannula 235 may have uniform or different ridge patterns for each RCM.

Figure 25:
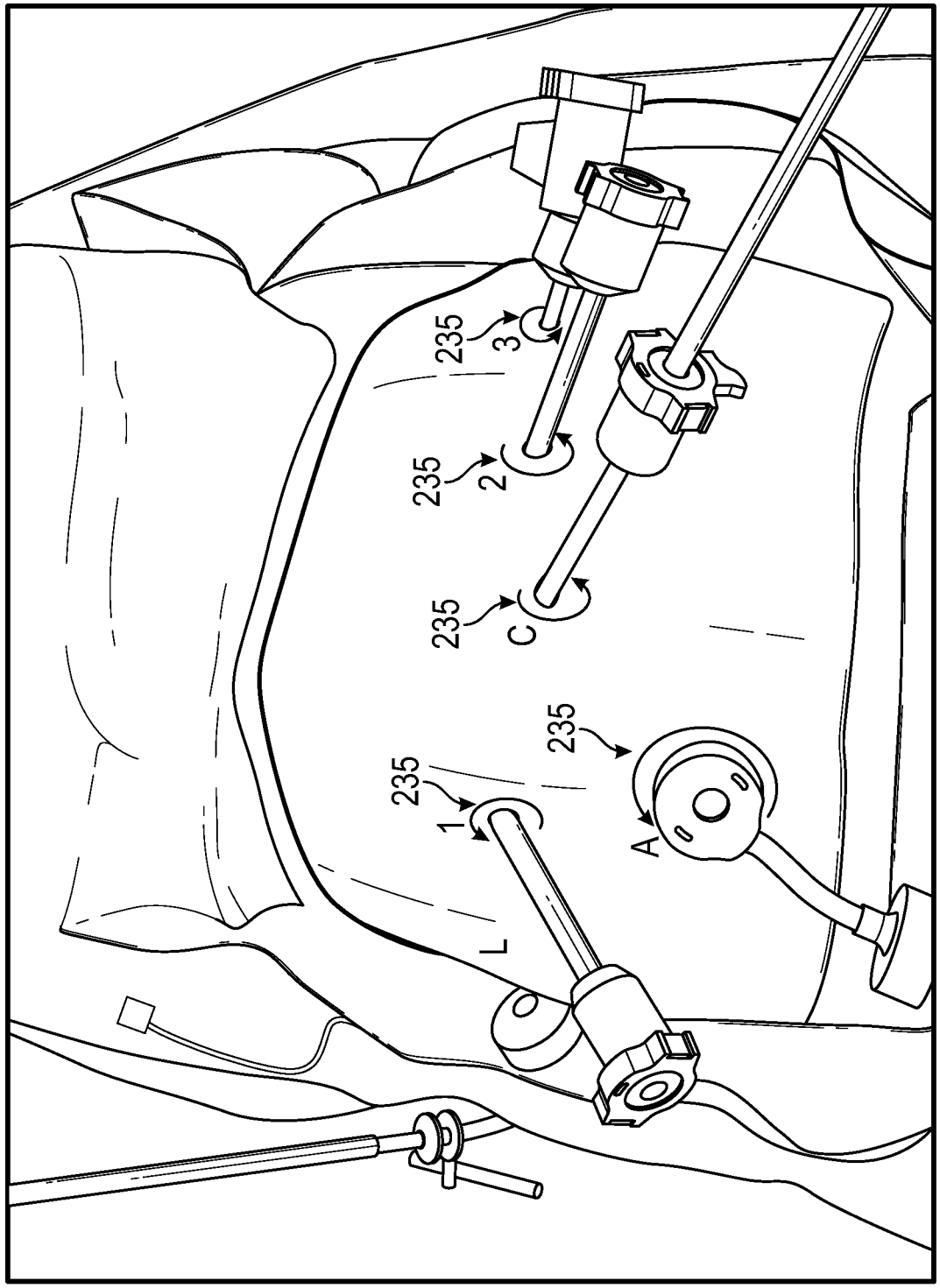
FIG. 25 depicts an example placement of multiple cannulas through a patient's abdomen in accordance with aspects of the subject technology disclosed herein.

FIG. 25 depicts an example placement of multiple cannulas 235 through a patient's abdomen. Each cannula 235 should freely rotate about a respective RCM. By providing predetermined RCM locations, this can help the system to assess each cannula's internal proximity to each other and with regard to RCM. With brief reference to FIG. 24A, each cannula may include multiple RCM locations (e.g., two, three, or more), each being encompassed by a respective stability ridge set. The disclosed RCM markings 402 provide explicit communication of RCM locations to clinicians. Accordingly, correct placement can be achieved and the cannula position maintained during manual and robotic use cases while allowing each cannula to freely rotate about its RCM.

With reference to FIGS. 20, 22, and 24 and their corresponding disclosure, each cannula may include an identifier specific to its RCM configuration. In this regard, the identifier may facilitate determining, by software of the robotic system (e.g., within localization module 95), the size of the cannula, how many RCM locations (and markings) the cannula is configured for, and the location of each RCM location (and, in some implementations, stability ridges 404 or stability ridge groups). In some implementations, the identifier may be electronically stored in the catheter 235 and provided electrically to an ADM 205 when the cannula is mounted to the ADM. In turn, the ADM 205 may provide the identifier to the robot system via the control signals communicated by the ADM 205. In this regard, the control unit of the robotic system (e.g., within tower 30) may receive the identifier associated with the cannula 205 and which describes the elongated shaft of the cannula and its RCM features and determine, based on the identifier, each RCM location with respect to a portion of the robotic arm.

The robotic system may, based on receiving an identifier for a cannula having two RCM locations, identify a first location 402a and a second location 402b on the elongated shaft of the cannula and map the locations to the three-dimensional operational space. The first location may be defined as a predetermined distance from the second location or vice versa. Values for the RCM locations may include a distance from a base or tip of the cannula and may be different for different identifiers. A distance from a first RCM location to a second RCM location may be set, for example, to a first value(s) when the identifier is a first identifier and may be set to a second value(s) different than the first values when the identifier is a second identifier different than the first identifier. Having the ability to map the RCM location to a three-dimensional space and knowing the distance between respective RCM locations associated with the same cannula facilitate operation of a guided mode, described hereafter.

B. Guided Arm Adjustment Mode

In addition to the automatic adjustment of a remote center distance by the robotic system (e.g., during collision avoidance), in some implementations, the system may also be configured to allow a user to manually adjust a remote center distance. In particular, certain actions on the robotic system may benefit from being performed manually rather than through robotic adjustment.

Moreover, to safely reposition the cannula (e.g., either deeper or more shallow) within the body cavity, or to remove a cannula from the body cavity, a robotic system may require undocking the cannula from an arm and/or manually twisting the cannula to move the cannula. Such manipulation may involve particular skill and, at many institutions, the only person sufficiently trained is the surgeon, who would have to go through the entire scrubbing process just to touch the cannula.

The subject technology provides a guided arm adjustment mode, whereby a bedside user can manually and safely advance or retract a robotic arm when a cannula is in a body cavity after they, or someone else, activates this mode. When a surgeon is performing surgery and runs out of instrument space, a staff member (or the surgeon) can advantageously activate a novel guided adjustment mode (also called an "second RCM mode", or a "guided arm insertion mode" when used to advance a cannula into the patient). In some implementations, the robotic arm in question can then indicate audibly and/or visibly that it has now entered the mode, alerting the bedside user that that arm can now be moved from one RCM to the other.

Figure 26:
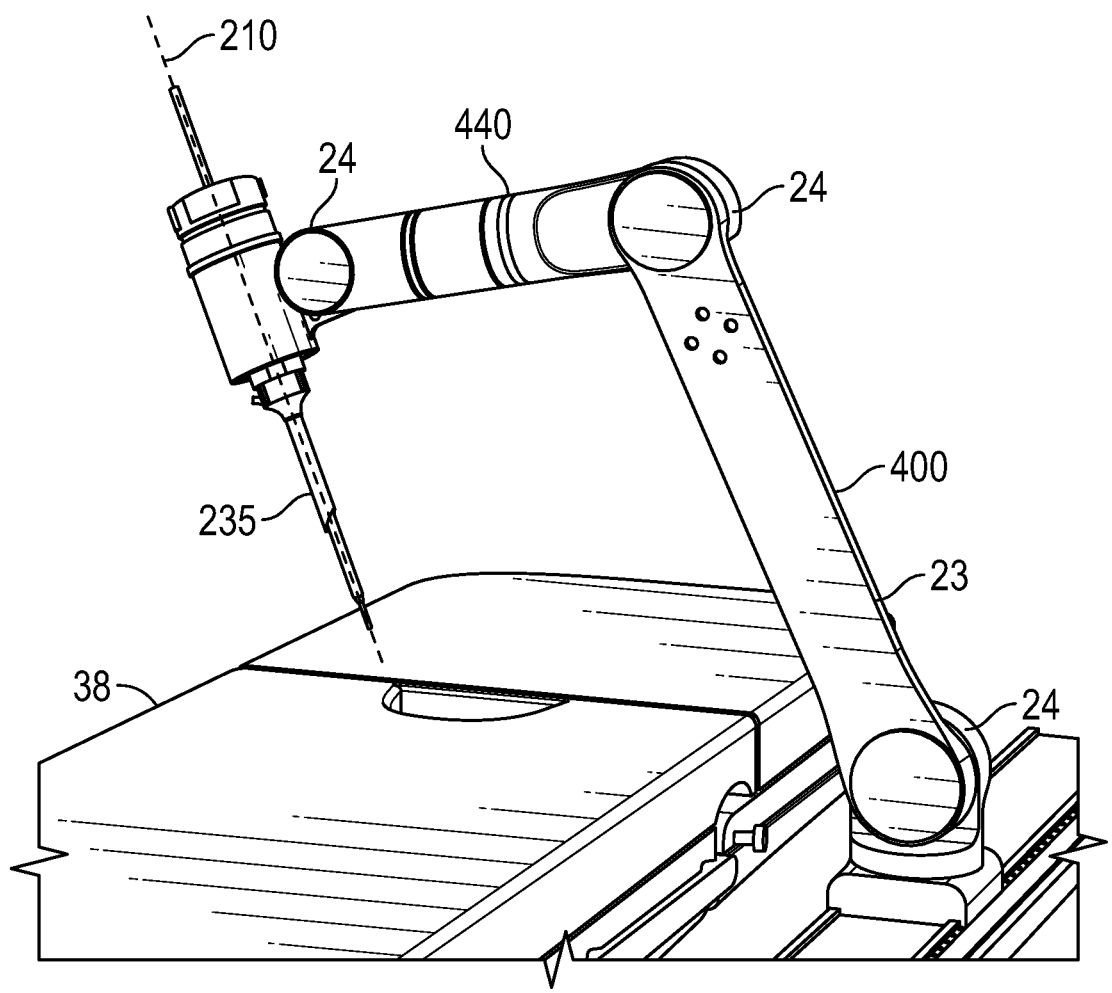
FIG. 26 depicts an example robotic arm including a guided adjustment notification ring, in accordance with aspects of the subject technology disclosed herein.

FIG. 26 depicts an example robotic arm 400 including a distal LED ring 440, in accordance with aspects of the subject technology. In some implementations, the LED rings provides notification to a user that the robotic arm is under guided arm adjustment mode. The depicted robotic arm 400 includes a plurality of links 23 and joints 24 that cooperate to move a medical tool within a three-dimensional space. According to various implementations, the robotic arm may be coupled to a cannula 235—an elongated shaft—adapted to deploy through a body opening (not shown) of a patient. In the depicted example, the robotic arm is deployed over a table 38 upon which a patient may be placed for insertion of a medical tool, as described previously.

The robotic arm 400 is docked to the cannula 235, which enters into a body wall of the patient. A medical tool is then coupled to the backside of the robotic arm and inserted through the cannula. The cannula includes a first set of markings 402a and a second set of markings 402b, as described with regard to FIG. 24A. A remote center of motion corresponds to a control point where the cannula intersects the body wall of the patient. In some implementations, the cannula at the first set of markings 402a is at the control point (e.g., managed by the software of the control unit) and rotates about a center of motion. Then, under the guided adjustment mode, the cannula 717 can safely move axially such that the second set of markings 402b in cannula moves toward the virtual point. At this point, the cannula 717 at the second set of markings is at the control point and rotates about the new center of motion.

The robotic system may be able to accept input from a user via a user input device to enter a guided adjustment mode to adjust a remote center distance. The user input device may be part of controller 182 of FIG. 19 or tower 30, and input may be received by way of activating an input control on the controller. In another example, the system may be configured to accept input from a user in an 'input mode' where the user provides input in the form of a force applied directly to the robotic arm. The robotic system may be configured to accept a user command to enter a mode for adjusting the remote center distance via an input control (e.g., a button or switch) on the robotic arm and interpret forces exerted on the robotic arm by the user as input for adjusting the remote center distance.

When the bedside user is in the process of modifying the RCM from, for example, a first RCM to a second RCM (e.g., via insertion of the robotic arm and the associated instrument attached thereto), a notification may be provided to the user alerting him or her that the robotic arm is in the guided adjustment mode and the attached cannula 235 can be moved from one RCM to another.

In some implementations, the robotic arm includes a visual notification that provides a visual alert when the mode is active. The visual indication may be displayed on a control screen associated with controller 182 or may be a separate LED display positioned near table 38 or within the operating room, generally. In the depicted example, the robotic arm includes an LED ring 440 that extends or wraps around a portion of the robotic arm. The notification may stay on for the entire duration that it is in this mode or, in some implementations, come on and off as a user interacts with the arm in this mode. For example, the light may only flash when a user is not activating the control touchpoint, even though the robotic arm remains in the guided mode. Additionally or in the alternative, the notification may include an audible notification. By providing such a notification, the system is advantageously conveying to a user that the respective arm is in a guided adjustment mode, such that the user can manually adjust the arm and the remote center in a safe and controlled manner.

Figure 27A:
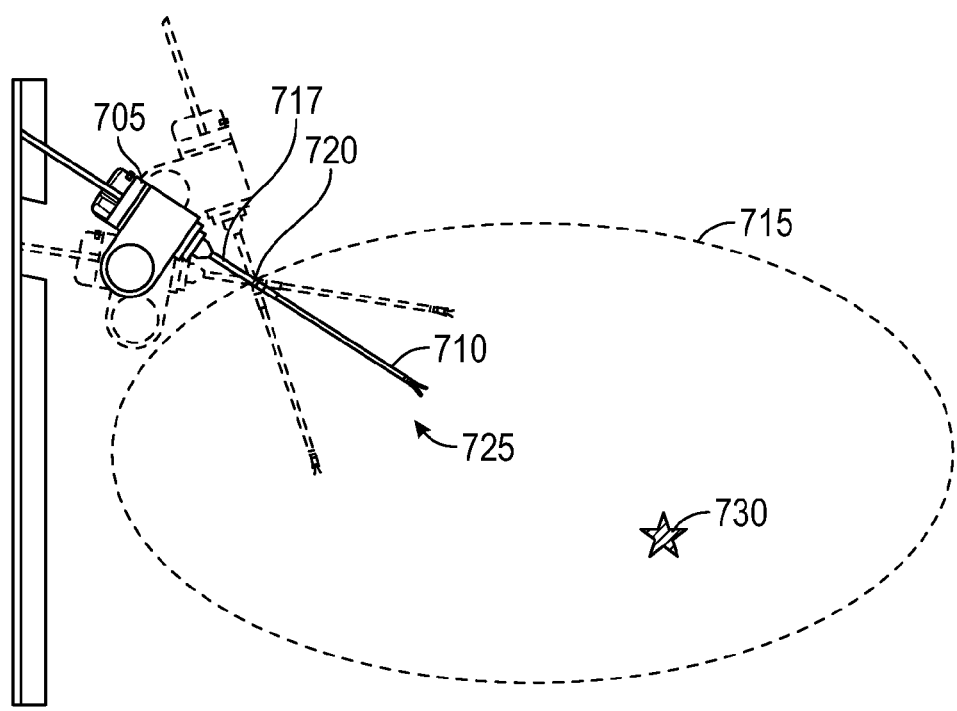
FIGS. 27A-27E illustrate an example of switching between two remote centers of motion during a guided mode, according to various aspects of the subject technology disclosed herein.

FIGS. 27A-27E illustrate an example of switching between two remote centers of motion during a guided adjustment mode, according to various aspects of the subject technology. Referring to FIG. 27A, an ADM 705 can insert a medical tool 710, through a patient's body wall 715 via a cannula 717. A robotic medical system may define a control point 720 within the three-dimensional operational space that functions as a remote center of motion around which the ADM 705, cannula 717, and medical tool 710 can rotate as illustrated by the ghosted ADM 705, cannula 717, and medical tool 710. According to various implementations the control point 720 corresponds to an intersection between a body opening of the patient and a location on the elongated shaft of the cannula 717 at the body opening.

Figure 27C:
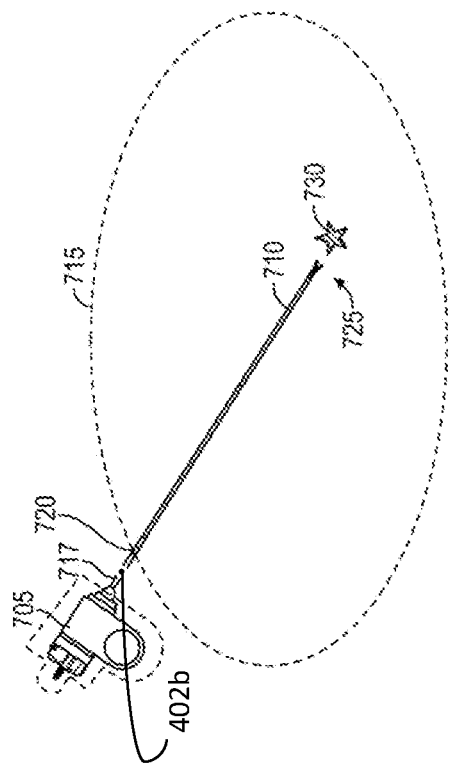
Figure 27B:
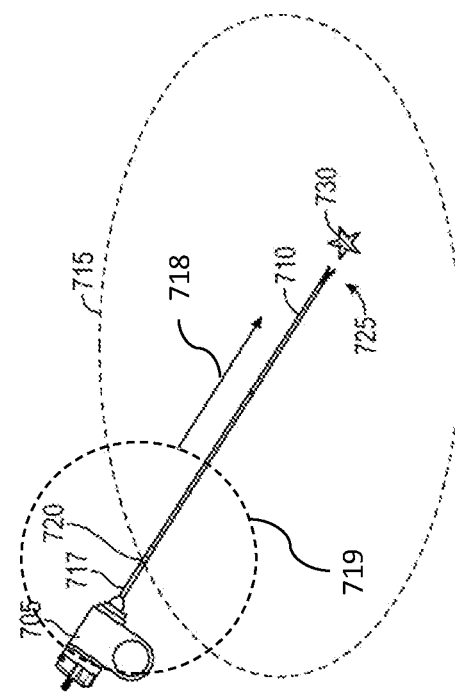

FIG. 27B further illustrates a virtual sphere 719 within the three-dimensional space, the virtual sphere having a center corresponding to the determined control point 720 as shown in FIG. 27B. In some implementations, the virtual sphere 719 represents an area upon which the cannula moves about the remote center of motion. In some implementations, the software (e.g., by way of the control unit) causes the robotic arm (e.g., by way of signals to the robotic arm's joints 24) to constrain a portion of the robotic arm to move along a virtual surface of the virtual sphere 719 when the robotic arm manipulates the medical tool 710, such that when the portion of the robotic arm is moved along the virtual surface the elongated shaft of the cannula 717 pivots about the control point 720 as it relates to a location on the elongated shaft.

During an example medical procedure, a user may drive the medical tool 710 such that an end effector 725 can reach a target site 730 (e.g., a nodule, portion of an anatomy, etc.).

FIG. 27B illustrates driving the medical tool 710 towards the target site 730 along a virtual axis 718 while maintaining the remote center at the control point 720.

In FIG. 27C, the robotic arm is in a guided adjustment mode. The surgeon may run out of working length of the medical tool 710 before the end effector 725 reaches the target site 730. In order to reach the target site 730, the guided adjustment mode may be activated to allow for manual adjustment of the RCM of the cannula 717. As previously described, the guided mode may be entered by way of a user (e.g., the surgeon, other clinician, or bedside user) activating a control to place the robotic system in the guided mode.

According to various implementations, and for the safety of the patient, when the robotic arm is in the guided arm mode, the robotic arm may be constrained in all degrees of freedom except in a straight-line 718 towards or away from the patient. In some implementations, the robotic arm may be constrained to move along tool path 210 of FIG. 22. In some implementations, the ADM remains active during manual movement of the cannula, and may automatically move the tip of the instrument proportional and opposite the manual movement of the robotic arm so that the instrument remains fixed in place, so that there is no risk of it running into any organs or tissue.

As will be described further, the robotic arm may be preprogrammed to allow movement to a predetermined second RCM. In this regard, the robotic system may first determine a first location 402a (see FIG. 24A for reference) on the elongated shaft of the cannula 717 corresponding to the control point 720. As shown in FIG. 27A, this first location acts as a center of motion when the first location is at the control point and the robotic arm manipulates the medical tool. According to various implementations, the robotic system also determines a second location 402b on the elongated shaft at a predetermined distance from the first location 402a. In implementations where an identifier is received from the cannula, the system may automatically determine the second location 722 (within the three-dimensional space) by indexing a lookup table based on the identifier.

Figure 27E:
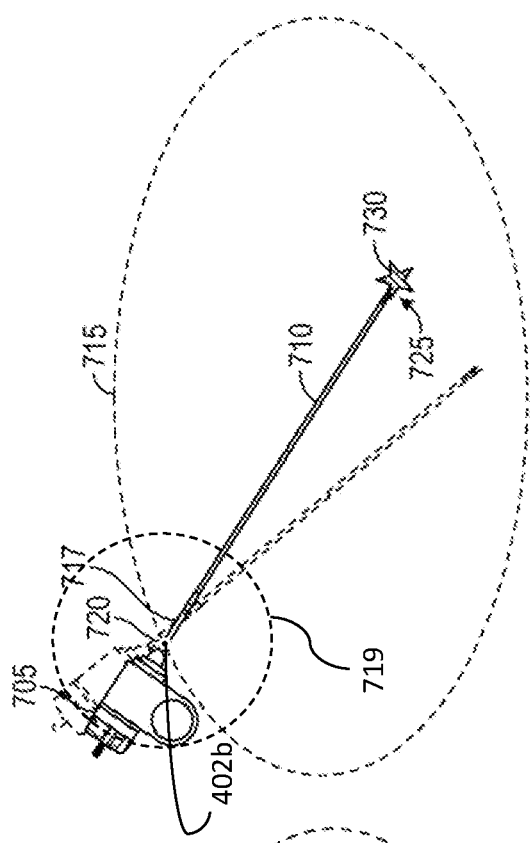
Figure 27D:
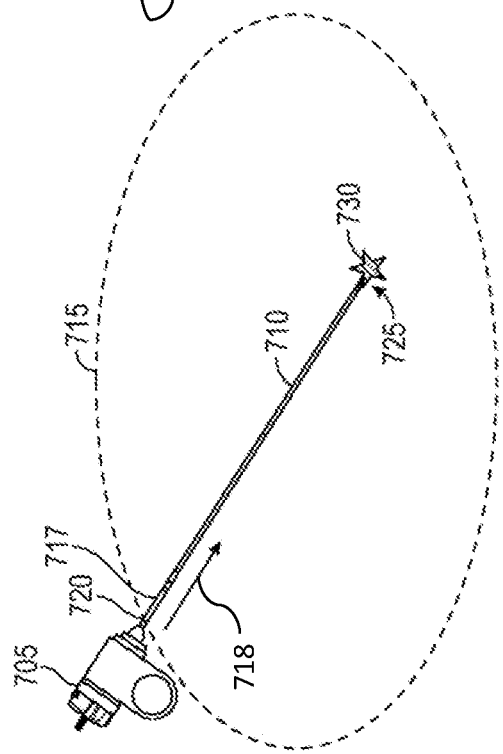

When the robotic arm is placed in the guided mode, the robotic system determines a current orientation of the cannula (e.g., along an axis of the elongated shaft), and may lock the joints 24 of the robotic arm so that the second RCM location 402b may only move toward the control point 720. In other words, the arm may be constrained in all degrees of freedom except in a straight line 718 towards or away from the patient, as shown in FIG. 27D. As described previously, the tip of the instrument or medical tool may also remain fixed in place so that there is no risk of it running into any organs or tissue. Accordingly, the control unit of the robotic system may automatically (e.g., without user intervention) cause the medical tool to retract or extend into or from the elongated shaft proportionate to the movement of the elongated shaft along the trajectory of the virtual axis 718 so that a distal end of the medical tool is maintained at a single position while the elongated shaft is moved.

Once the arm has been moved so that the second RCM location 402b is at the control point 720, the robotic system may restrict further movement and/or lock the robotic arm in place. The control unit may then terminate the guided mode. Also, after the guided mode is terminated and the second location 402b is fixed at the control point 720, the size of the virtual sphere 719 may be adjusted so that the robotic arm (or portion thereof) is moved the elongated shaft pivots about the second location 402b on the elongated shaft, as shown in FIG. 27E. Accordingly, when the cannula 717 is being repositioned within the body of the patient, the surgeon can then pivot the ADM 705, cannula 717, and medical tool 710 about the control point 720 with the second location 402b on the cannula shaft as the new remote center, allowing for an increased maximum distance that the medical tool 710 can be inserted into the patient.

Accordingly, the guided adjustment mode allows a member of staff that isn't the surgeon to safely advance or retract the cannula from the patient's abdomen, as due to the audio or visual indication, the user has confidence that the arm will lock once it reaches the other RCM. Therefore, the user has confidence that the arm will stop moving once it has reached the second RCM. In some implementations, the motion of the arm can be (e.g., heavily) damped so that a user cannot advance or retract the arm too quickly such as to risk unintentional harm to the patient. Once the arm has reached the other RCM, the arm will automatically exit the guided mode and "lock in place", and the surgeon can reclaim control of the arm and the instrument and resume driving, pivoting about the "new" center of motion. In some implementations, control of the robotic arm is automatically passed to the surgeon. As described previously with regard to FIG. 26, a notification may be sent to the surgeon's control display informing the surgeon that control has been transferred. In some implementations, the surgeon may be required to reclaim the control after receiving a notification that the guided adjustment mode has ended or that the arm has been locked at the second RCM.

Figure 28:
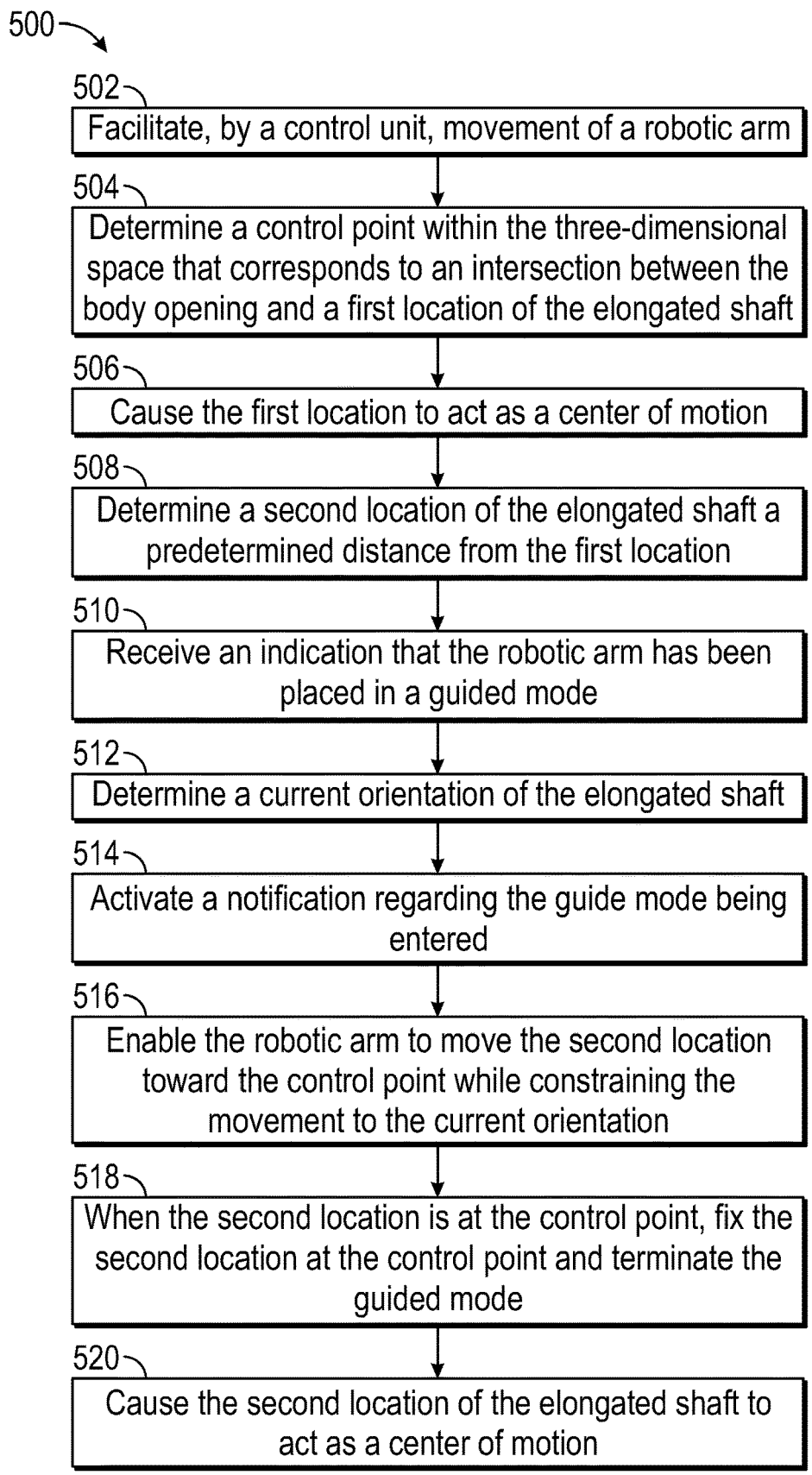
FIG. 28 depicts an example process for guiding adjustment of a remote center in a robotically assisted medical procedure, according to aspects of the subject technology disclosed herein.

FIG. 28 depicts an example process for guiding adjustment of a remote center in a robotically assisted medical procedure, according to aspects of the subject technology. For explanatory purposes, the various blocks of example process 500 are described herein with reference to the components and/or processes described herein. The one or more of the blocks of process 500 may be implemented, for example, by one or more computing devices including, for example, a control unit of the previously described robotics system. In some implementations, one or more of the blocks may be implemented based on one or more machine learning algorithms. In some implementations, one or more of the blocks may be implemented apart from other blocks, and by one or more different processors or devices. Further for explanatory purposes, the blocks of example process 500 are described as occurring in serial, or linearly. However, multiple blocks of example process 500 may occur in parallel. In addition, the blocks of example process 500 need not be performed in the order shown and/or one or more of the blocks of example process 500 need not be performed.

In the depicted example, the disclosed robotic system facilitates movement of a robotic arm (502). The robotic arm, as described previously, includes a plurality of links 23 and joints 24 that cooperate to move a medical tool 710 within a three-dimensional space. According to various implementations, the robotic arm is coupled to an elongated shaft, or a cannula, adapted to deploy through a body opening of a patient.

The robotic system determines a control point 720 within the three-dimensional space that corresponds to an intersection between the body opening and a first location of the elongated shaft (504). In some implementations, the control point 720 is determined based on a current location (within the three-dimensional space) of a first RCM location 402a of the elongated shaft (see FIG. 24A for reference). The robotic system then causes the first location 402a of the elongated shaft act as a center of motion for the elongated shaft when the robotic arm manipulates the medical tool (506), as shown in FIGS. 27A and 27B.

The robotic system determines a second RCM location 402b of the elongated shaft a predetermined distance from the first location (508). As described previously, the control unit may determine the first and/or second locations 402 along the elongated shaft of the cannula by way of a lookup performed based on an identifier received from the cannula. The robotic system may, for example, receive the identifier during the cannula docking process, or the identifier may be input by a user at a terminal associated with the robotic system. In this regard, the control unit determines, based on the identifier, the first location and the second location of the elongated shaft with respect to a portion of the robotic arm (e.g., with respect to a location in the three-dimensional space of the ADM).

An indication that the robotic arm has been placed in a guided mode is received (510). In some implementations, the indication results from an activation of an input control. As described previously, the user input control may be part of controller 182 of FIG. 19, on the robotic arm itself, part of tower 30, or on other hardware of or associated with the robotic system. In some implementations, the control unit determines whether the cannula is attached and/or docked to the robotic arm before entering the mode.

In response to the robotic arm being placed in the guided mode, the robotic system determines a current orientation of the elongated shaft within the three-dimensional space (512). According to various implementations, the control unit continuously receives motion information from the joints 24 of the robotic arm. This information may be mapped by the control system into the three-dimensional operational space and a virtual axis 718 (see FIG. 27B) of the cannula may be determined. The virtual axis may be determined, for example, based on drawing the virtual axis through the locations of the first RCM location 402a and second RCM location 402b of the cannula 235 in the three-dimensional space.

Additionally, the robotic system may activate a notification regarding the guided mode being entered (514). According to various implementations, the notification may be a visual alert provided by a visual alert component. In some implementations, the visual alert component is an LED band coupled to or embedded within the robotic arm. For example, the LED band may be a ring the encircles a portion of the robotic arm and lights up when the guided mode is activated. The alert may be a persistent alert that remains active while the robotic arm is in the guided mode. In some implementations, the alert may be or include an auditory alert, that may periodically (e.g., every few seconds) activate to inform persons surrounding the robotic arm that the arm is in the guided mode. The notification may remain activated so long as the guided mode is active, and automatically deactivate responsive to the guided mode being terminated.

Responsive to entering the guided mode and while the guided mode is activated, the robotic arm is enabled by the robotic system to move the second location of the elongated shaft toward the control point 720 while movement of the elongated shaft is constrained to the current orientation (516). For example, the control unit may constrain movement of the robotic arm to the current orientation by constraining each joint in a manner consistent with the current orientation. In this regard, the robotic arm may be configured to, when in the guided mode, become rigid except for permitting movement of the elongated shaft along a trajectory of a virtual axis aligned with the current orientation.

In some implementations, the robotic arm is locked into the current orientation (e.g., by the control unit) but allowed to freely move along a virtual axis or path 718 according to the current orientation (see FIG. 27D). According to various implementations, the movement provided by the control unit facilitates maintaining a current orientation and direction, for example, in a linear path toward or away from the patient, or between the first and second RCM locations. In some implementations, the control unit of the robotic system may monitor the joints 24 of the robotic arm for a manual force applied to the robotic arm by a user and apply assisted movement of the robotic arm. In some implementations, the robotic arm is entirely moved by the control unit responsive to the user's force.

The control unit may receive force information from the joints 24 may be received by the control unit (e.g., responsive to a manual force being applied to the robotic arm). The force information may include a direction of the manual force in any direction, and the control unit may then translate that force into a movement constrained to the current orientation. The control unit may then cause the robotic arm to move the elongated shaft a predetermined distance in the direction of the manual force. For example, the control unit may process force information multiple times per second and, for during each cycle, move the arm a relatively small distance to simulate a natural amount of movement over a number of cycles. In this regard, the movement of the arm may "feel" as if it is entirely manual, the robotic arm actually may not be manual but entirely under the control of the control unit.

In some implementations, the robotic arm may utilize the previously described admittance and/or impedance control while in the guided mode. In some implementations, the control unit will saturate a current velocity of the robotic arm during the guided mode.

When the second location is at the control point 720, the robotic system fixes the second location at the control point and terminating the guided mode (518). For example, upon the second location reaching the control point, the robotic arm may snap to a locked position wherein the movement along the current trajectory is no longer permitted.

After the guided mode is terminated, the robotic system causes the second location of the elongated shaft to act as a center of motion for the elongated shaft when the robotic arm manipulates the medical tool (520).

Many of the above-described example 500, and related features and applications, may also be implemented as software processes that are specified as a set of instructions recorded on a computer readable storage medium (also referred to as computer readable medium), and may be executed automatically (e.g., without user intervention). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

The term "software" is meant to include, where appropriate, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 29:
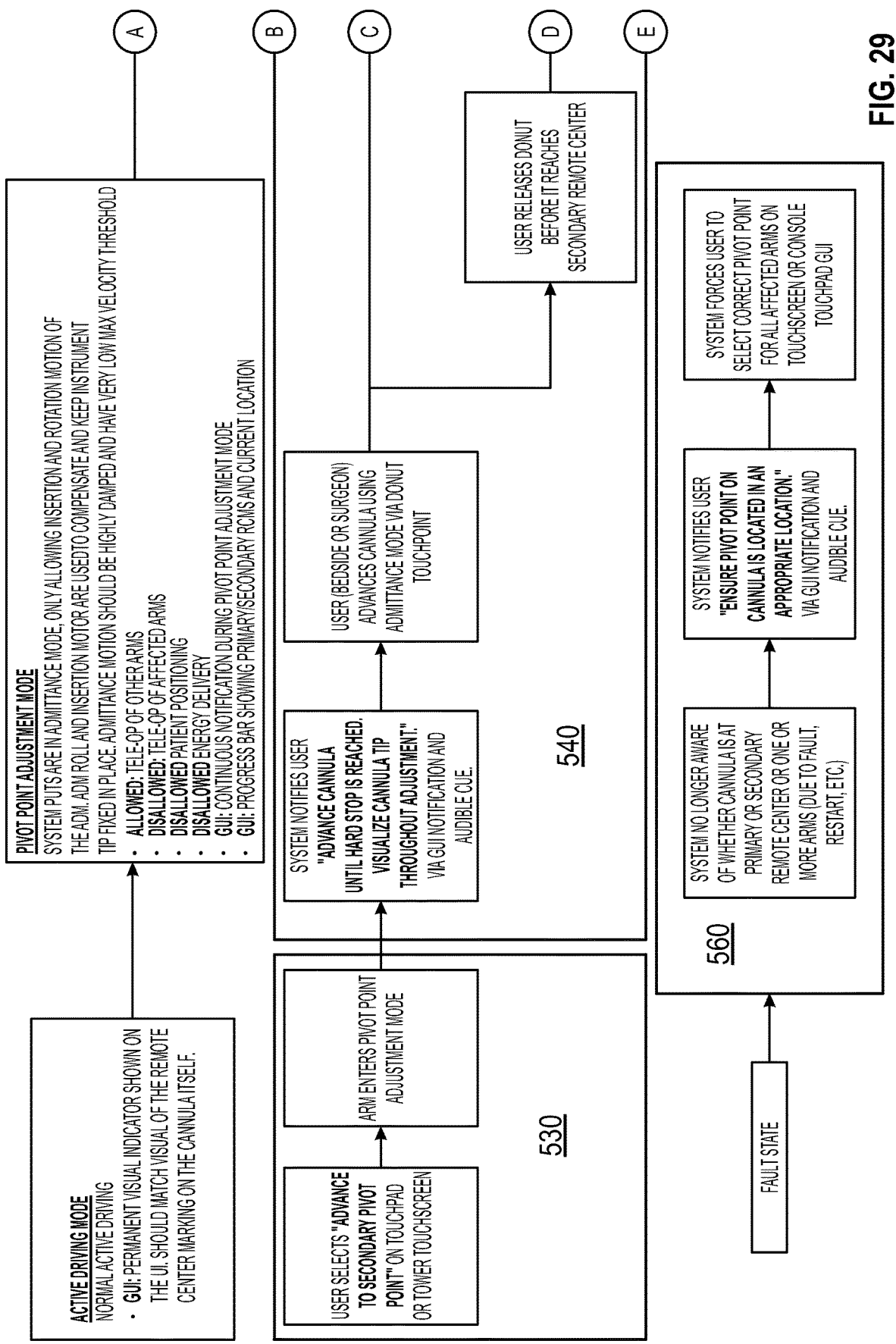
FIG. 29 depicts an example workflow for guiding adjustment of a remote center in a robotically assisted medical procedure, according to aspects of the subject technology disclosed herein.
Figure 29:
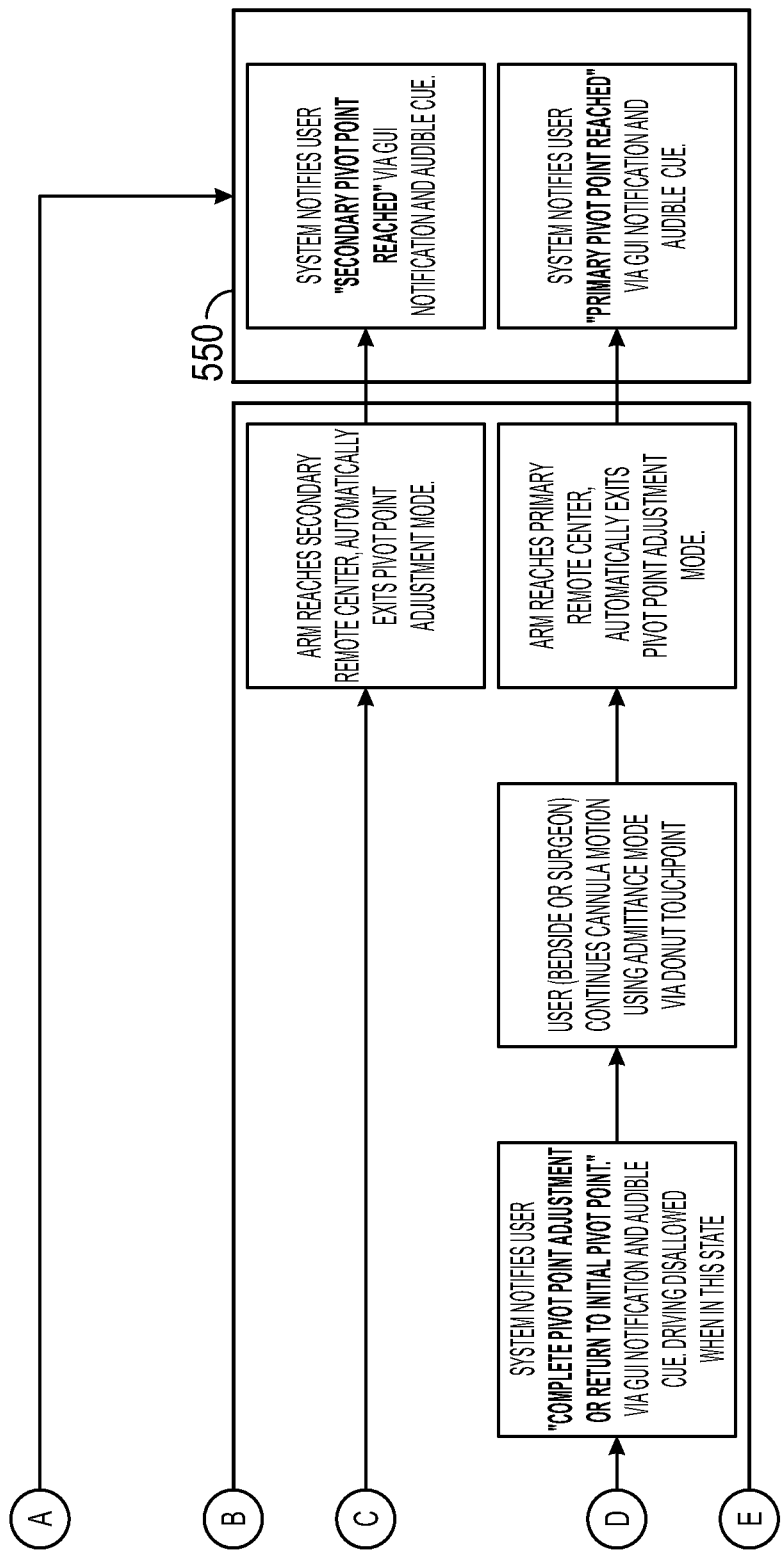

FIG. 29 depicts an example workflow for guiding adjustment of a remote center in a robotically assisted medical procedure, according to aspects of the subject technology disclosed herein. As depicted in the example implementation, the robotic system may switch between an active driving mode wherein the robotic arm is controlled remotely via a control interface, to the previously described guided mode (also called a "pivot point adjustment mode") in which the robotic arm may be manually moved under guided adjustment control. The system may include (e.g., on tower 30 or an associated touchpad), a graphical user interface (GUI) to facilitate movement and/or notifications regarding the robotic arm(s) of the robotic system.

During normal operation ("Active Driving Mode") the GUI may provide a visual indicator of the current remote center of motion being utilized by a respective robotic arm. The system may further display a graphic of the cannula, as shown in FIG. 24A and identify the RCM being used on the displayed cannula. A user (e.g., a surgeon, clinician, or other bedside user) selects a selection for advancing the cannula to a secondary pivot point on a computing device associated with the robotic system (e.g., on tower 30 or an associated touchpad). In response to the selection, the system enters the previously described guided mode (540).

Responsive to entering, and during, the guided mode (540), the system notifies via a visual alert or audible components that the system has entered the guided mode. In the depicted example, the graphical user interface instructs the user to advance the cannula until a hard stop is reached (e.g., corresponding to the second RCM location 402b). The user may then advance the cannula manually, as described previously. If the user stops moving the arm or otherwise does not advance the cannula to the next RCM location, the system notifies the user to complete the adjustment or return to the previous RCM.

During the guided mode, certain functions may be allowed and some disallowed. For example, tele-operation (e.g., via controller 182) of the affected arm may be disallowed while allowed for other unaffected arms. Energy delivery by the robotic system may also be disallowed. The GUI may inform the user that patient positioning is also disallowed. According to various implementations, the GUI provides continuous notification during the guided adjustment mode. In some implementations, the GUI may display a progress bar showing the cannula's position with regard to its first and second RCM locations (see FIG. 24A) and a given control point 720 (e.g., corresponding to the body opening).

According to various implementations, cannula movement may be assisted using admittance control. For example, the system may place the arm in admittance mode, only allowing insertion and rotation motion of the ADM. ADM roll and insertion motor may also be used to compensate and keep instrument tip fixed in place. According to various implementations, admittance motion is highly damped and has a very low max velocity threshold.

As described previously, when the arm is moved so that the next RCM location is reached, the arm automatically exits the guided mode. According to various implementations, the system may then notify the user that the next pivot point has been reached and the guided mode is terminated (550).

According to some implementations, the system may also include a fault state (560). As an example, the fault state may be entered when the system becomes unaware of whether the cannula is at a primary or secondary remote center (e.g., the first RCM location 402a or the second RCM location 402b). The system may then notify the user (e.g., via the GUI) to ensure that the pivot point on the cannula is at an appropriate location. In some aspects, an audible and/or visual alert may also be displayed. For example, the notification ring 440 may change colors (e.g., from blue to red) and/or flash. Confirmation of the change may further be required via the GUI. In this regard, the system forces the user to select a correct pivot point for all affected robotic arms via the GUI.

3. Implementing Systems and Terminology

Implementations disclosed herein provide systems, methods, and apparatus for adjusting medical device remote center distances.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component via another component or directly connected to the second component.

The functions for adjusting remote center distance described herein may be stored as one or more instructions on a processor-readable or computer-readable medium. The term "computer-readable medium" refers to any available medium that can be accessed by a computer or processor. By way of example, and not limitation, such a medium may comprise random access memory (RAM), read-only memory (ROM), electrically erasable programmable read-only memory (EEPROM), flash memory, compact disc read-only memory (CD-ROM) or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The previous description of the disclosed implementations is provided to enable any person skilled in the art to make or use the present invention. Various modifications to these implementations will be readily apparent to those skilled in the art, and the generic principles defined herein may be applied to other implementations without departing from the scope of the invention. For example, it will be appreciated that one of ordinary skill in the art will be able to employ a number of corresponding alternative and equivalent structural details, such as equivalent ways of fastening, mounting, coupling, or engaging tool components, equivalent mechanisms for producing particular actuation motions, and equivalent mechanisms for delivering electrical energy. Thus, the present invention is not intended to be limited to the implementations shown herein but is to be accorded the widest scope consistent with the principles and novel features disclosed herein.

Some embodiments or implementations are described with respect to the following clauses:

Clause 1. A system for robotic manipulation of a medical tool, comprising:
a robotic arm comprising a plurality of links and joints that cooperate to move a medical tool within a three-dimensional space, the robotic arm coupled to an elongated shaft adapted to deploy through a body opening of a patient; and
a control unit configured to:
determine a control point within the three-dimensional space that corresponds to an intersection between the body opening and a first location of the elongated shaft;
cause the first location of the elongated shaft to act as a center of motion when the first location is at the control point and the robotic arm manipulates the medical tool;
determine a second location of the elongated shaft at a predetermined distance from the first location;
receive an indication that the robotic arm has been placed in a guided mode;
responsive to the robotic arm being placed in the guided mode:
determine a current orientation of the elongated shaft;
enable the robotic arm to be moved such that the second location of the elongated shaft moves toward the control point while movement of the elongated shaft is constrained to the current orientation;
fix the second location of the elongated shaft at the control point and terminate the guided mode when the second location of the elongated shaft is at the control point; and
cause, after the guided mode is terminated, the second location of the elongated shaft to act as a center of motion for the elongated shaft when the robotic arm manipulates the medical tool.

Clause 2. The system of clause 1, further comprising:
a visual alert component coupled to the robotic arm,
wherein the control unit is further configured to:
cause the visual alert component to activate a visual alert responsive to the robotic arm being placed in the guided mode and while movement of the robotic arm is enabled; and
deactivate the visual alert component responsive to the guided mode being terminated.

Clause 3. The system of clause 2, further comprising:
an auditory alert component associated with the robotic arm,
wherein the control unit is further configured to:
periodically cause the auditory alert component to activate an auditory alert responsive to the robotic arm being placed in the guided mode and while movement of the robotic arm is enabled; and
deactivate the auditory alert component responsive to the guided mode being terminated.

Clause 4. The system of any of clauses 1-3, wherein the control unit is configured to enable the robotic arm to move the second location of the elongated shaft to the control point by:
monitoring the plurality of joints for a manual force applied to the robotic arm by a user;
receiving, responsive to the manual force being applied to the robotic arm, force information from the plurality of joints, the force information comprising a direction of the manual force constrained to the current orientation; and
causing the robotic arm to move the elongated shaft a predetermined distance in the direction of the manual force.

Clause 5. The system of any of clauses 1-4, wherein the indication that the robotic arm has been placed in the guided mode is based on activation of a control or determination that the elongated shaft is docked to the robotic arm.

Clause 6. The system of any of clauses 1-5, wherein the control unit is further configured to:
receive an identifier associated with the elongated shaft; and
determine, based on the identifier, the first location and the second location of the elongated shaft with respect to a portion of the robotic arm, wherein the first location and the predetermined distance from the first location to the second location are set to first values when the identifier is a first identifier and are set to second values different than the first values when the identifier is a second identifier different than the first identifier.

Clause 7. The system of any of clauses 1-6, wherein the robotic arm is configured to, when in the guided mode, become rigid except for permitting movement of the elongated shaft along a trajectory of a virtual axis aligned with the current orientation.

Clause 8. The system of clause 7, further comprising:
a medical tool configured to protrude from within the elongated shaft, wherein the control unit is further configured to:
automatically cause the medical tool to retract or extend into or from the elongated shaft proportionate to the movement of the elongated shaft along the trajectory of the virtual axis so that a distal end of the medical tool is maintained at a single position while the elongated shaft is moved.

Clause 9. The system of clause 7 or 8, wherein the control unit is further configured to: saturate a current velocity of the robotic arm during the guided mode.

Clause 10. The system of any of clauses 7-9, wherein the control unit is further configured to:
determine a virtual sphere within the three-dimensional space, the virtual sphere having a center corresponding to the determined control point;
constrain a portion of the robotic arm to move along a virtual surface of the virtual sphere when the robotic arm manipulates the medical tool such that when the portion of the robotic arm is moved along the virtual surface the elongated shaft pivots about the first location on the elongated shaft; and
adjust, after the guided mode is terminated and the second location is fixed at the virtual point, a size of the virtual sphere so that when the portion of the robotic arm constrained to move along the virtual surface is moved the elongated shaft pivots about the second location on the elongated shaft.

Clause 11. A method for guiding adjustment of a remote center, comprising:
robotically facilitating movement of a robotic arm comprising a plurality of links and joints that cooperate to move a medical tool within a three-dimensional space, the robotic arm coupled to an elongated shaft adapted to deploy through a body opening of a patient; determining a control point within the three-dimensional space that corresponds to an intersection between the body opening and a first location of the elongated shaft;
causing the first location of the elongated shaft to act as a center of motion for the elongated shaft when the robotic arm manipulates the medical tool;
determining a second location of the elongated shaft a predetermined distance from the first location;
receiving an indication that the robotic arm has been placed in a guided mode;
responsive to the robotic arm being placed in the guided mode:
determining a current orientation of the elongated shaft;
enabling the robotic arm to move the second location of the elongated shaft toward the control point while movement of the elongated shaft is constrained to the current orientation; and
fixing the second location at the control point and terminating the guided mode when the second location is at the control point; and
causing, after the guided mode is terminated, the second location of the elongated shaft to act as a center of motion for the elongated shaft when the robotic arm manipulates the medical tool.

Clause 12. The method of clause 11, further comprising:
activating an alert responsive to the robotic arm being placed in the guided mode and while movement of the robotic arm is enabled; and
deactivating the alert responsive to the guided mode being terminated.

Clause 13. The method of clause 12, wherein the alert is a visual alert and activating the alert comprises illuminating an LED component encircling the robotic arm.

Clause 14. The method of any of clauses 11-13, further comprising:
identifying a manual force applied to the robotic arm while the guided mode is activated; and
electronically causing the robotic arm to move the elongated shaft a predetermined distance in a direction of the manual force.

Clause 15. The method of any of clauses 11-14, wherein the indication that the robotic arm has been placed in the guided mode comprises a control being activated.

Clause 16. The method of any of clauses 11-15, further comprising:
receiving an identifier associated with the elongated shaft; and
performing a lookup based on the received identifier to determine the second location and the predetermined distance from the first location.

Clause 17. A medical robotic system comprising at least one robotic arm coupled to an instrument and docked to a cannula, the cannula including a first location of the cannula and a second location of the cannula, wherein the at least one robotic arm is capable of entering a guided mode whereby a remote center of motion changes from the first location of the cannula to the second location of the cannula, and wherein an alert associated with the guided mode informs a user of entry into the guided mode.

Clause 18. The medical robotic system of clause 17, wherein in the guided mode the robotic arm is constrained to move in an axial direction.

Clause 19. The medical robotic system of clause 17 or 18, wherein the alert is visual or audible.

Clause 20. The medical robotic system of clause 19, wherein the visual alert comprises an LED coupled to the robotic arm.

What is claimed is:

1. A system for robotic manipulation of a medical tool, comprising:
a robotic arm comprising a plurality of links and joints that cooperate to move a medical tool within a three-dimensional space, the robotic arm coupled to an elongated shaft adapted to deploy through a body opening of a patient; and
a control unit configured to:
determine a control point within the three-dimensional space that corresponds to an intersection between the body opening and a first location of the elongated shaft;
cause the first location of the elongated shaft to act as a center of motion when the first location is at the control point and the robotic arm manipulates the medical tool;
determine a second location of the elongated shaft at a predetermined distance from the first location;
receive an indication that the robotic arm has been placed in a guided mode;
responsive to the robotic arm being placed in the guided mode:
determine a current orientation of the elongated shaft;
enable the robotic arm to be moved such that the second location of the elongated shaft moves toward the control point while movement of the elongated shaft is constrained to the current orientation;

fix the second location of the elongated shaft at the control point and terminate the guided mode when the second location of the elongated shaft is at the control point; and cause, after the guided mode is terminated, the second location of the elongated shaft to act as a center of motion for the elongated shaft when the robotic arm manipulates the medical tool.

2. The system of claim 1, further comprising:
a visual alert component coupled to the robotic arm, wherein the control unit is further configured to:
cause the visual alert component to activate a visual alert responsive to the robotic arm being placed in the guided mode and while movement of the robotic arm is enabled; and
deactivate the visual alert component responsive to the guided mode being terminated.

3. The system of claim 2, further comprising:
an auditory alert component associated with the robotic arm,
wherein the control unit is further configured to:
periodically cause the auditory alert component to activate an auditory alert responsive to the robotic arm being placed in the guided mode and while movement of the robotic arm is enabled; and
deactivate the auditory alert component responsive to the guided mode being terminated.

4. The system of claim 1, wherein the control unit is configured to enable the robotic arm to move the second location of the elongated shaft to the control point by:
monitoring the plurality of joints for a manual force applied to the robotic arm by a user;
receiving, responsive to the manual force being applied to the robotic arm, force information from the plurality of joints, the force information comprising a direction of the manual force constrained to the current orientation; and
causing the robotic arm to move the elongated shaft a predetermined distance in the direction of the manual force.

5. The system of claim 1, wherein the indication that the robotic arm has been placed in the guided mode is based on activation of a control or determination that the elongated shaft is docked to the robotic arm.

6. The system of claim 1, wherein the control unit is further configured to:
receive an identifier associated with the elongated shaft; and
determine, based on the identifier, the first location and the second location of the elongated shaft with respect to a portion of the robotic arm, wherein the first location and the predetermined distance from the first location to the second location are set to first values when the identifier is a first identifier and are set to second values different than the first values when the identifier is a second identifier different than the first identifier.

7. The system of claim 1, wherein the robotic arm is configured to, when in the guided mode, become rigid except for permitting movement of the elongated shaft along a trajectory of a virtual axis aligned with the current orientation.

8. The system of claim 7, further comprising:
a medical tool configured to protrude from within the elongated shaft,
wherein the control unit is further configured to:
automatically cause the medical tool to retract or extend into or from the elongated shaft proportionate to the movement of the elongated shaft along the trajectory of the virtual axis so that a distal end of the medical tool is maintained at a single position while the elongated shaft is moved.

9. The system of claim 7, wherein the control unit is further configured to: saturate a current velocity of the robotic arm during the guided mode.

10. The system of claim 7, wherein the control unit is further configured to:
determine a virtual sphere within the three-dimensional space, the virtual sphere having a center corresponding to the determined control point;
constrain a portion of the robotic arm to move along a virtual surface of the virtual sphere when the robotic arm manipulates the medical tool such that when the portion of the robotic arm is moved along the virtual surface the elongated shaft pivots about the first location on the elongated shaft; and
adjust, after the guided mode is terminated and the second location is fixed at a virtual point, a size of the virtual sphere so that when the portion of the robotic arm constrained to move along the virtual surface is moved the elongated shaft pivots about the second location on the elongated shaft.

11. A method for guiding adjustment of a remote center, comprising:
robotically facilitating movement of a robotic arm comprising a plurality of links and joints that cooperate to move a medical tool within a three-dimensional space, the robotic arm coupled to an elongated shaft adapted to deploy through a body opening of a patient;
determining a control point within the three-dimensional space that corresponds to an intersection between the body opening and a first location of the elongated shaft;
causing the first location of the elongated shaft to act as a center of motion for the elongated shaft when the robotic arm manipulates the medical tool;
determining a second location of the elongated shaft a predetermined distance from the first location;
receiving an indication that the robotic arm has been placed in a guided mode;
responsive to the robotic arm being placed in the guided mode:
determining a current orientation of the elongated shaft;
enabling the robotic arm to move the second location of the elongated shaft toward the control point while movement of the elongated shaft is constrained to the current orientation; and
fixing the second location at the control point and terminating the guided mode when the second location is at the control point; and
causing, after the guided mode is terminated, the second location of the elongated shaft to act as a center of motion for the elongated shaft when the robotic arm manipulates the medical tool.

12. The method of claim 11, further comprising:
activating an alert responsive to the robotic arm being placed in the guided mode and while movement of the robotic arm is enabled; and
deactivating the alert responsive to the guided mode being terminated.

13. The method of claim 12, wherein the alert is a visual alert and activating the alert comprises illuminating an LED component encircling the robotic arm.

14. The method of claim 11, further comprising:
identifying a manual force applied to the robotic arm while the guided mode is activated; and
electronically causing the robotic arm to move the elongated shaft a predetermined distance in a direction of the manual force.

15. The method of claim 11, wherein the indication that the robotic arm has been placed in the guided mode comprises a control being activated.

16. The method of claim 11, further comprising:
receiving an identifier associated with the elongated shaft; and
performing a lookup based on the received identifier to determine the second location and the predetermined distance from the first location.

17. A medical robotic system comprising at least one robotic arm coupled to an instrument and docked to a cannula, the cannula including a first location of the cannula and a second location of the cannula, wherein the at least one robotic arm is capable of entering a guided mode whereby a remote center of motion changes from the first location of the cannula to the second location of the cannula, and wherein an alert associated with the guided mode informs a user of entry into the guided mode.

18. The medical robotic system of claim 17, wherein in the guided mode the robotic arm is constrained to move in an axial direction.

19. The medical robotic system of claim 17, wherein the alert is visual or audible.

20. The medical robotic system of claim 19, wherein the visual alert comprises an LED coupled to the robotic arm.

\* \* \* \* \*